(12) United States Patent
Lee

(10) Patent No.: US 11,805,542 B2
(45) Date of Patent: Oct. 31, 2023

(54) METHOD USED BY UE TO MULTIPLEX UPLINK TRANSMISSIONS AND UE USING THE SAME

(71) Applicant: Acer Incorporated, New Taipei (TW)

(72) Inventor: Chien-Min Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 246 days.

(21) Appl. No.: 17/468,703

(22) Filed: Sep. 8, 2021

(65) Prior Publication Data

US 2022/0086849 A1 Mar. 17, 2022

Related U.S. Application Data

(60) Provisional application No. 63/078,345, filed on Sep. 15, 2020.

(51) Int. Cl.
*H04W 72/56* (2023.01)
*H04W 72/0446* (2023.01)
(Continued)

(52) U.S. Cl.
CPC ....... *H04W 72/56* (2023.01); *H04W 72/0446* (2013.01); *H04W 72/0453* (2013.01); *H04W 72/21* (2023.01); *H04W 72/23* (2023.01)

(58) Field of Classification Search
CPC ............. H04W 72/56; H04W 72/0446; H04W 72/0453; H04W 72/21; H04W 72/23; H04W 72/1268; H04W 72/569; H04L 5/003; H04L 5/0044; H04L 5/0053; H04L 5/0064
See application file for complete search history.

(56) References Cited

U.S. PATENT DOCUMENTS

| 10,225,826 B2 * | 3/2019 | Tiirola | H04B 1/713 |
| 11,019,682 B2 * | 5/2021 | Xiong | H04W 72/566 |

(Continued)

FOREIGN PATENT DOCUMENTS

WO 2019154357 8/2019

OTHER PUBLICATIONS

"Search Report of Europe Counterpart Application", dated Feb. 22, 2022, p. 1-p. 11.

(Continued)

*Primary Examiner* — Brian T O Connor
(74) *Attorney, Agent, or Firm* — JCIPRNET

(57) ABSTRACT

According to an exemplary embodiment, the disclosure is directed to a method used by a UE to multiplex uplink transmissions. The method includes determining whether to multiplex a first plurality of UL channels in a first slot, where the UL channels overlap within at least one time period and are indicated with a first priority index; determining whether to multiplex a second plurality of UL channels in the first slot, where the second plurality of channels overlap within at least one time period and are indicated with a second priority index; determining whether to multiplex a third plurality of UL channels in the first slot, where the UL channels are indicated with different priority indexes; determining whether to prioritize a fourth plurality of UL channels in the first slot, wherein the UL channels are indicated with a different priority indexes; and performing an uplink transmission in the first slot.

30 Claims, 86 Drawing Sheets

(51) Int. Cl.
*H04W 72/0453* (2023.01)
*H04W 72/21* (2023.01)
*H04W 72/23* (2023.01)

(56) References Cited

U.S. PATENT DOCUMENTS

| | | | |
|---|---|---|---|
| 11,405,940 B2 * | 8/2022 | Akkarakaran | H04L 5/0053 |
| 2019/0306922 A1 | 10/2019 | Xiong et al. | |
| 2022/0086850 A1 * | 3/2022 | Huang | H04W 72/569 |
| 2022/0191890 A1 * | 6/2022 | Guo | H04L 1/1854 |
| 2022/0191903 A1 * | 6/2022 | Bae | H04L 1/1893 |
| 2023/0035066 A1 * | 2/2023 | Bae | H04W 72/1268 |
| 2023/0155720 A1 * | 5/2023 | Yin | H04L 1/0013 |
| | | | 370/329 |
| 2023/0155744 A1 * | 5/2023 | Bae | H04L 1/18 |
| | | | 370/280 |

OTHER PUBLICATIONS

Nokia, Nokia Shanghai Bell, "On UCI Enhancements for NR URLLC," 3GPP TSG RAN WG1 #99, Nov. 2019, pp. 1-21.
Nokia, Nokia Shanghai Bell, "Maintenance of Rel-16 URLLC UCI enhancements," 3GPP TSG RAN WG1 Meeting #101-e, May 2020, pp. 1-25.
NEC, "Discussion on Intra-UE prioritization and multiplexing", 3GPP TSG RAN WG1 Meeting #102-e, Aug. 17-28, 2020, pp. 1-6.
OPPO, "UCI enhancements for URLLC", 3GPP TSG RAN WGG1 Meeting #100-E, Feb. 24-28, 2020, pp. 1-8.
OPPO, "UCI enhancements for URLLC", 3GPP TSG RAN WG1 Meeting #98, Aug. 26-30, 2019, pp. 1-9.

* cited by examiner

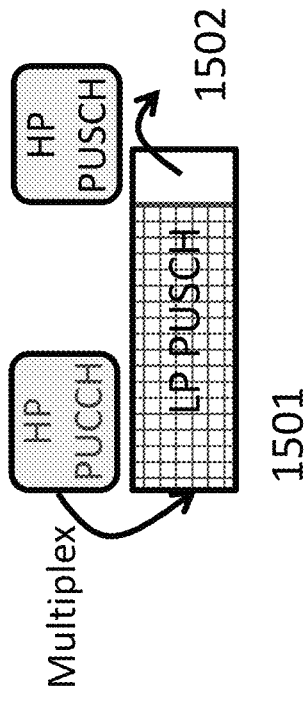
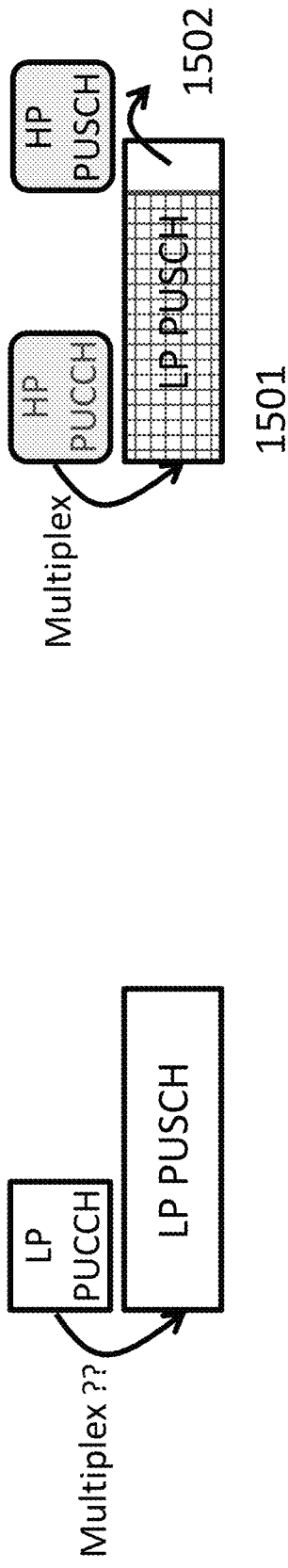
FIG. 14
FIG. 15
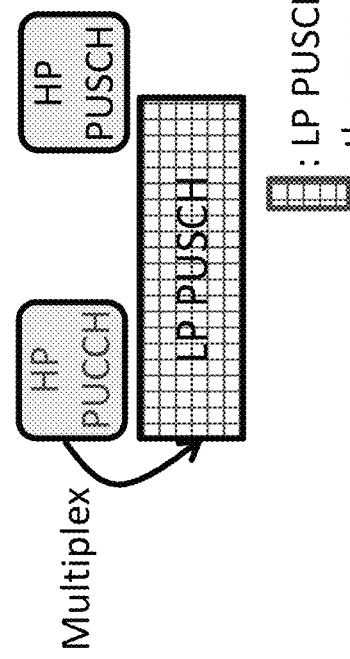
FIG. 16

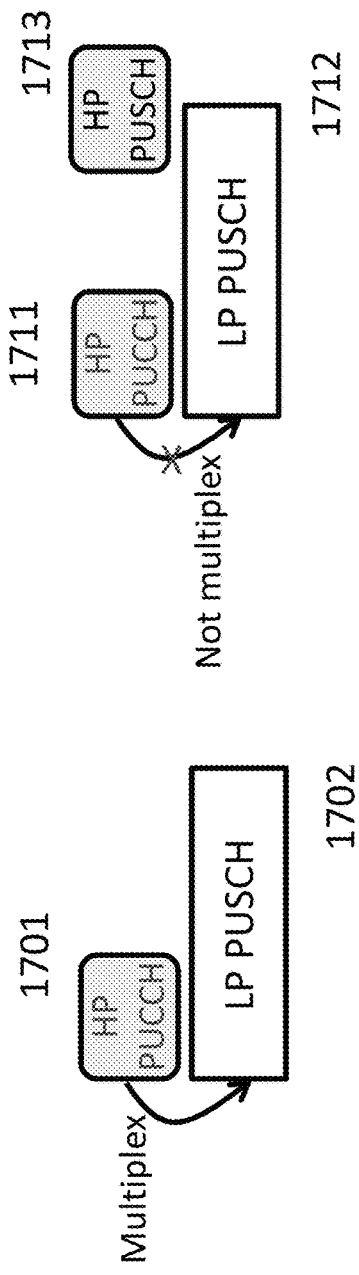
FIG. 17
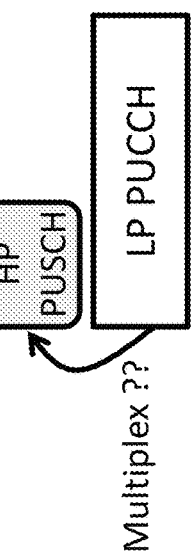
FIG. 20
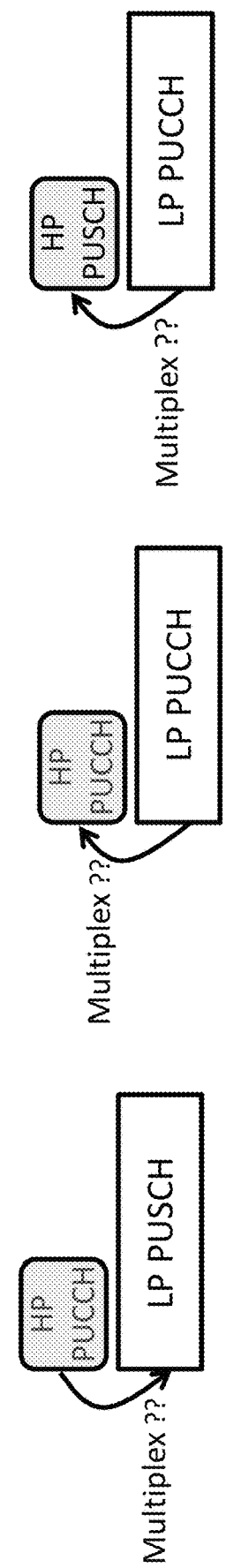
FIG. 19
FIG. 18

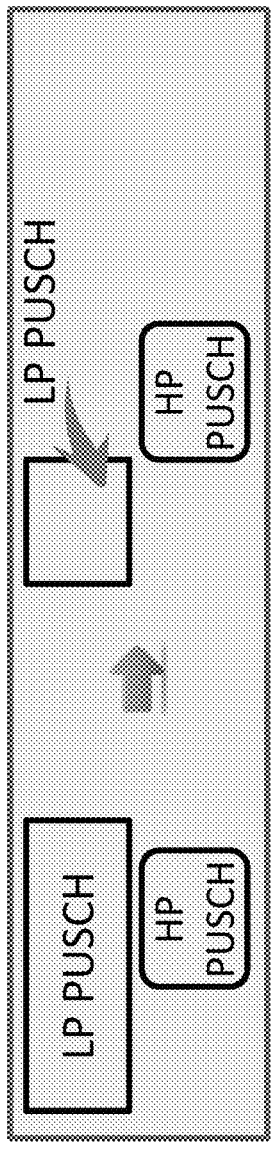
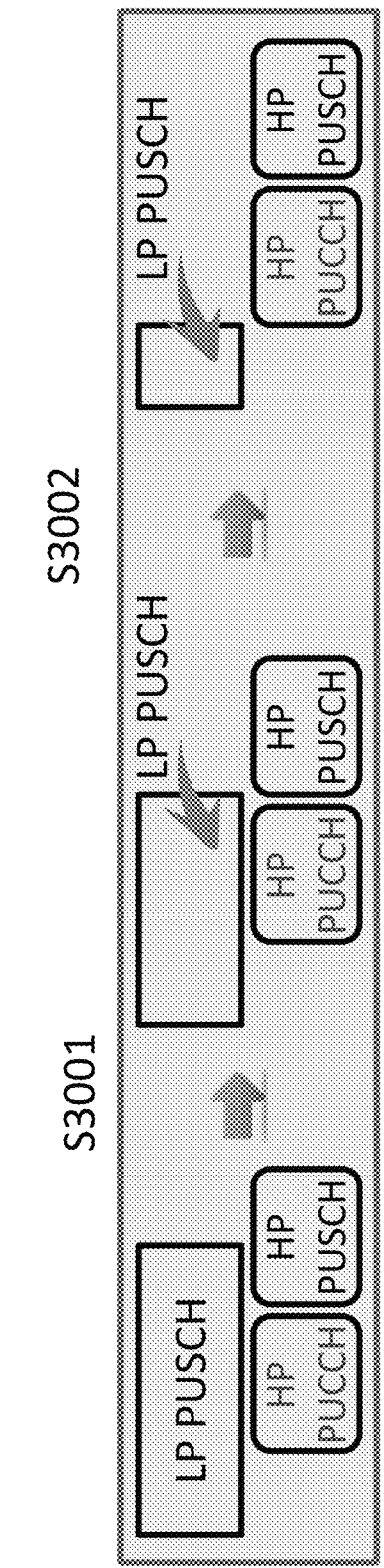
FIG. 29
FIG. 30

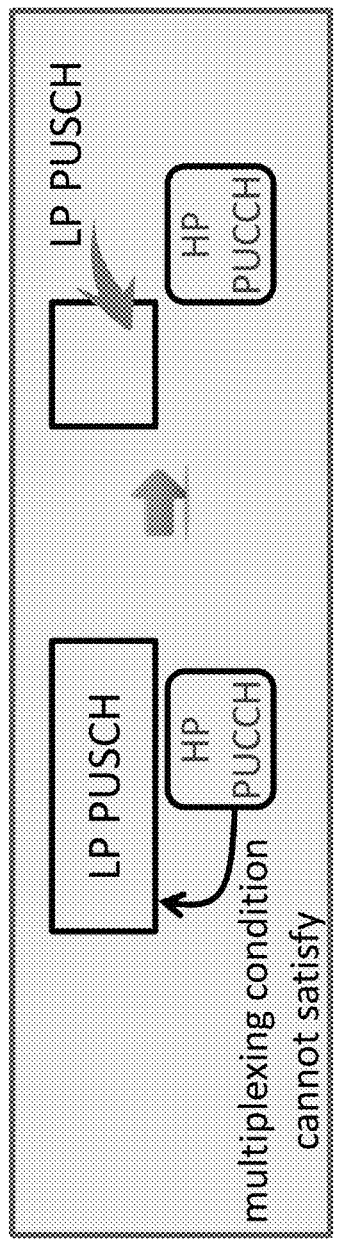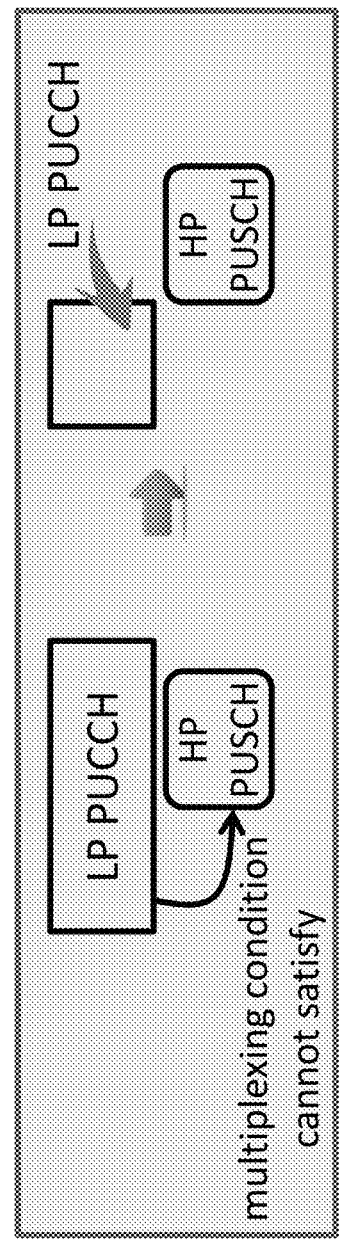
FIG. 33
FIG. 34

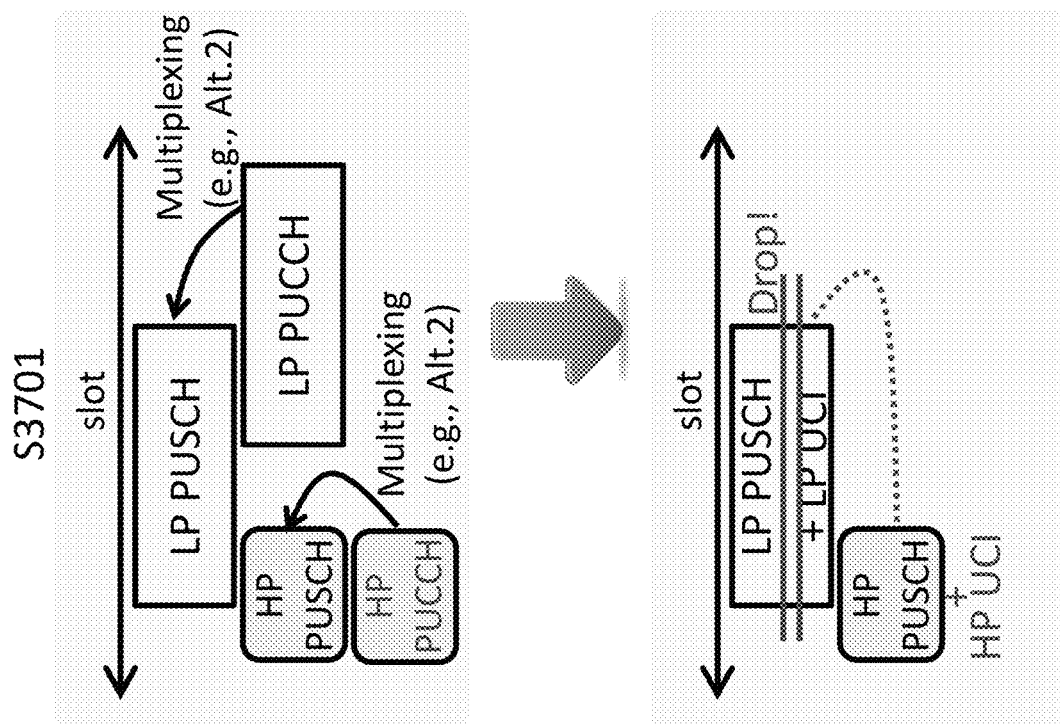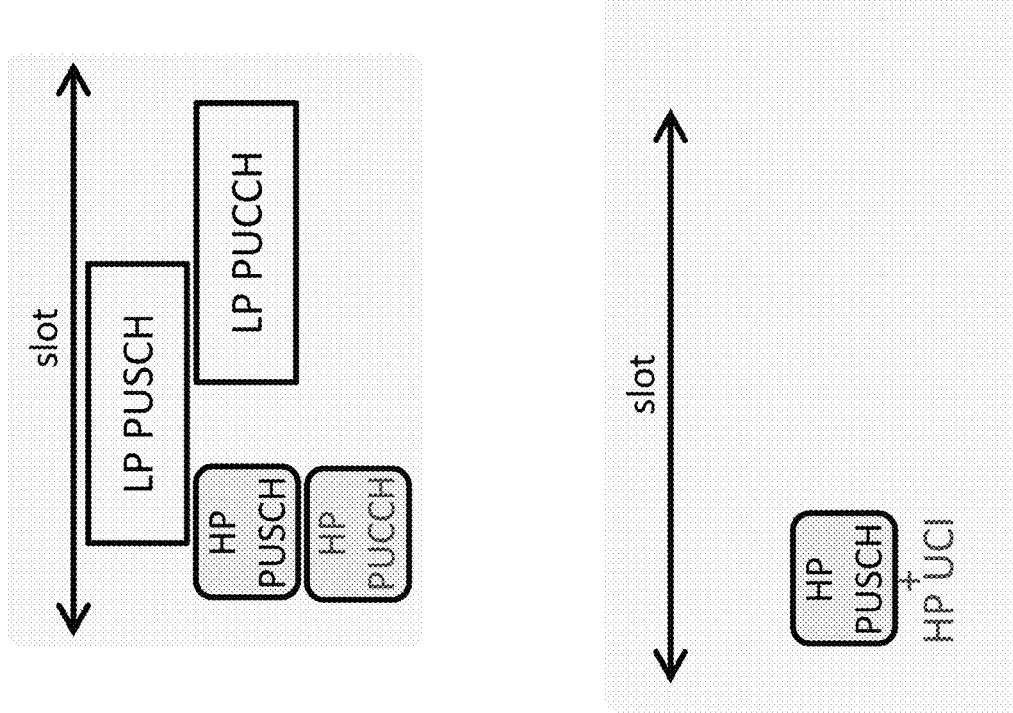
FIG. 37

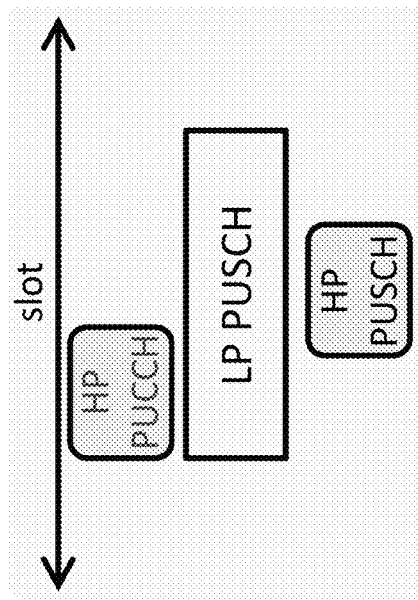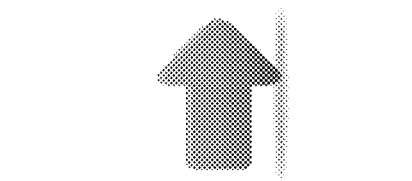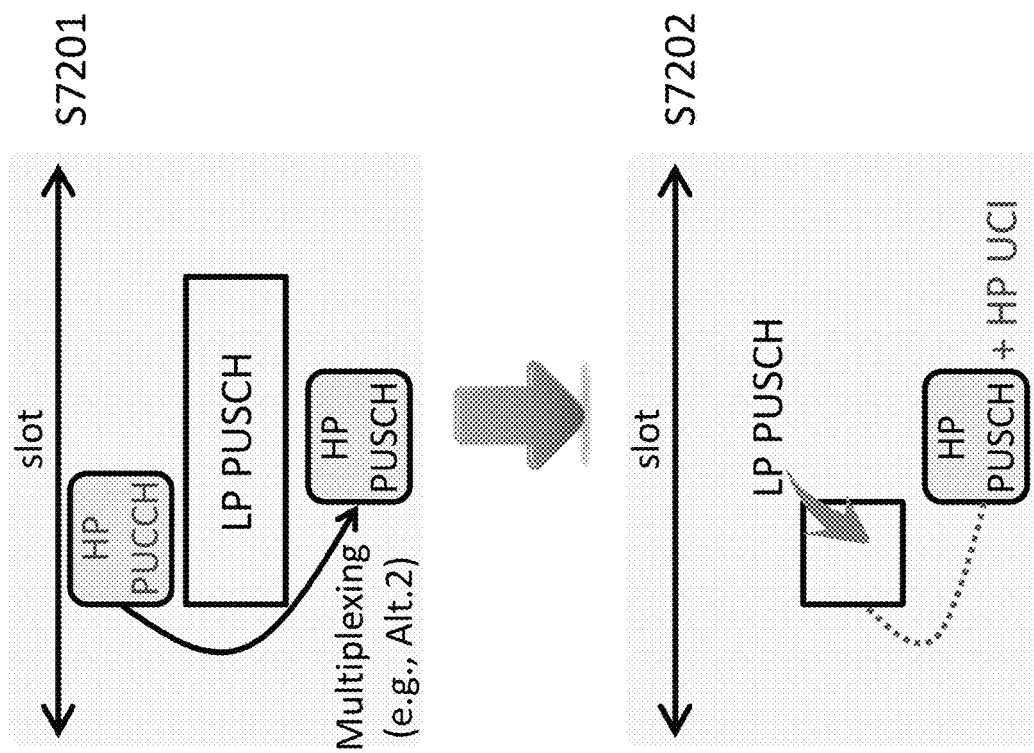
FIG. 72

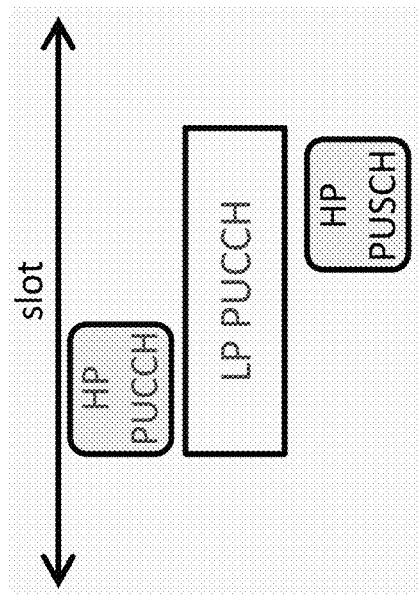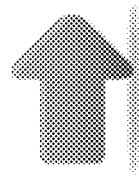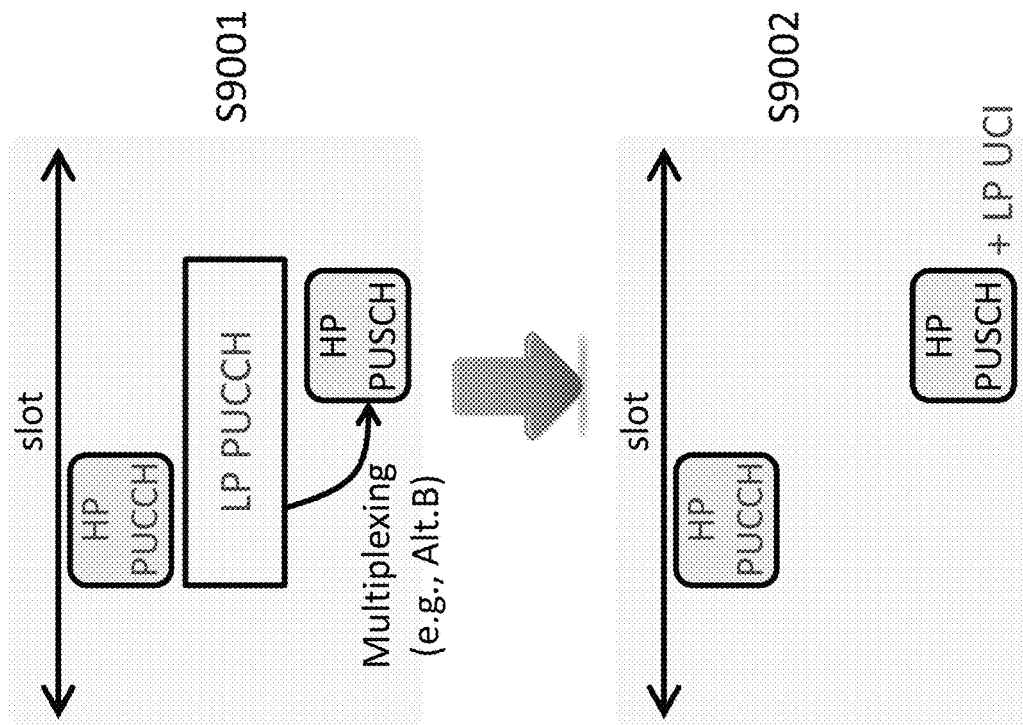
FIG. 90

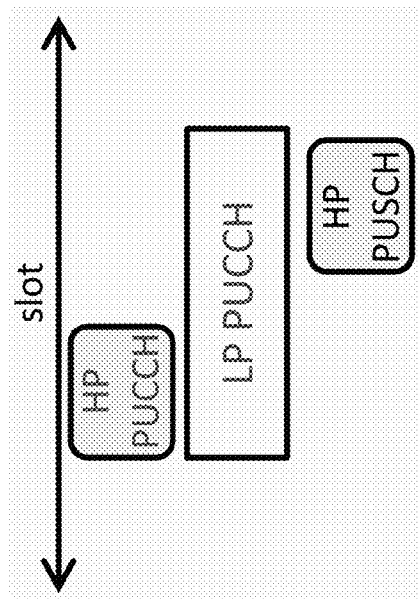
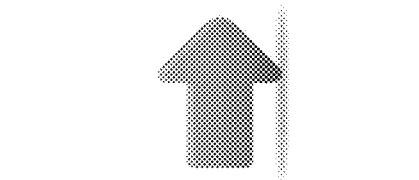
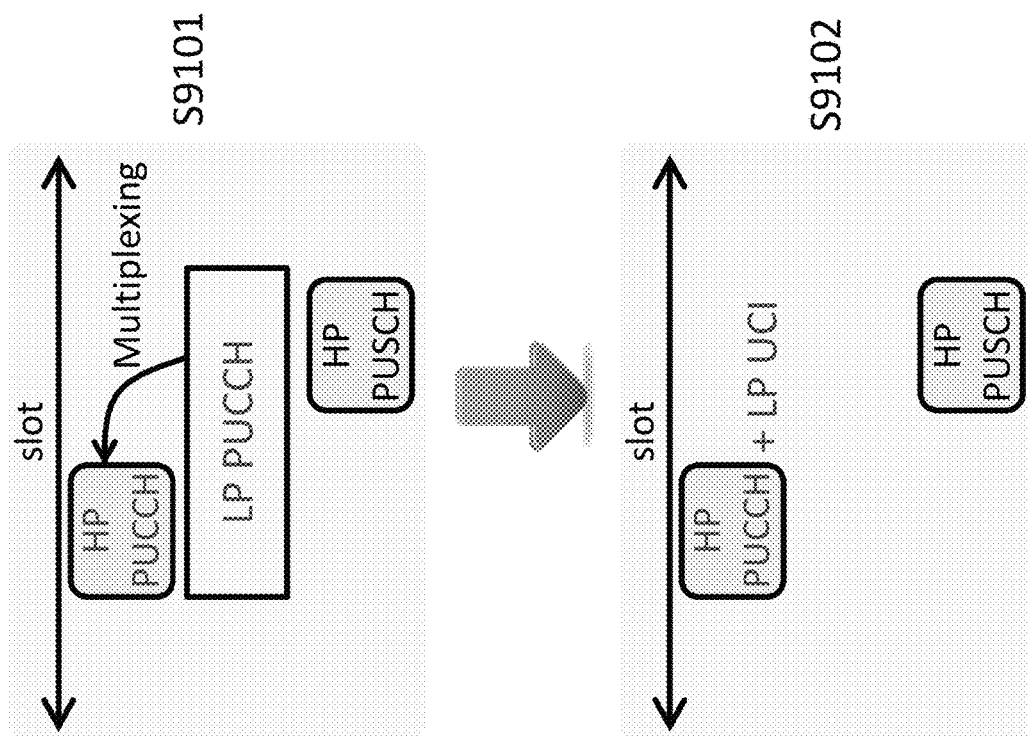
FIG. 91

- Perform multiplexing among channels with different priority may comprise:
  - Multiplexing a first UCI in a PUSCH, if any
    - Wherein the first UCI and the PUSCH belong to different priority indexes, respectively
  - Multiplexing a first UCI with a second UCI, if any
    - Wherein the first UCI and the second UCI belong to different priority indexes, respectively or

- Perform multiplexing among channels with different priority may comprise:
  - Multiplexing a first UCI with a second UCI, if any
    - Wherein the first UCI and the second UCI belong to different priority indexes, respectively
  - Multiplexing a first UCI in a PUSCH, if any
    - Wherein the first UCI and the PUSCH belong to different priority indexes, respectively

FIG. 92

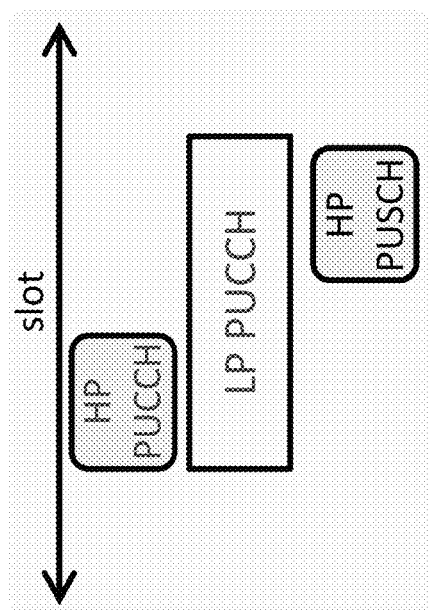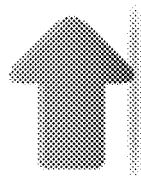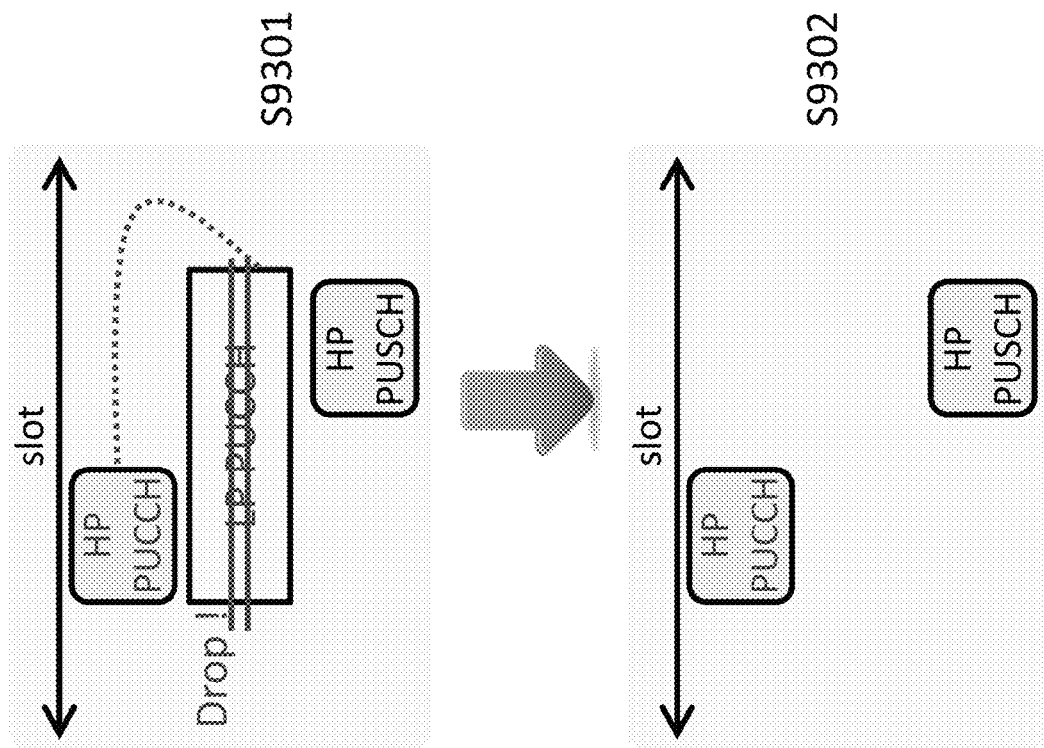
FIG. 93

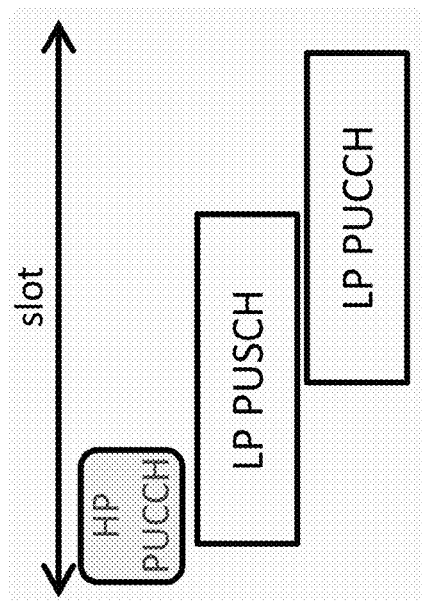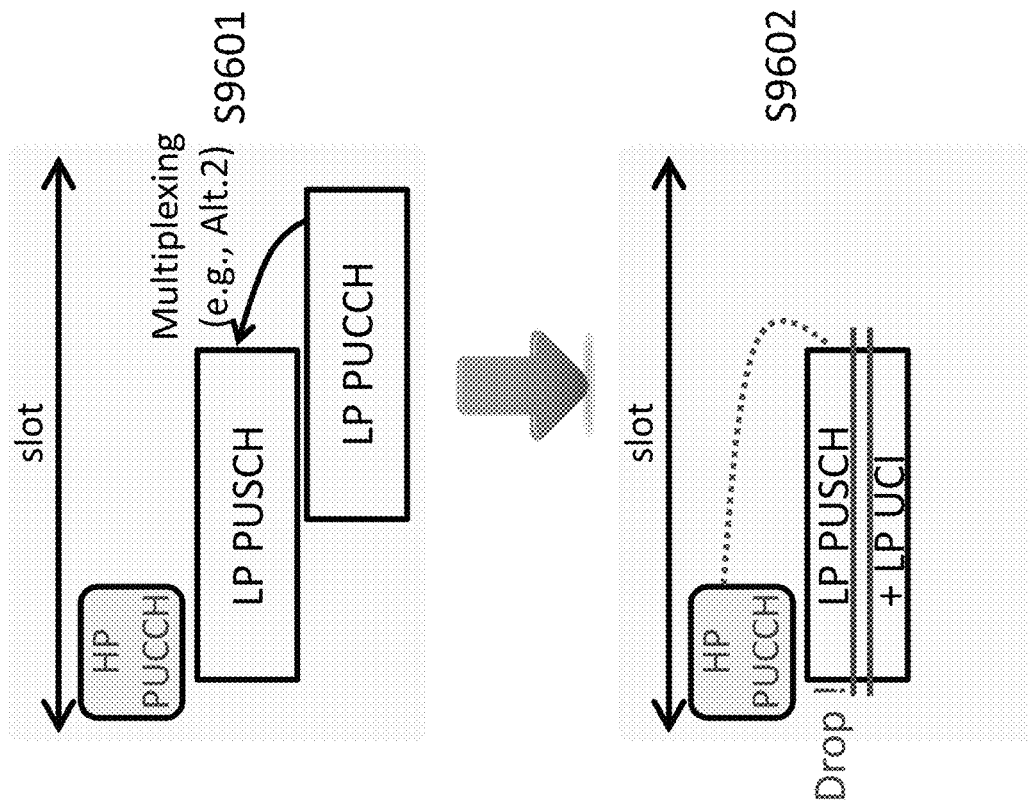
FIG. 96

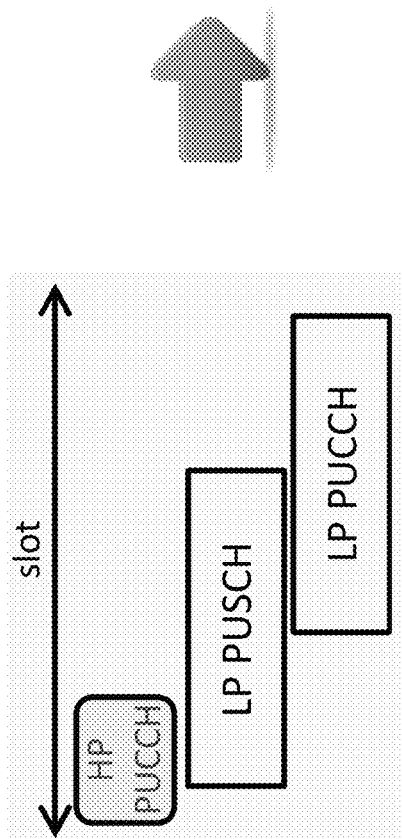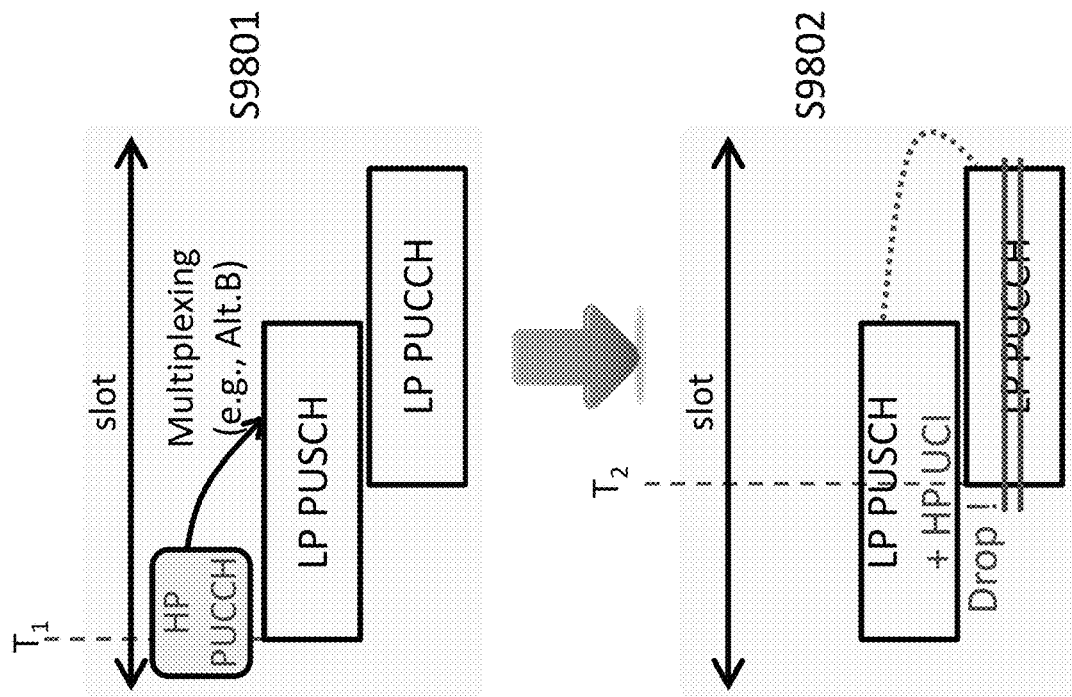
FIG. 98

METHOD USED BY UE TO MULTIPLEX UPLINK TRANSMISSIONS AND UE USING THE SAME

CROSS REFERENCE TO RELATED APPLICATION

This application claims the priority benefit of U.S.A. provisional application Ser. No. 63/078,345, filed on Sep. 15, 2020. The entirety of the above-mentioned patent application is hereby incorporated by reference herein and made a part of specification.

TECHNICAL FIELD

The disclosure is directed to a method used by a UE to multiplex uplink transmissions and a UE using the same method.

BACKGROUND

Ultra-Reliable and Low Latency Communication (URLLC) is a new form of communication supported by the $5^{th}$ Generation (5G) New Radio (NR). URLLC is to be deployed in the areas such as Augmented Reality (AR), Virtual Reality (VR), factory automation, transportation industry such as remote driving, electrical power distribution, and etc. The objective of URLLC includes enhancements of physical channels and uplink (UL) control information (UCI) report such that the reliability of communication is higher up to $10^{-6}$ level and the latency of communication is shorter in the range between 0.5 to 1 millisecond (ms). URLLC may co-exist with Enhanced Mobile Broadband (eMBB) by using intra-UE prioritization and multiplexing schemes for UL and downlink (DL) and by using inter-UE prioritization and multiplexing schemes for UL.

FIG. 1 shows an example of different UL traffic having different priorities. Currently, a mechanism for a UE performing multiplexing and prioritization of data traffic is a higher priority as well as endeavors to specify the multiplexing behaviors among different UL traffic including Hybrid Automatic Repeat Request Acknowledgement (HARQ-ACK), Scheduling Request (SR), and Channel State Information (CSI) transmitted through Physical Uplink Shared Channel (PUSCH) as a part of UL traffic with different priorities, and the UL traffic may further include UCI on Physical Uplink Control Channel (PUCCH) and UCI on PUSCH. Moreover, there has been an effort to specify the physical layer prioritization of overlapping dynamic grant for transmissions in PUSCH and configured grant for transmissions in PUSCH for different physical layer priorities on, for example, a bandwidth part (BWP) of a serving cell, and the specified prioritization may determine the cancellation behavior for data transmitted in PUSCH and has lower physical layer priorities. An example of multiplexing UL traffic for NR is shown in FIG. 2, and UCI in FIG. 2 may include HARQ-ACK and/or CSI preceded by Demodulation Reference Signal (DMRS) and followed by the UL shared channel (UL-SCH).

When different types of UL data traffic with different priorities are scheduled to be transmitted, collisions may inevitably occur. Assuming that the data traffic categorized as low priority (LP) PUSCH, LP PUCCH, high priority (HP) PUSCH, and HP PUCCH, currently there is no mechanism that determines how these data traffic is handled if received nearly at the same time. Therefore, there has to a mechanism for a UE to internally multiplex and prioritize different UL traffic (i.e. intra-UE multiplexing and prioritization) when the collision inevitably occurs.

SUMMARY OF THE DISCLOSURE

Accordingly, the disclosure is directed to a method used by a UE to multiplex UL transmissions and a UE using the same method.

In one of the exemplary embodiments, the disclosure is directed to a method used by a UE to multiplex UL transmissions. The method includes not limited to: determining whether to multiplex a first plurality of UL channels in a first slot in response to receiving, by a hardware processor, internal data traffic in the first plurality of UL channels in the first slot, wherein the UL channels of the first plurality of UL channels overlap within at least one time period and are indicated with a first priority index; determining whether to multiplex a second plurality of UL channels in the first slot in response to receiving, by a hardware processor, internal data traffic in the second plurality of UL channels in the first slot, wherein the second plurality of channels overlap within at least one time period and the UL channels of the second plurality of UL channels are indicated with a second priority index; determining whether to multiplex a third plurality of UL channels in the first slot in response to receiving, by a hardware processor, internal data traffic in the third plurality of UL channels in the first slot, wherein the third plurality of channels overlap within at least one time period and the UL channels of the third plurality of UL channels are indicated with different priority indexes; determining whether to prioritize a fourth plurality of UL channels in the first slot in response to receiving, by a hardware processor, internal data traffic in the fourth plurality of UL channels in the first slot, wherein the fourth plurality of channels overlap within at least one time period and the UL channels of the fourth plurality of UL channels are indicated with different priority indexes; and performing an UL transmission in the first slot.

In one of the exemplary embodiments, the disclosure is directed to a user equipment which includes not limited to a transceiver and a processor coupled to the transceiver. The process is configured at least to: determining whether to multiplex the first plurality of UL channels in the first slot in response to receiving, by a hardware processor, internal data traffic in a first plurality of UL channels in the first slot, wherein the UL channels of the first plurality of UL channels overlap within at least one time period and are indicated with a first priority index; determine whether to multiplex a second plurality of UL channels in the first slot in response to receiving, by a hardware processor, internal data traffic in the second plurality of UL channels in the first slot, wherein the second plurality of channels overlap within at least one time period and the UL channels of the second plurality of UL channels are indicated with a second priority index; determine whether to multiplex a third plurality of UL channels in the first slot in response to receiving, by a hardware processor, internal data traffic in the third plurality of UL channels in the first slot, wherein the third plurality of channels overlap within at least one time period and the UL channels of the third plurality of UL channels are indicated with different priority indexes; determine whether to prioritize a fourth plurality of UL channels in the first slot in response to receiving, by a hardware processor, internal data traffic in the fourth plurality of UL channels in the first slot, wherein the fourth plurality of channels overlap within at least one time period and the UL channels of the fourth plurality of UL channels are indicated with different priority indexes; and perform an UL transmission in the first slot.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 14 illustrates an example of Alternative 1 according to an exemplary embodiment of the disclosure.

FIG. 15 illustrates Alternative A of multiplexing among channels with different priority according to an exemplary embodiment of the disclosure.

FIG. 16 illustrates Alternative B of multiplexing among channels with different priority according to an exemplary embodiment of the disclosure.

FIG. 17 illustrates Alternative C of multiplexing among channels with different priority according to an exemplary embodiment of the disclosure.

FIG. 18 illustrates Alternative D1 of multiplexing among channels with different priority according to an exemplary embodiment of the disclosure.

FIG. 19 illustrates Alternative D2 of multiplexing among channels with different priority according to an exemplary embodiment of the disclosure.

FIG. 20 illustrates Alternative D3 of multiplexing among channels with different priority according to an exemplary embodiment of the disclosure.

FIG. 29 illustrates prioritization Rule 1 for prioritization of channels according to an exemplary embodiment of the disclosure.

FIG. 30 illustrates prioritization Rule 2 for prioritization of channels according to an exemplary embodiment of the disclosure.

FIG. 33 illustrates prioritization Rule 5 for prioritization of channels according to an exemplary embodiment of the disclosure.

FIG. 34 illustrates prioritization Rule 6 for prioritization of channels according to an exemplary embodiment of the disclosure.

FIG. 37 illustrates a result of applying Option 1 of the method used by a UE to multiplex UL transmissions to the first example according to an exemplary embodiment of the disclosure.

FIG. 72 illustrates applying Option 1 and Option 2 of the method used by a UE to multiplex UL transmissions to the seventh example according to an exemplary embodiment of the disclosure.

FIG. 90 illustrates a first result of applying Options 1, 2, and 3 of the method used by a UE to multiplex UL transmissions to the eleventh example according to an exemplary embodiment of the disclosure.

FIG. 91 illustrates a second result of applying Options 1, 2, and 3 of the method used by a UE to multiplex UL transmissions to the eleventh example according to an exemplary embodiment of the disclosure.

FIG. 92 illustrates multiplexing among channels with different priorities according to the second result of FIG. 91 according to an exemplary embodiment of the disclosure.

FIG. 93 illustrates a third result of applying Options 1, 2, and 3 of the method used by a UE to multiplex UL transmissions to the eleventh example according to an exemplary embodiment of the disclosure.

FIG. 96 illustrates a second result of applying Options 1, 2, and 3 of the method used by a UE to multiplex UL transmissions to the twelfth example according to an exemplary embodiment of the disclosure.

FIG. 98 illustrates a second result of applying Options 4 of the method used by a UE to multiplex UL transmissions to the twelfth example according to an exemplary embodiment of the disclosure.

DETAILED DESCRIPTION OF DISCLOSED EMBODIMENTS

Figure 1:
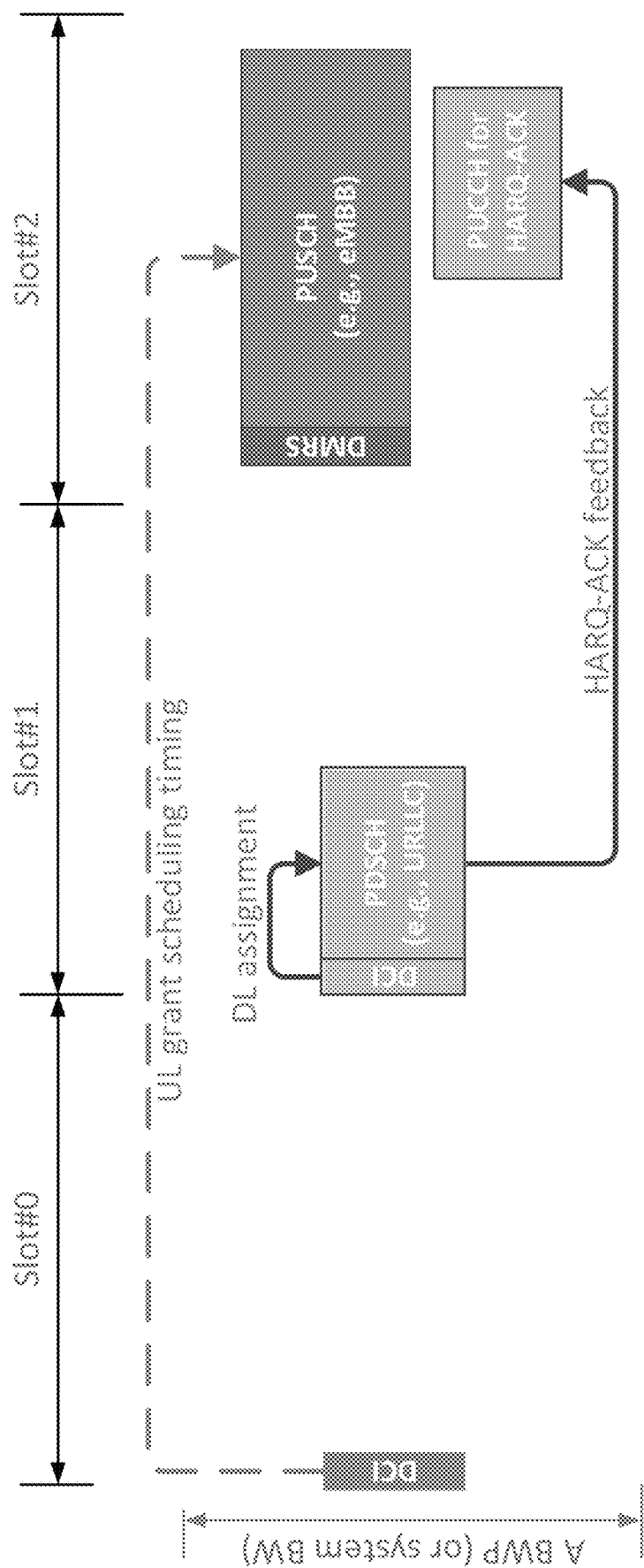
FIG. 1 illustrates an example of different UL traffic having different priorities.
Figure 2:
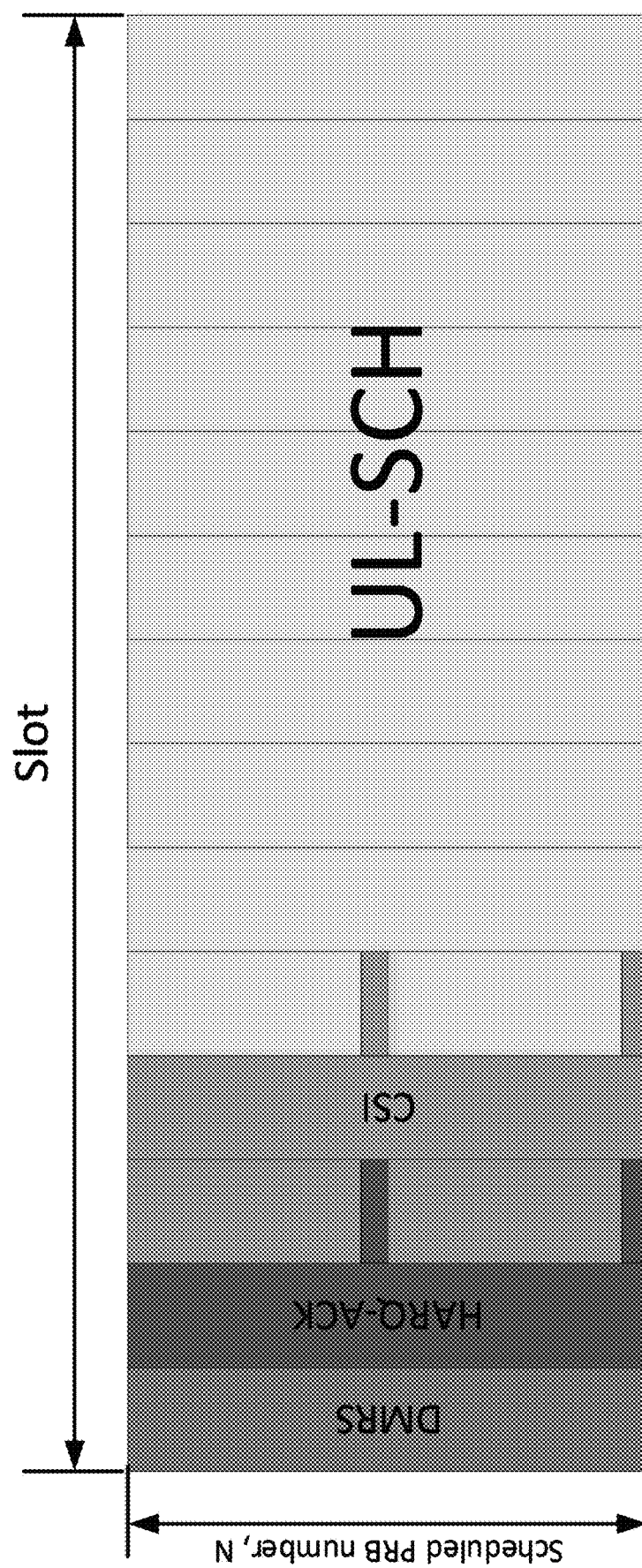
FIG. 2 illustrates UCI multiplexing for NR.

Reference will now be made in detail to the present exemplary embodiments of the disclosure, examples of which are illustrated in the accompanying drawings. Wherever possible, the same reference numbers are used in the drawings and the description to refer to the same or like parts.

It should be noted that in this disclosure, the following presumptions could be applied to the embodiments of the disclosure. HARQ-ACK denotes the HARQ information for at least one transport block. The UCI may include at least one of HARQ-ACK, CSI or SR. The priority index of a UL transmission could be determined according to a gNB indication. For example, a PUSCH transmission could be treated as having a priority index=1 if the corresponding UL grant in DCI has provided the priority information such as in a priority index. For example, a PUSCH transmission could be treated as having a priority index=0 if the corresponding UL grant in DCI does not provide any priority information. For example, a configured grant (CG) PUSCH transmission could be treated as having a priority index=1 if the corresponding higher layer configuration has provided the priority information such as in a priority index. If a UE has decided to multiplex HP UCI in LP PUSCH, it would mean that the requirements or limitations such as latency or reliability of the HP UCI could be satisfied. Otherwise, the HP UCI may not be multiplexed on the LP PUSCH and the LP PUSCH could be dropped for at least the portion that overlaps with the resource (e.g. HP PUCCH) that carries the HP UCI. A LP UCI that is dropped in its entirety or partially could be entirely or partially re-transmitted at a later time for the embodiments of the disclosure. For example, a HP UCI may include at least one of HP HARQ-ACK, HP CSI and HP SR. For example, a LP UCI may include at least one of LP HARQ-ACK, LP CSI and LP SR. A gNB configuration could be a RRC configuration.

Further, the following presumptions could be applied to the embodiments of the disclosure. A HP PUSCH transmission could be indicated with a higher priority index such as priority index 1. A HP PUCCH transmission could be indicated with a higher priority index such as priority index 1. A LP PUSCH transmission could be indicated with a lower priority (LP) index such as priority index 0. A LP PUCCH transmission could be indicated with a LP index such as priority index 0. LP PUSCH+LP UCI may denote a PUSCH transmission which is indicated with a LP index such as priority index 0, and the transmission includes at least one LP UCI. LP PUSCH+HP UCI may denote a PUSCH transmission which is indicated with a LP index such as priority index 0, and the transmission includes at least one HP UCI. HP PUSCH+HP UCI may denote a PUSCH transmission which is indicated with a higher priority index such as priority index 1, and the transmission includes at least one HP UCI. HP PUSCH+LP UCI may denote a PUSCH transmission which is indicated with a higher priority index such as priority index 1, and the transmission includes at least one LP UCI. Moreover, it should be obvious to an ordinary person skilled in the art that the disclosure would include combinations of the embodiments.

Figure 3:
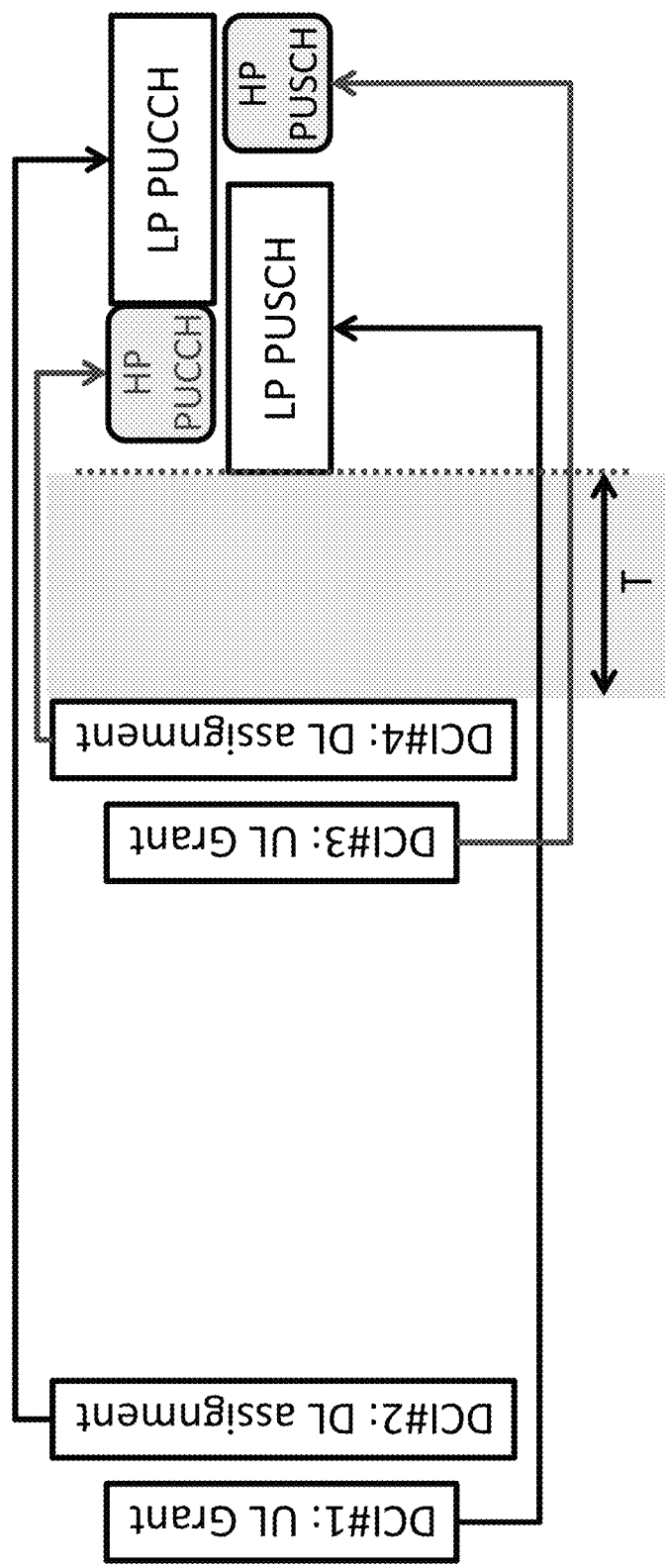
FIG. 3 illustrates the concept of a minimum processing time for handling intra-UE multiplexing and prioritization.

The disclosure provides a mechanism for a UE to internally multiplex and prioritize different UL traffic as the collision among different UL traffic would inevitably occur. To multiplex and prioritize a plurality of UL transmissions, a concept of a minimum processing time is first explained and is shown in FIG. 3. In FIG. 3, it is shown that a downlink control information (DCI) (e.g. DCI #1) contains an UL grant which triggers a HP PUSCH transmission, DCI #2 contains a DL assignment which triggers a LP PUCCH transmission, DC #3 contains an UL grant which triggers a HP PUSCH transmission, and DC #4 contains a DL assignment which triggers a HP PUCCH transmission. The occurrences in FIG. 3 would transpire within a UE (i.e. intra-UE) which would then perform a multiplexing and prioritization procedure for the plurality of UL transmissions corresponding to DL receptions (e.g., DCI #1~DCI #4) if a time distance T between the earliest (e.g. LP PUSCH) of the four UL transmissions (e.g. LP PUCCH, LP PUSCH, HP PUCCH, HP PUSCH) and the last DL reception triggering (e.g., DCI #4) of the four UL transmissions is larger than the predetermined timing threshold T. Thus, T is the minimum processing time for handling the intra-UE multiplexing and prioritization.

Figure 4:
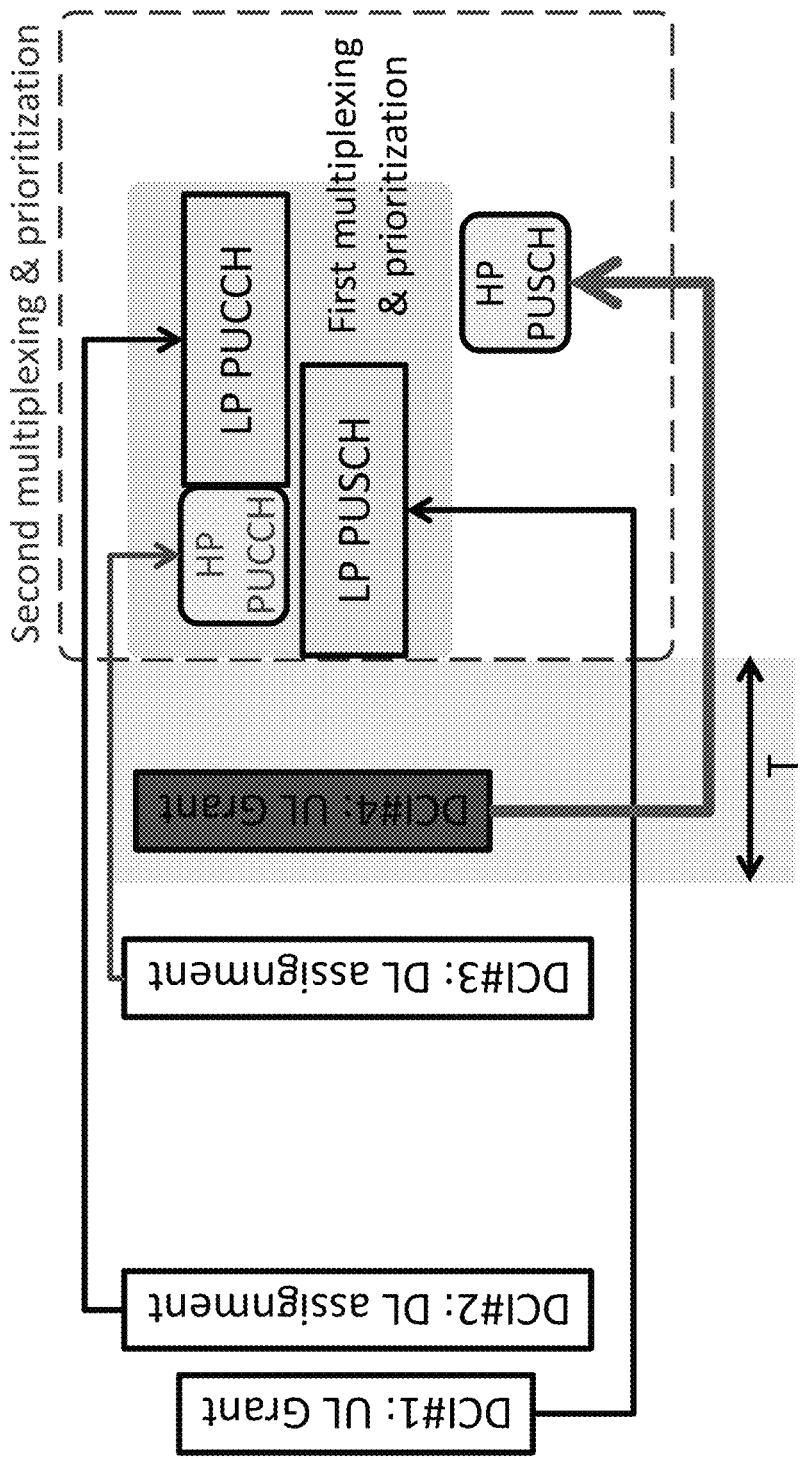
FIG. 4 illustrates an example of a second multiplexing and prioritization.

If the minimum processing time for handling the intra-UE multiplexing and prioritization is not met, then multiple multiplexing and prioritization procedures for the plurality of UL transmissions could be required. FIG. 4 shows a situation where a second multiplexing and prioritization procedure is needed. Referring to FIG. 4, as DCI #1, DCI #2, DCI #3 are received before T, a first multiplexing and prioritization procedure is performed for HP PUCCH, LP PUCCH, and LP PUSCH which respectively correspond to the triggering of DCI #1, DCI #2, and DCI #3. Since DCI #4 is received without the required T, then a second multiple multiplexing and prioritization procedure could be performed for the additional HP PUSCH with the channels that were involved for the first multiple multiplexing and prioritization procedure.

Figure 5:
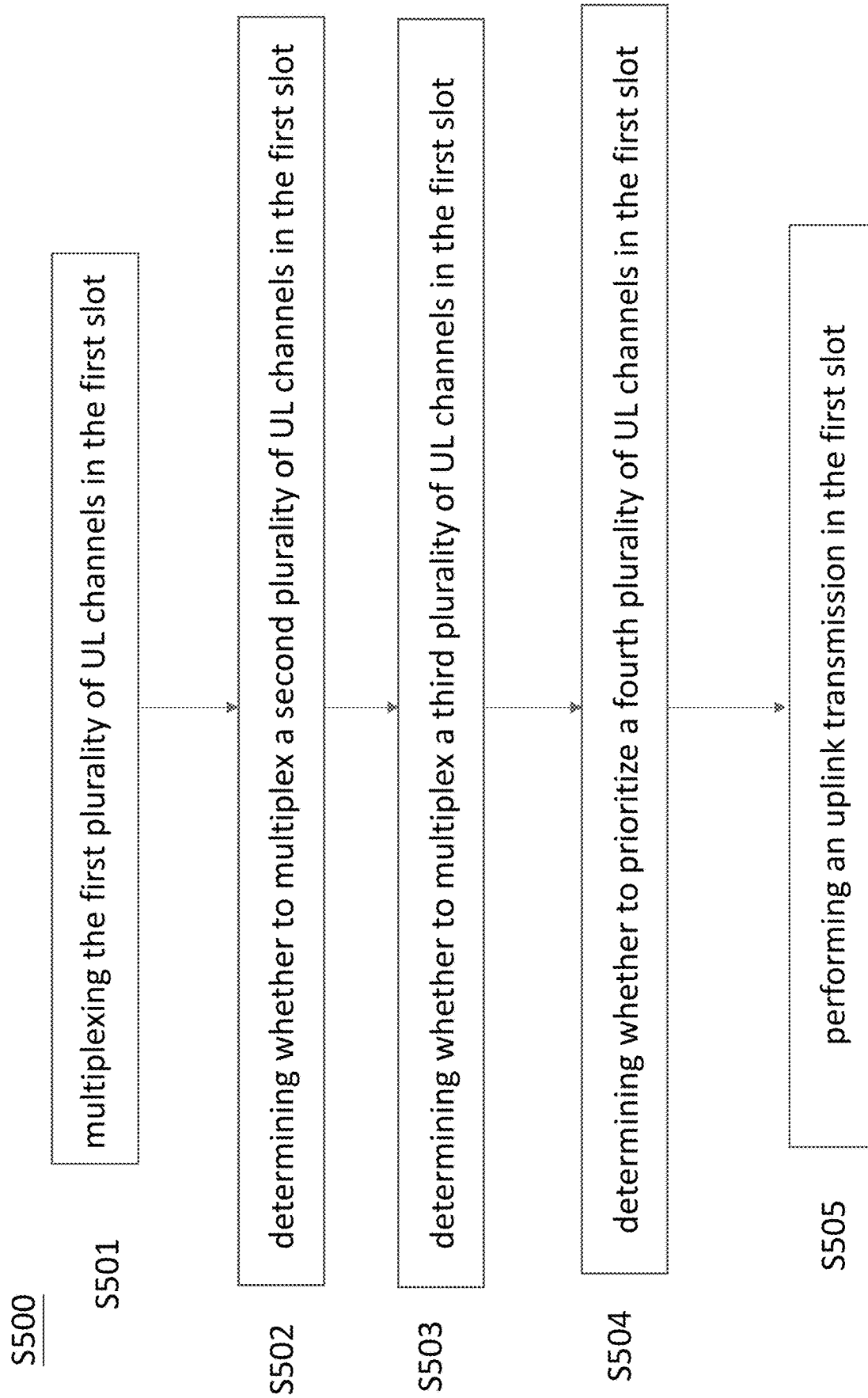
FIG. 5 illustrates a method used by a UE to multiplex UL transmissions according to an exemplary embodiment of the disclosure.

FIG. 5 illustrates a method used by a UE to multiplex UL transmissions according to an exemplary embodiment of the disclosure. The method 500 would include not limited the steps described as follows. Steps S501~S505 are directed to Option 1, and Option 2~Option 4 is described in further details in latter part of the disclosure. In step S501, the UE may determine whether to multiplex a first plurality of UL channels in a first slot in response to receiving, by a hardware processor, internal data traffic in the first plurality of UL channels in the first slot, wherein the UL channels of the first plurality of UL channels overlap within at least one time period and are indicated with a first priority index. In step S502, the UE may determine whether to multiplex a second plurality of UL channels in the first slot in response to receiving, by a hardware processor, internal data traffic in the second plurality of UL channels in the first slot, wherein the second plurality of channels overlap within at least one time period and the UL channels of the second plurality of UL channels are indicated with a second priority index. The step S503, the UE may determine whether to multiplex a third plurality of UL channels in the first slot in response to receiving, by a hardware processor, internal data traffic in the third plurality of UL channels in the first slot, wherein the third plurality of channels overlap within at least one time period and the UL channels of the third plurality of UL channels are indicated with different priority indexes. In step S504, the UE may determine whether to prioritize a fourth plurality of UL channels in the first slot in response to receiving, by a hardware processor, internal data traffic in the fourth plurality of UL channels in the first slot, wherein the fourth plurality of channels overlap within at least one time period and the UL channels of the fourth plurality of UL channels are indicated with a different priority indexes. In step S505, the UE may perform an UL transmission in the first slot.

According to an exemplary embodiment (Option 2), the method may further include multiplexing the second plurality of UL channels, if there is no PUSCH in the second plurality of UL channels to collide with a first UL channel. According to an exemplary embodiment (Option 3), the method may further include determining whether to prioritize a fifth plurality of UL channels before determining whether to multiplex a first plurality of UL channels where the fifth plurality of UL channels may include the same type of UL channels which are indicated with different priority indexes. The UL channels in the fifth plurality of UL channels could all be PUSCHs or could all be PUCCHs.

According to an exemplary embodiment, the priority index could be defined as the first priority index being higher than the second priority index. Whether an UL channel has the first priority index or the second priority index could be determined according to the DCI which triggers the corresponding UL transmission or is determined according to the higher layer configuration corresponding to the UL transmission.

The following inventive concepts describe multiplexing detail for channels having the same priority index. According to an exemplary embodiment, the step of determining whether to multiplex a second plurality of UL channels may further include multiplexing a first UCI in a first PUSCH in the second plurality of UL channels, determining a number of resource for multiplexing the first UCI according to the resource of the first PUSCH that is not dropped due a collision with another UL channel which has a higher priority than the first PUSCH, and determining a number of resources for multiplexing the first UCI according to the resource of the first PUSCH.

The following inventive concepts describe part 1 of multiplexing detail for channels with different priority indexes. According to an exemplary embodiment, the step of determining whether to multiplex a third plurality of UL channels may further include multiplexing a second UCI in a second UL channel in the third plurality of UL channels where the second UCI and the second UL channel are corresponding to different priority indexes, respectively and in the third plurality of UL channels.

According to an exemplary embodiment, part 1 may further include, determining a number of resources for multiplexing the second UCI according to the resource of the second UL channel that is not dropped due a collision with another UL channel which has higher priority than the second UL channel. Alternatively, part 1 may further include determining a number of resources for multiplexing the second UCI according to the resource of the second UL channel. Alternatively, part 1 may further include multiplexing a second UCI in a second UL channel in the third plurality of UL channels if the second UL channel does not overlap with another UL channel which has a higher priority index than the second UL channel where the second UL channel could be either a PUSCH or a PUCCH.

The following inventive concepts describe part 2 of multiplexing detail for channels with different priority indexes. According to an exemplary embodiment, the second UL channel is a PUSCH which is multiplexed with a third UCI, and the third UCI has the same priority index with the PUSCH where the coding rate of the second UCI is not larger than a threshold which is configured by the gNB or is a predetermined fixed value. The step of determining whether to multiplex a third plurality of UL channels may further include transmitting a third UL channel and stop transmitting a fourth UL channel of the third plurality of UL channels where the third UL channel has a higher priority index than the fourth UL channel. The coding rate of a UCI of the third UL channel could be larger than a threshold if the UCI is multiplexed with the fourth UL channel where the threshold could be determined by a gNB configuration or could be a fixed value.

The following inventive concepts describe part 3 of multiplexing detail for channels with different priority indexes. According to an exemplary embodiment, a coding rate or a change of the coding rate for a TB of the third UL channel could be larger than a threshold if the UCI in the fourth UL channel is multiplexed with the third UL channel where the threshold could be determined according to a gNB configuration or is a fixed value.

The following inventive concepts describe part 1 of channel prioritization. According to an exemplary embodiment, the step of determining whether to prioritize a fourth plurality of UL channels may further include stop transmitting a LP channel of the fourth plurality of UL channels at least for the portion that overlaps with a HP channel of the fourth plurality of UL channels if the LP channel overlaps with the HP channel in a time period. A multiplexing condition is not satisfied if the HP channel is multiplexed with the LP channel. Similarly, a multiplexing condition is not satisfied if a coding rate of a UCI of the HP channel multiplexed with the LP channel is not smaller than a threshold. Similarly, a multiplexing condition is not satisfied if the HP channel does not overlap with a DMRS symbol of LP channel.

The following inventive concepts describe part 2 of channel prioritization. According to an exemplary embodiment, the transmission of a UCI of the LP channel is in a second slot after stopping transmitting the LP channel in the first slot. The UCI could be transmitted via a PUCCH according to a gNB triggering by a DCI. The UCI could be transmitted together with another UCI which has the same priority index as the UCI. The UCI could be transmitted in a UL channel which has the same priority as the UCI.

As for inventive concepts related to the processing time, according to an exemplary embodiment, a time distance between a transmission for a UL channel of the first, second, third, or fourth plurality of UL channels and their corresponding DL reception (e.g., triggering DCI) is not smaller than a threshold which could be a fixed value and/or determined according to the subcarrier spacing of the DCI or the UL channel and could be defined as a number of symbols.

Figure 6:
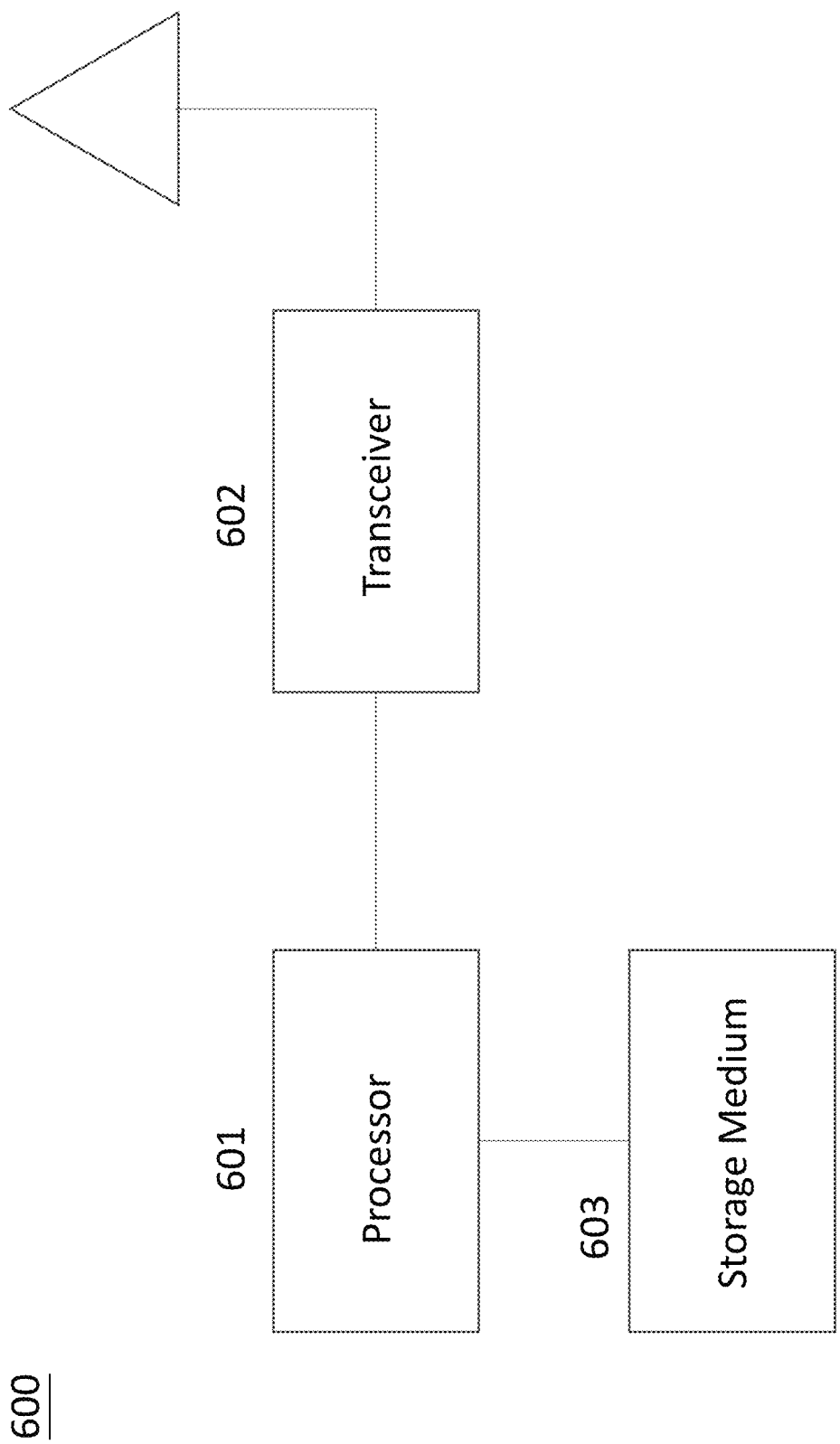
FIG. 6 illustrates the hardware block diagram of the UE that uses the method of FIG. 5 according to an exemplary embodiment of the disclosure.

FIG. 6 illustrates a hardware block diagram of a UE that uses the method described in FIG. 5A. The UE 600 may include not limited to a hardware processor 601, a wireless transceiver 602, and a non-transitory storage medium 603. The hardware processor 601 is electrically connected to the wireless transceiver 602 and the non-transitory storage medium 603 and configured at least for implementing the method as described in FIG. 5 and subsequent exemplary embodiments. The transceiver 602 could be one or more integrated or separate transceiver modules, and each of the transceiver modules may include one or more integrated or separated transmitters and receivers configured to transmit and receive signals respectively in the radio frequency or in the mmWave frequency. The transceiver 602 may also perform operations such as low noise amplifying, impedance matching, frequency mixing, up or down frequency conversion, filtering, amplifying, and so forth. The transceiver 602 may each include one or more analog-to-digital (A/D) and digital-to-analog (D/A) converters which are configured to convert from an analog signal format to a digital signal format during UL signal processing and from a digital signal format to an analog signal format during DL signal processing. The transceiver 602 may each further include an antenna array which may include one or multiple antennas to transmit and receive omni-directional antenna beams or directional antenna beams.

The hardware processor 601 is configured to process digital signals and to perform procedures of the proposed method in accordance with the proposed exemplary embodiments of the disclosure. Also, the hardware processor 601 may access the non-transitory storage medium 603 which stores programming codes, codebook configurations, buffered data, and record configurations assigned by the hardware processor 601. The hardware processor 601 could be implemented by using programmable units such as a microprocessor, a micro-controller, a DSP chips, FPGA, etc. The functions of the hardware processor 601 may also be implemented with separate electronic devices or ICs. It should be noted that the functions of hardware processor 601 may be implemented with either hardware or software.

Figure 7:
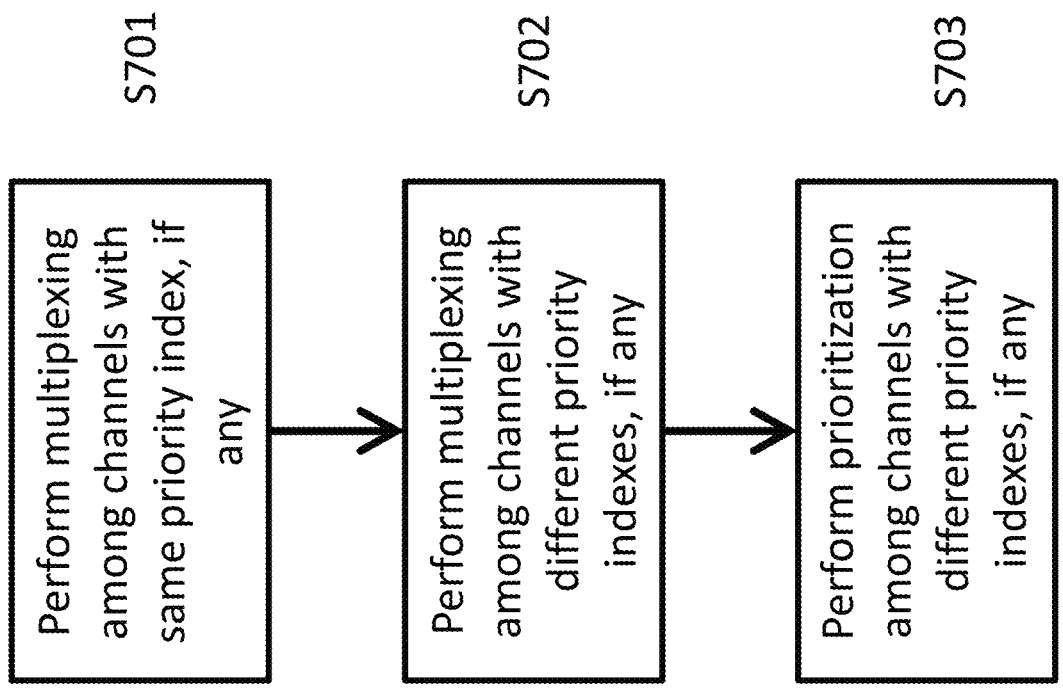
FIG. 7 illustrates a flow chart for Option 1 according to an exemplary embodiment of the disclosure.

In order for a UE to internally multiplex and prioritize different UL traffic when collisions among different occur, the disclosure provides four different options as shown in FIG. 7~FIG. 10. FIG. 7 illustrates a flow chart for Option 1 according to an exemplary embodiment of the disclosure. Referring to FIG. 7, in step S701, the UE may determine whether to perform multiplexing among channels such as PUCCH and PUSCH that have the same priority index including priority indexes 0 and priority index 1. In step S702, the UE may determine whether to perform multiplexing among channels having different priority indexes. In step S703, the UE may determine whether to perform prioritization among channel with different priority indexes.

Figure 8:
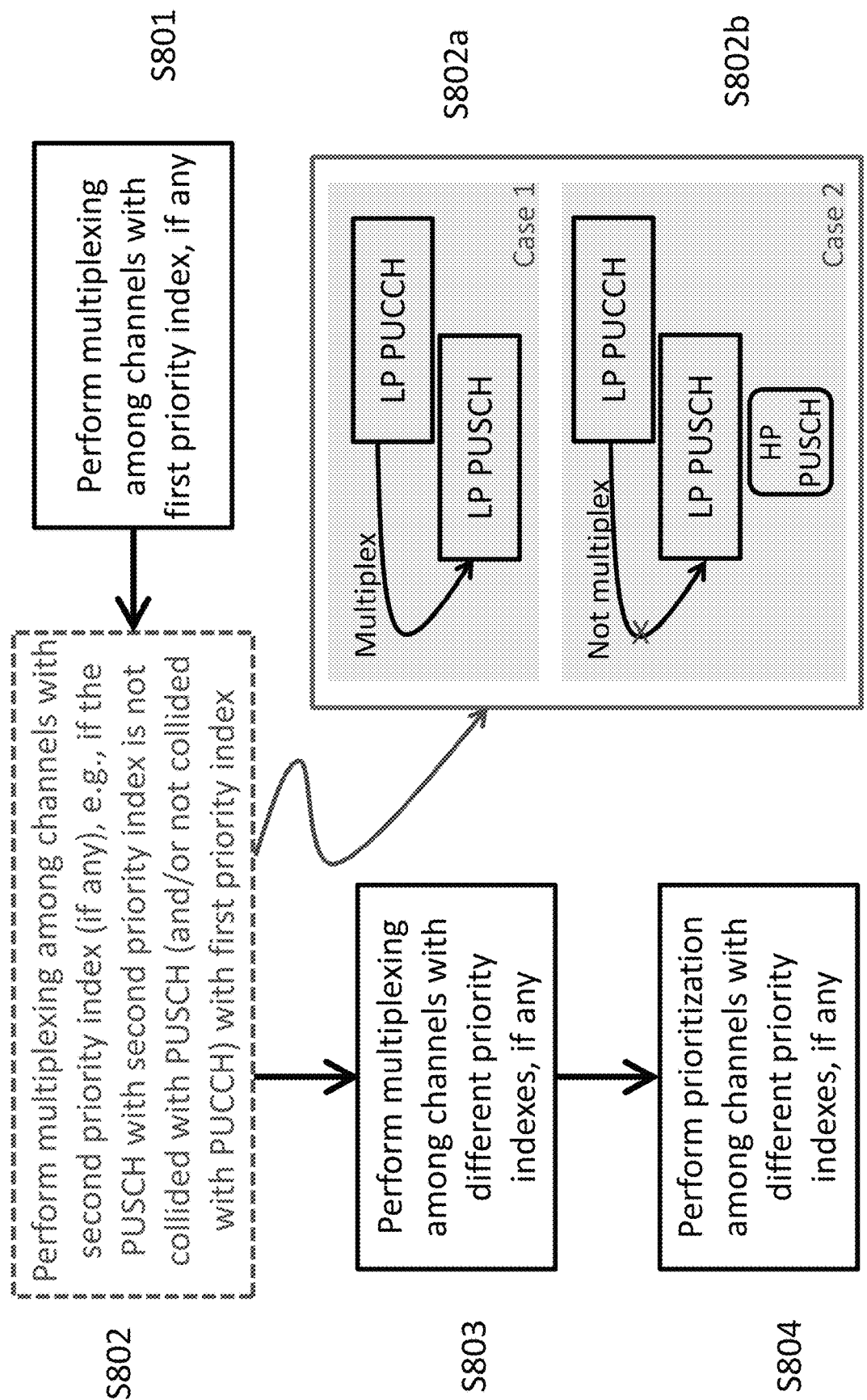
FIG. 8 illustrates a flow chart for Option 2 according to an exemplary embodiment of the disclosure.

FIG. 8 illustrates a flow chart for Option 2 according to an exemplary embodiment of the disclosure. Referring to FIG. 8, in step S801, the UE may determine whether to perform multiplexing among channels such as PUCCH and PUSCH having a first priority index or a priority index=1. In step S802, the UE may determine whether to perform multiplexing among channels having a second priority index or a priority index=0, if any. In step S802, there are two alternatives. In step S802a, the UE may perform multiplexing among two colliding channels having a second priority index. In step S802b, the UE may perform multiplexing among two colliding channels having a second priority index if one of such channels collides with a channel having a first priority index or a priority index=1. In step S803, the UE may determine whether to perform multiplexing among channels with different priority indexes. In step S804, the UE may determine whether to perform prioritization among channel with different priority indexes.

Figure 9:
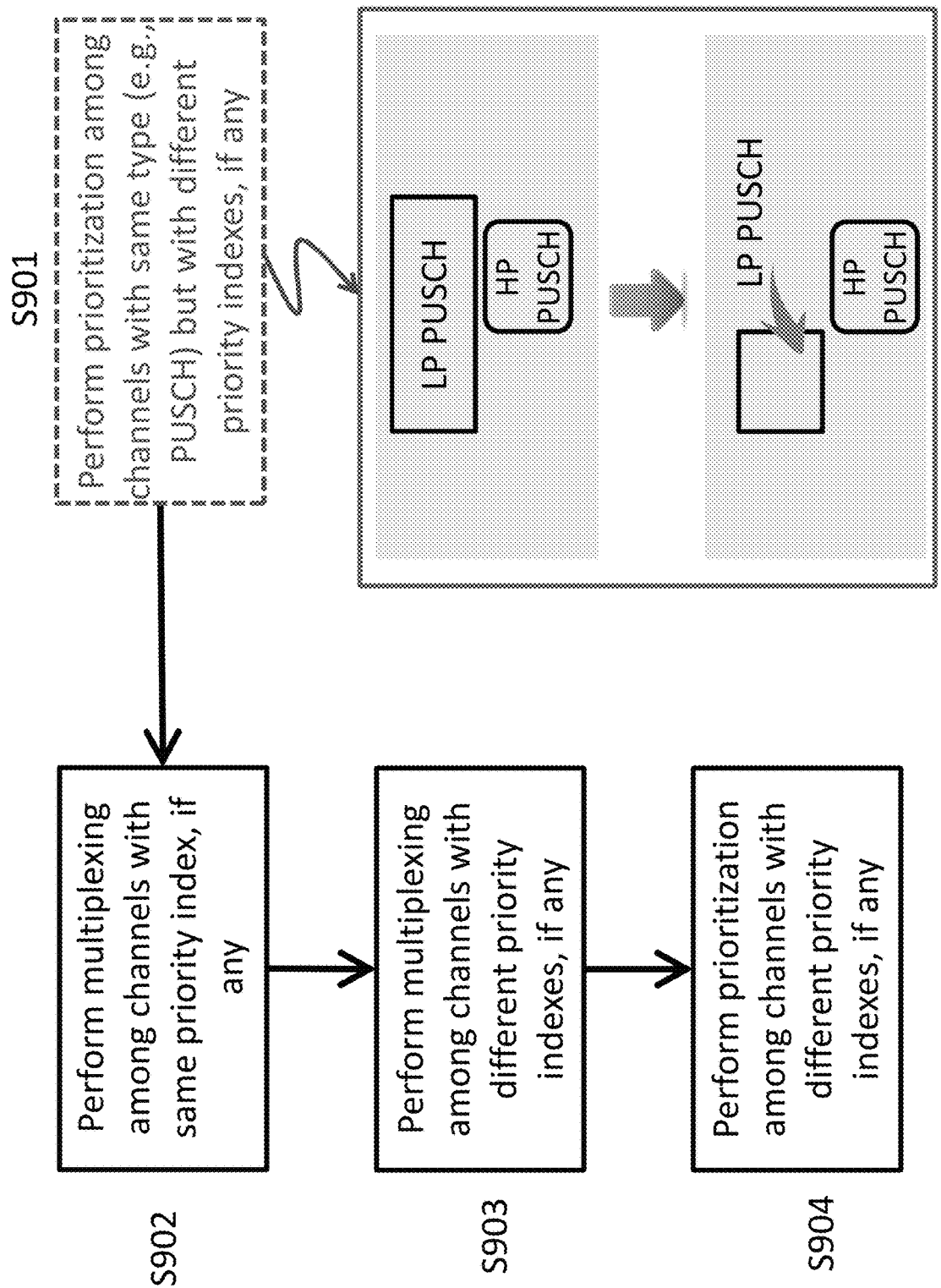
FIG. 9 illustrates a flow chart for Option 3 according to an exemplary embodiment of the disclosure.

FIG. 9 illustrates a flow chart for Option 3 according to an exemplary embodiment of the disclosure. Referring to FIG. 9, in step S901, the UE may determine whether to perform prioritization among channels with same type but with different priority indexes such as LP PUSCH and HP PUSCH. In step S902, the UE may determine whether to perform multiplexing among channels such as PUCCH and PUSCH (or LP PUCCH and HP PUCCH) that have the same priority index. In step S903, the UE may determine whether to perform multiplexing among channels having different priority indexes. In step S904, the UE may determine whether to perform prioritization among channel with different priority indexes.

Figure 10:
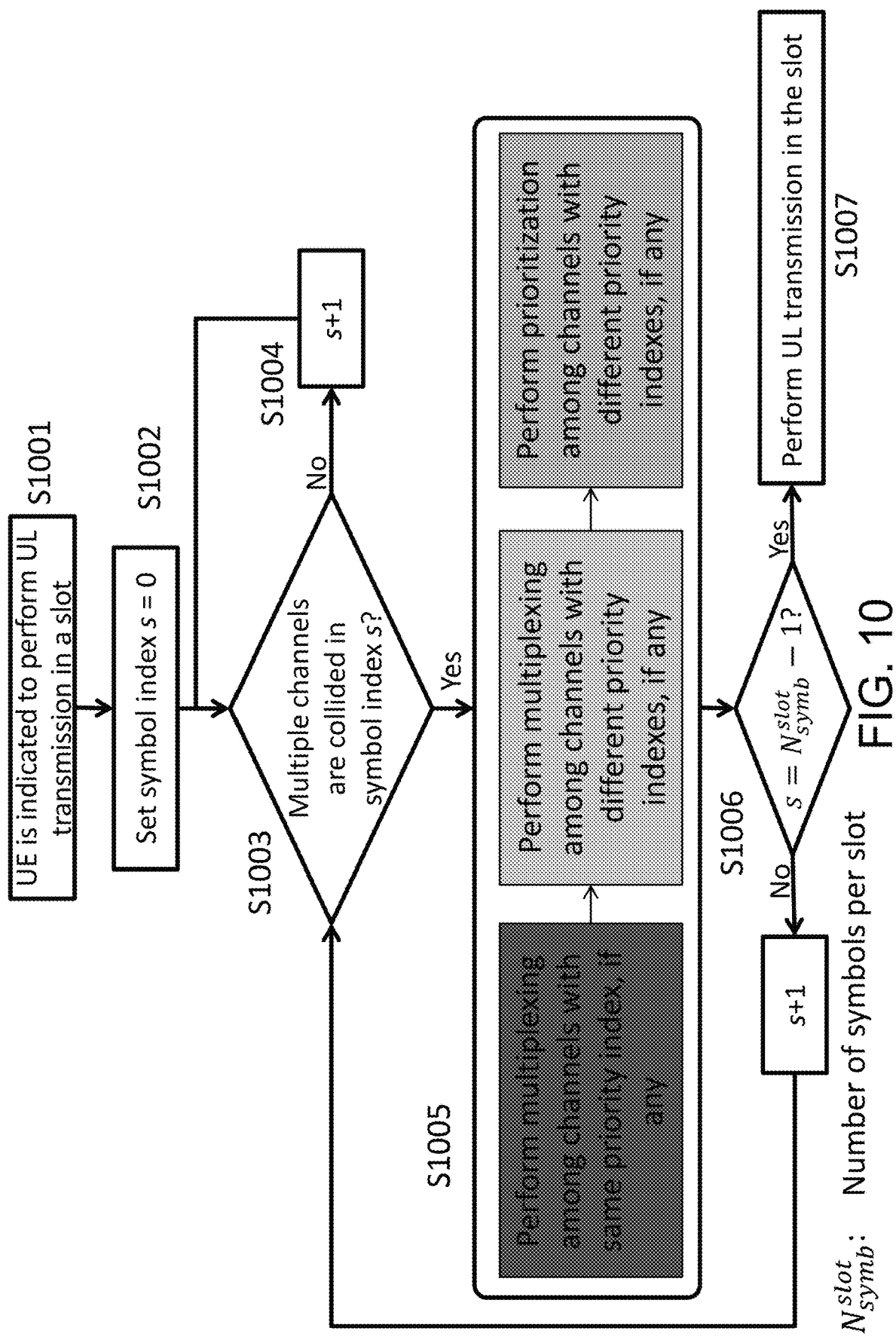
FIG. 10 illustrates a flow chart for Option 4 according to an exemplary embodiment of the disclosure.

FIG. 10 illustrates a flow chart for Option 4 according to an exemplary embodiment of the disclosure. In step S1001, the UE has been indicated to perform a UL transmission in a slot. In step S1002, the UE may set the symbol index s to zero. In step S1003, the UE may determine whether multiple channels have collided in symbol index s, for example, in time instance T1. If no, then in step S1004, the UE may increment the symbol index s by 1, for example, in time instance T2 and the process would proceed from step S1003. If yes, then in step S1005, the UE may determine whether to perform multiplexing among different channels having the same priority index, if any. Next, the UE may determine whether to perform multiplex among channels having different priority indexes, if any. Next, the UE may determine whether to perform periodization among channels having different priority indexes, if any. In step S1006, the UE may determine whether the symbol index s equals the number of symbols per slot minus 1. If no, then the symbol index s is incremented by 1 and the process would proceed from step S1003. If yes, then in step S1007, the UE may perform an UL transmission in the slot. The above described four options will be further explained with concrete examples.

When UL data of different channels having been triggered, the data of different channels having the same priority can be multiplexed according to the alternatives as shown in FIG. 11~FIG. 14 and as described by the corresponding written descriptions. For these alternatives, the same priority may mean that to the channels having the same priority index. For example, LP PUSCH has the same priority as LP PUCCH. For Alternative 1, the resource (or number of resource) of LP UCI being transmitted on the LP PUSCH could be determined according to the resource that is not dropped due to collisions. For example, referring to FIG. 11, LP PUCCH could be multiplexed into a first portion 1101 of LP PUSCH while the second portion 1102 of PUSCH could be dropped since the second portion 1102 of PUSCH collides with HP PUSCH 1103. It should be noted that alternative 1 would be applicable for Option 2 and Option 3 which are previously described.

Figure 12:
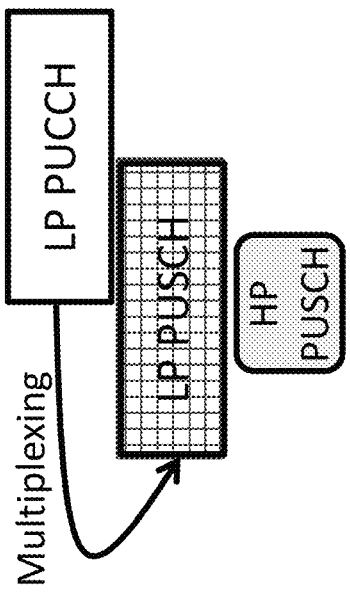
FIG. 12 illustrates Alternative 2 of multiplexing among channels with the same priority according to an exemplary embodiment of the disclosure.

For Alternative 2, the resource (e.g., number of resource) of LP UCI on the LP PUSCH could be determined according to the resource of the (entire) LP PUSCH. In other words, referring to the example as shown in FIG. 12, the resource of LP PUCCH could be multiplexed into LP PUSCH as the resource of LP PUSCH is for determining the resource of multiplexing HP UCI.

Figure 13:
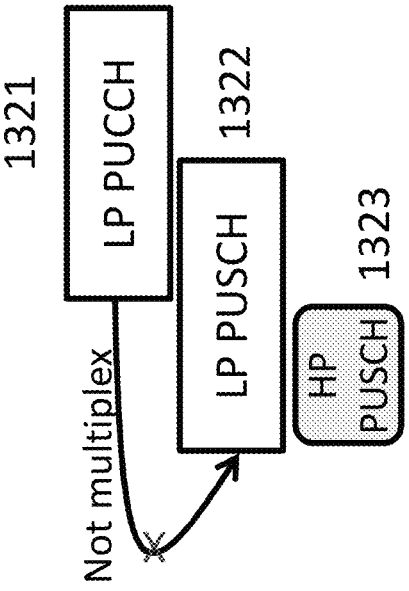
FIG. 13 illustrates Alternative 3 of multiplexing among channels with the same priority according to an exemplary embodiment of the disclosure.
Figure 11:
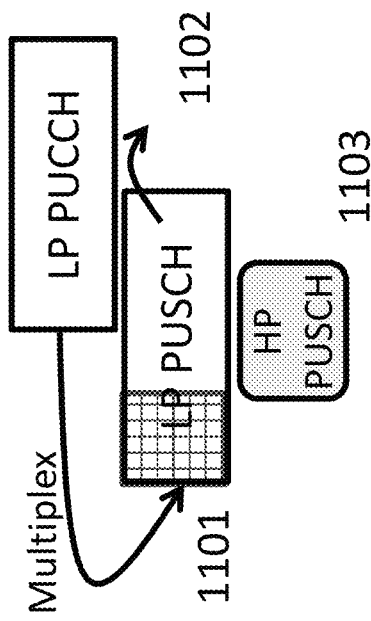
FIG. 11 illustrates Alternative 1 of multiplexing among channels with the same priority according to an exemplary embodiment of the disclosure.
Figure 21:
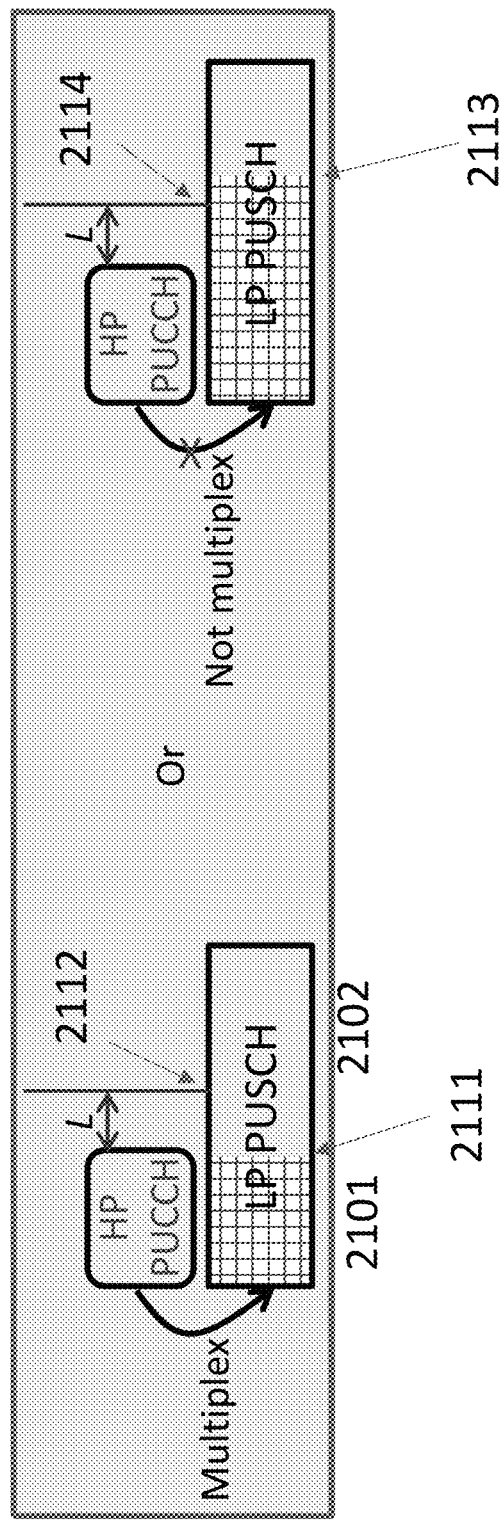
FIG. 21 illustrates Alternative E1 of multiplexing among channels with different priority according to an exemplary embodiment of the disclosure.

For Alternative 3, an UL channel such as a PUSCH or LP PUSCH for multiplexing UCI having the same priority index such as LP UCI may not overlap with another channel (e.g. HP PUSCH) that has a higher priority than PUSCH. Referring to FIG. 13, for the first scenario, the LP PUSCH 1312 for multiplexing LP UCI which has the same priority index does not overlap with another channel such as HP PUSCH that has a higher priority than the LP PUSCH 1312. Thus, LP PUCCH 1311 could be multiplexed into LP PUSCH 1312. However, the LP PUSCH 1322 does overlap with the HP PUSCH 1323 that has a higher priority than the LP PUSCH 1322 and thus the LP PUCCH 1321 does not multiplex into LP PUSCH 1322. It should be noted that it may not be worth it to multiplex a UCI in an uplink control resource that may be dropped because of prioritization reasons as such endeavor could be unnecessary and may lower the efficiency of a transmission.

A LP UCI could be multiplexed into a LP PUSCH if the reliability of the LP UCI can be satisfied. Similarly, a HP UCI could be multiplexed into a HP PUSCH if the reliability of the HP UCI can be satisfied. For example, the reliability of the LP or HP UCI can be satisfied if the coding rate or a change of coding rate of the LP or HP UCI is smaller or not larger than a threshold which could be determined by a gNB or is a predetermined fixed value. Otherwise, the LP or HP UCI may not be multiplexed in the LP or HP PUSCH. In the example of FIG. 14, the LP PUCCH could be multiplexed into LP PUSCH if the coding rate or a change of coding rate of the LP UCI corresponding to the LP PUCCH is smaller than a threshold. Otherwise, LP UCI may be not multiplexed into LP PUSCH. In another example, the LP PUCCH in the FIG. 14 may be a HP PUCCH. In such case, the HP PUCCH could be multiplexed into LP PUSCH if the coding rate or a change of coding rate of the HP UCI corresponding to the HP PUCCH is smaller than a threshold. Otherwise, HP UCI may be not multiplexed into LP PUSCH.

Next, FIG. 15~FIG. 35 and their corresponding written descriptions describe the mechanism of multiplexing among channels that have different priorities. For Alternative A, the resource of HP UCI on the LP PUSCH (or the resource of LP UCI on the HP PUSCH/PUCCH) could be determined according to the resource that is not dropped due to collisions. As shown in FIG. 15, the UCI on the HP PUCCH is multiplexed into a first portion of LP PUSCH 1501, but a second portion of LP PUSCH 1502 is dropped because it overlaps with HP PUSCH according to the prioritization.

For Alternative B, the resource of HP UCI on the LP PUSCH (or the LP UCI on the HP PUSCH/PUCCH) could be determined according to the resource of LP (or HP) PUSCH/PUCCH. As shown in FIG. 16, a HP UCI in the HP PUCCH could be multiplexed into LP PUSCH, and the HP UCI in the HP PUCCH could be multiplexed in the LP PUSCH if the reliability of the HP UCI can be satisfied. For example, if the coding rate or a change of coding rate of the HP UCI is smaller (not larger) than a threshold which could be configured by the gNB or is a predetermined fixed value, then the reliability of the HP UCI can be satisfied. Otherwise, the HP UCI in the HP PUCCH could not be multiplexed into the LP PUSCH.

For Alternative C, a LP PUSCH for multiplexing UCI having a different priority index (e.g. HP UCI) may not overlap with another channel (e.g. HP PUSCH) which has a higher priority than the LP PUSCH. As shown in FIG. 17, the HP UCI in the HP PUCCH 1701 could be multiplexed into LP PUSCH 1702. However, the HP UCI in the HP PUCCH 1711 may not be multiplexed into LP PUSCH 1712 since the LP PUSCH 1712 overlaps with the HP PUSCH 1713. It should be noted that it may not be worth it to transmit a LP UL-shared channel (UL-SCH) that has a shortened resource and is shared with a HP UCI.

For Alternative D1, A HP UCI could be multiplexed in a PUSCH if the reliability of the HP UCI can be satisfied. The reliability of the HP UCI can be satisfied if a coding rate or a change of coding rate of the HP UCI is smaller (or not larger) than a threshold which could be determined according to a gNB configuration or is a predetermined fixed value. Otherwise, the HP UCI may not be multiplexed into the LP PUSCH. As shown in FIG. 18, if a coding rate or a change of coding rate of the HP UCI in the HP PUCCH is smaller (or not larger) than a threshold, then the HP PUCCH could be multiplexed into the LP PUSCH. Otherwise, the HP PUCCH may not be multiplexed into the LP PUSCH if the reliability of the HP UCI in the HP PUCCH cannot be satisfied.

For Alternative D2, A LP UCI could be multiplexed with a HP UCI if the reliability of the HP UCI can be satisfied. The reliability of the HP UCI can be satisfied if a coding rate or a change of coding rate of the HP UCI is smaller (or not larger) than a threshold which could be determined according to a gNB configuration or is a predetermined fixed value. The reliability of the HP UCI can be satisfied if the payload size of the LP UCI is smaller (or not larger) than a value which could be determined according to a gNB configuration or is a predetermined fixed value. Moreover, the reliability of the HP UCI could be considered to be satisfied only if both criteria above are satisfied. Otherwise, the HP UCI may not be multiplexed with a LP UCI. As shown in FIG. 19, if a coding rate or a change of coding rate of the HP UCI in the HP PUCCH is smaller (or not larger) than a threshold and/or the payload size of the LP UCI in the LP PUCCH is smaller (or not larger) than a value then the LP PUCCH could be multiplexed into the HP PUCCH. Otherwise, the LP PUCCH may not be multiplexed into the HP PUSCH if the reliability of the HP UCI in the HP PUCCH cannot be satisfied. It should be noted that "the LP PUCCH could be multiplexed in the HP PUCCH" may imply that "a LP UCI in the LP PUCCH could be multiplexed with a HP UCI in the same uplink channel (e.g., HP PUCCH)".

For the Alternative D3, a LP UCI could be multiplexed in a HP PUSCH if the reliability of a transport block (TB) in the HP PUSCH can be satisfied. The reliability of the TB in the HP PUSCH could be satisfied if a coding rate or an increase of the code rate for the TB is smaller (or not larger) than a threshold which could be determined according to a gNB configuration. Otherwise, the LP UCI may not be multiplexed in the HP PUSCH. As shown in FIG. 20, a LP UCI in LP PUCCH could be multiplexed into the HP PUSCH if the coding rate or increase of the code rate for the TB is smaller than a threshold. Otherwise, the LP UCI in the LP PUCCH may not be multiplexed into the HP PUSCH.

For Alternative E1, a HP UCI could be multiplexed in a LP PUSCH if the latency of the HP UCI can be satisfied. The latency of the HP UCI may be determined according to the last symbol of the HP PUCCH. In other words, if the HP UCI is to be multiplexed into the LP PUSCH, the last symbol of the LP PUSCH which carries the HP UCI should not exceed L symbol after the last symbol of the HP PUCCH, wherein the L is a latency threshold. The latency L may be determined according to a gNB configuration or according to a subcarrier spacing (SCS) UL transmission. For other example, the length L may not have existed, i.e., L=0. As shown in the left half of FIG. 21, considering that the HP PUCCH may potentially be multiplexed into LP PUSCH which includes a first portion 2101 containing a resource for the HP UCI from HP PUCCH and a remaining portion 2102, the HP PUCCH could be multiplexed into LP PUSCH if the last symbol of HP UCI 2111 in the LP PUSCH would not exceed the length L after the last symbol of LP PUCCH 2112. On the contrary, as shown in the right half of FIG. 21, since the last symbol of HP UCI 2113 has gone past the point 2114 in the LP PUSCH and thus there is not sufficient for the latency requirement of HP UCI, the HP PUCCH may not be multiplexed into LP PUSCH.

For alternative E2, HP UCI in HP PUCCH may be multiplexed into LP PUCCH if the latency of HP UCI is satisfied, and the latency of HP UCI may be determined according to whether a length after the end of the last symbol of HP PUCCH could later than the end of last symbol of LP PUCCH or determined according to whether the length (e.g., in number of symbol) of the LP PUCCH is less than a threshold. HP UCI in HP PUCCH could not be multiplexed into LP PUCCH if the end of the last symbol of LP PUCCH is later than a length L1 after the end of last symbol of HP PUCCH or the length of LP PUCCH is larger than a length L2. The length L1 and L2 could be set according to a gNB configuration or a SCS of UL transmission such as by HP PUCCH or LP PUCCH. For other example, the length L1 may not existed, i.e., L1=0. For example, the LP PUCCH could be a LP PUSCH.

Figure 22:
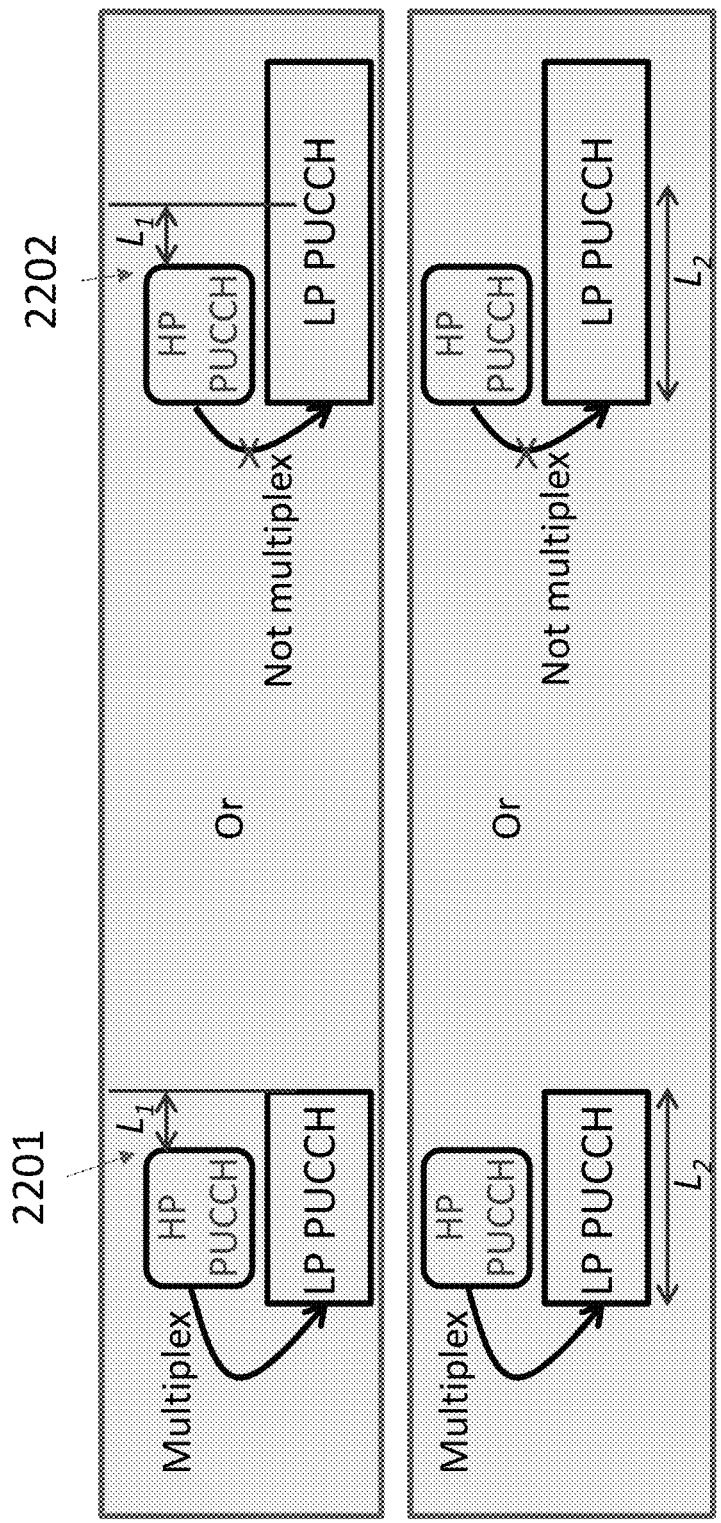
FIG. 22 illustrates Alternative E2 of multiplexing among channels with different priority according to an exemplary embodiment of the disclosure.

As shown in top half of FIG. 22, since the end of last symbol of LP PUCCH does not later than the end of last symbol of HP PUCCH extended by L1, the latency of HP UCI is satisfied and thus HP UCI could be multiplexed into LP PUCCH whereas the end of last symbol of LP PUCCH is later than the end of last symbol of HP PUCCH extended by L1 and thus HP UCI could not be multiplexed into LP PUCCH since the latency of HP UCI is not satisfied. As shown in the bottom half of FIG. 22, since the length of LP PUCCH is not larger than L2, the latency of HP UCI is satisfied and thus HP PUCCH could be multiplexed into LP PUCCH whereas the length of LP PUCCH extended by L2 and thus HP PUCCH could not be multiplexed into LP PUCCH since the latency of HP UCI is not satisfied.

Figure 23:
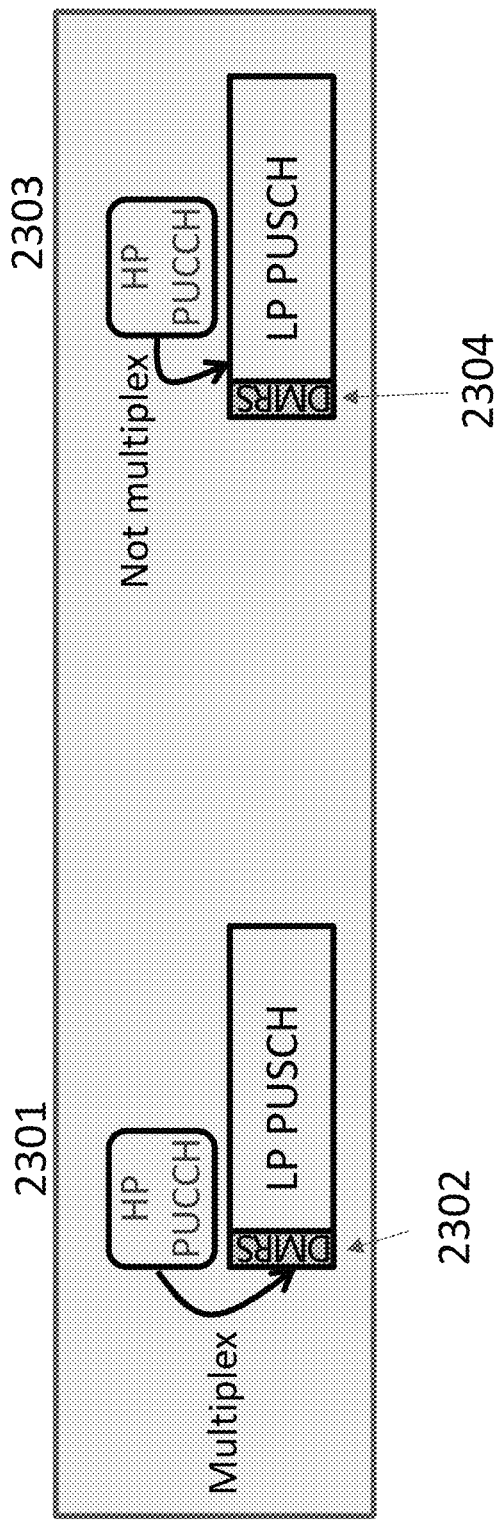
FIG. 23 illustrates Alternative F of multiplexing among channels with different priority according to an exemplary embodiment of the disclosure.

For Alternative F, HP UCI in HP PUCCH could be multiplexed into LP PUSCH if HP PUCCH overlaps with the demodulation reference signal (DRMS) symbol of the LP PUSCH. As shown in FIG. 23, since HP PUCCH 2301 overlaps with DRMS 2302 of LP PUSCH, the HP UCI in HP PUCCH 2301 may be multiplexed into LP PUSCH. On the contrary, since HP PUCCH 2303 does not overlap with DRMS 2304 of LP PUSCH, the HP UCI in HP PUCCH 2303 may not be multiplexed into LP PUSCH.

Figure 24:
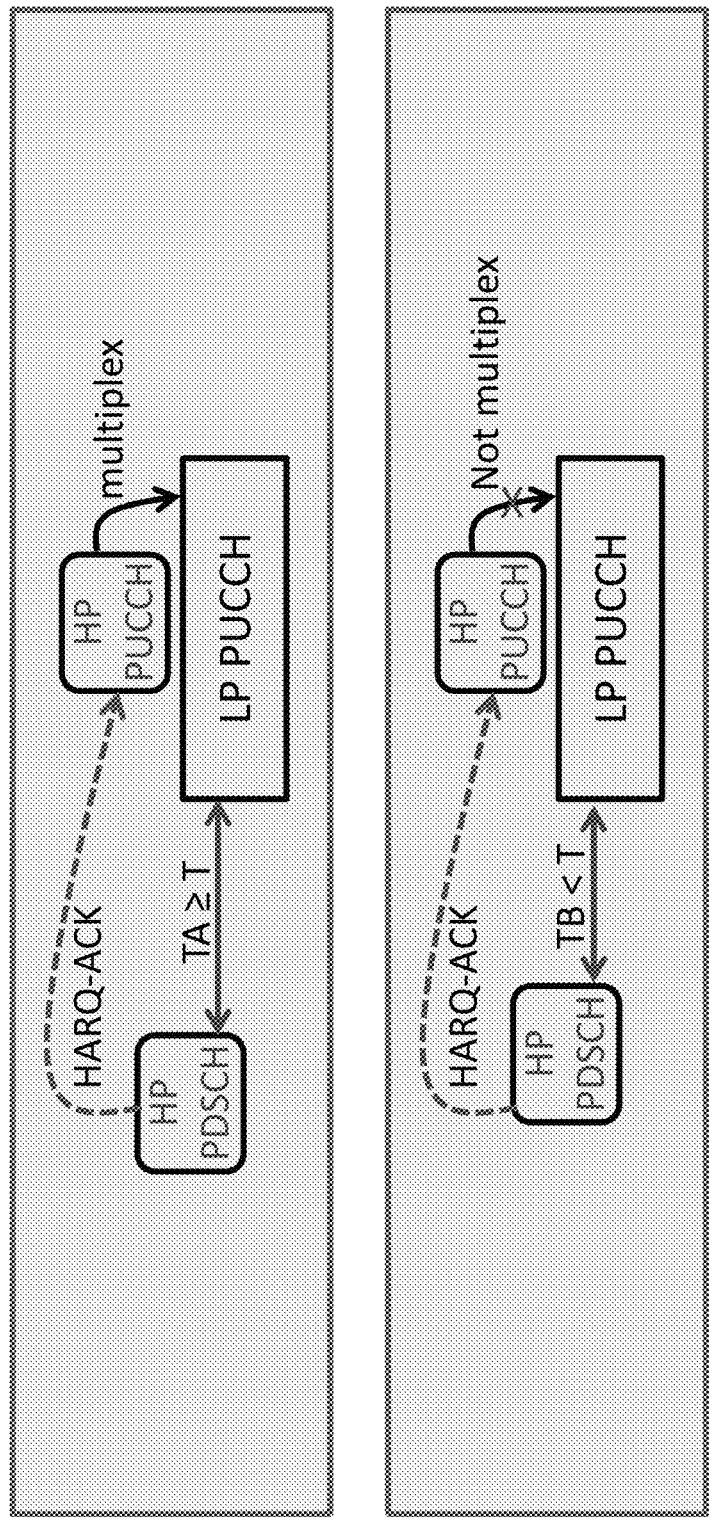
FIG. 24 illustrates Alternative G of multiplexing among channels with different priority according to an exemplary embodiment of the disclosure.

For Alternative G, a HP UCI could be multiplexed into a LP PUCCH if a processing time is satisfied. The processing time may require a minimum time, a time threshold T, which could be determined according to a duration between the beginning of a first symbol of LP PUCCH and the end of the last symbol of a DL signal or channel correspond to the HP UCI. The time threshold T could be a fixed value and/or determined according to a SCS of a UL transmission such as LP PUCCH or HP PUCCH. If the processing time is less than the time threshold T, a HP UCI may not be multiplexed into a LP PUCCH. As shown in FIG. 24, since the time duration TA between the beginning of the first symbol of LP PUCCH and the end of the last symbol of the DL channel or signal which is HP PDSCH is greater than or equal to the time threshold T, the HP UCI in HP PUCCH could be multiplexed into LP PUCCH. On the contrary, since the time duration TB between the beginning of the first symbol of LP PUCCH and the end of the last symbol of the DL channel or signal which is HP PDSCH is less than the time threshold T, the HP UCI in HP PUCCH could not be multiplexed into LP PUCCH.

Figure 25:
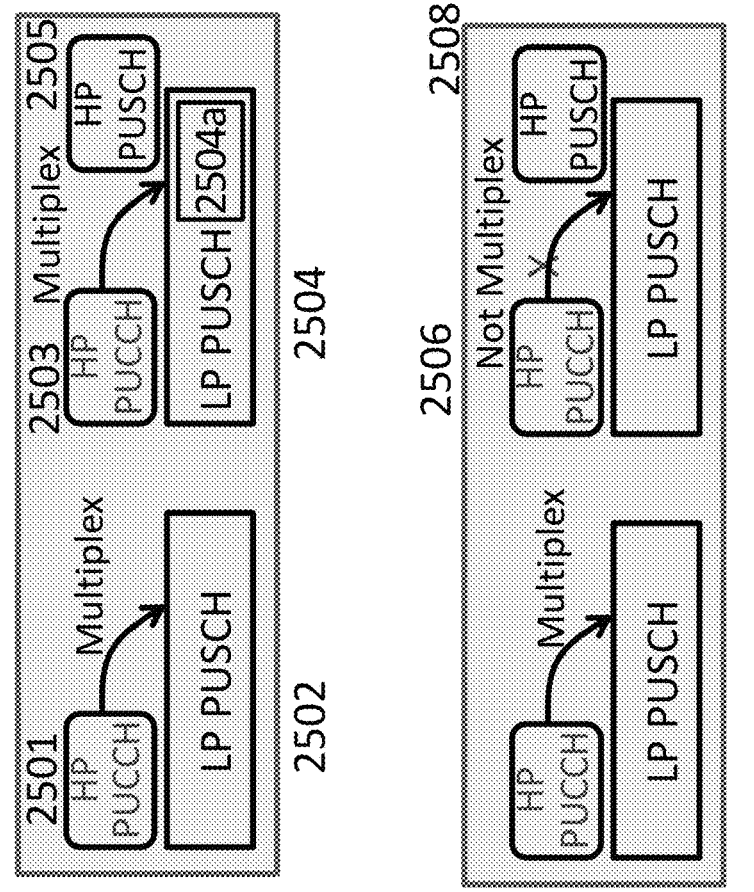
FIG. 25 illustrates an example of multiplexing among channels with different priority according to an exemplary embodiment of the disclosure.

FIG. 25 shows several examples of multiplexing channels of different priorities. As shown in FIG. 25, HP PUCCH 2501 may multiplex into LP PUSCH 2501 if HP PUCCH 2502 and LP PUSCH 2502 overlap in time. Also, HP UCI in HP PUCCH 2503 could be multiplexed into LP PUSCH 2504 if HP PUSCH 2503 and HP PUSCH 2505 overlap with LP PUSCH 2504 in time. According to Alternative A, a number of resource(s) for multiplexing the HP UCI may be determined according to the resource of LP PUSCH, and according to Alternative B, the number of resource(s) for multiplexing the HP UCI may be determined according to the resource of LP PUSCH that does not collide with HP PUSCH. According to Alternative C, HP PUCCH 2506 may not be multiplexed into LP PUSCH 2507 since LP PUSCH 2507 overlaps with HP PUSCH 2508 which has a higher priority index than LP PUSCH 2507.

Figure 26:
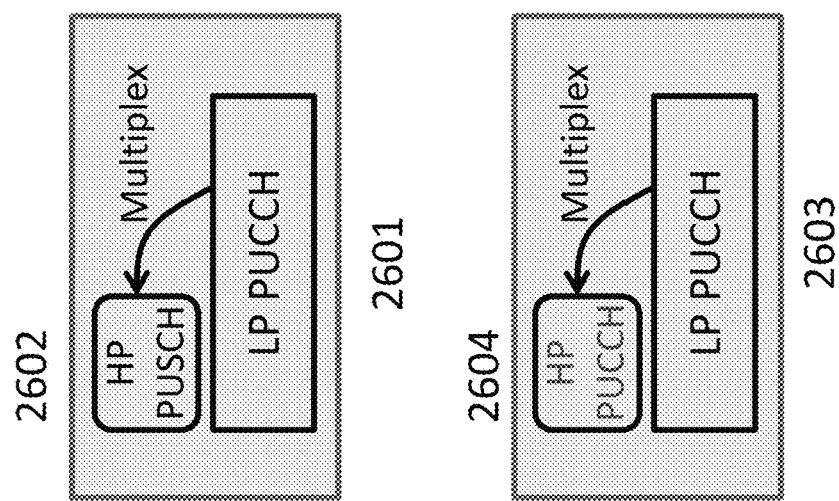
FIG. 26 illustrates an example of multiplexing among channels with different priority according to an exemplary embodiment of the disclosure.

FIG. 26 shows two more multiplexing channels of different priorities. As shown in FIG. 26, LP UCI in LP PUCCH 2601 could be multiplexed into HP PUSCH 2602 which could be with or without HP UCI since LP PUCCH 2601 and HP PUSCH 2602 overlaps in time. Also, LP UCI in LP PUCCH 2603 could be multiplexed with HP UCI which could be in HP PUCCH 2604 or another PUCCH resource if LP PUCCH 2603 and HP PUCCH 2604 overlap in time.

It should be noted that for all the Alternatives provided thus far for multiplexing among channels with the same or different priorities, the UE may determine which Alternative(s) to implement according to, for example, UE capability and/or gNB configuration. Next, the disclosure provides a prioritization mechanism for channels having the same or different priorities. The priority of channels is ordered as follows: (1) Physical Random-Access Channel (PRACH) on a primary cell (Pcell) has the highest transmission priority. (2) PUCCH or PUSCH transmission with a higher priority index where the PUCCH or PUSCH may or may not be multiplexed with UL control information indicated with a lower priority. (3) PUCCH or PUSCH transmissions with a lower priority index and multiplexed with UL control information indicated with a higher priority. (4) PUCCH or PUSCH transmissions with a lower priority index. Scenarios of PUCCH or PUSCH transmissions having the same priority index may include PUCCH transmissions with HARQ-ACK information and/or SR or PUSCH transmission with HARQ-ACK information, PUCCH transmissions or PUSCH transmissions with CSI, PUSCH transmissions without HARQ-ACK information or CSI and/or Type-2 random access procedure, PUSCH transmissions on PCell, and etc.

Figure 27:
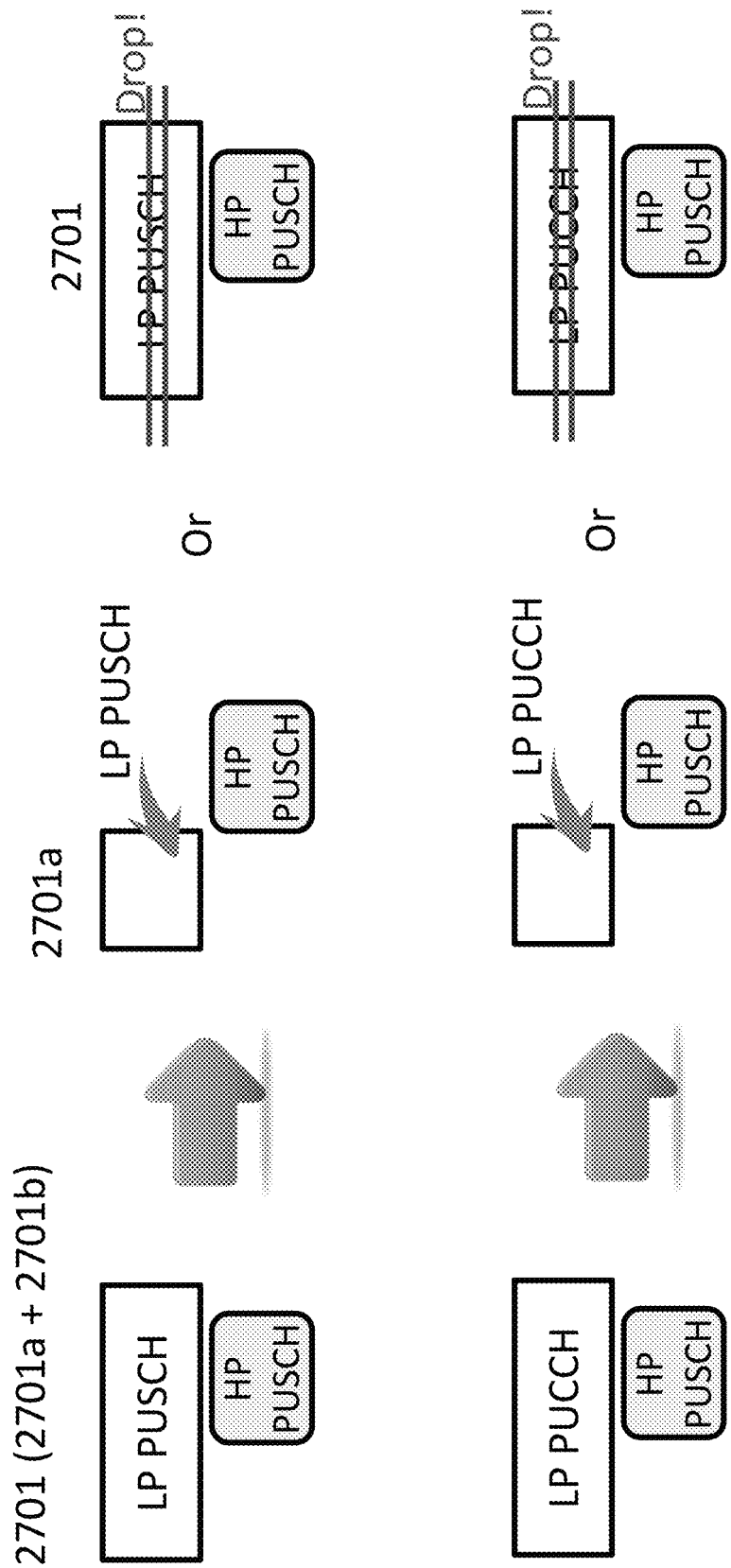
FIG. 27 illustrates a concept of prioritization of channels according to an exemplary embodiment of the disclosure.

To describe the concept of prioritization of channels, one rule that could be applied for prioritization is to stop transmitting lower priority channel at least for the portion that overlap with higher priority one or to drop the lower priority channel in its entirety. As shown in the example of FIG. 27, if LP PUSCH 2701 having a first portion 2701a that does not collide with HP PUSCH 2702 in time and a second portion 2701b that collides with HP PUSCH in time, the second portion 2702b could be dropped and only the first portion 2701a is transmitted. Alternatively, the entirety of HL PUSCH could be dropped. Similarly, if LP PUCCH collides with HP PUSCH, the portion of LP PUCCH that does not collide with HP PUSCH could be transmitted and the portion of LP PUCCH that collides with HP PUSCH could be dropped. In detail, the LP PUCCH may be cancelled at latest from the first symbol that is overlapped with the HP PUSCH. Alternatively, the entirety of HL PUSCH could be dropped. However, the LP PUSCH and LP PUCCH could be dropped in its entirety under certain conditions.

Figure 28:
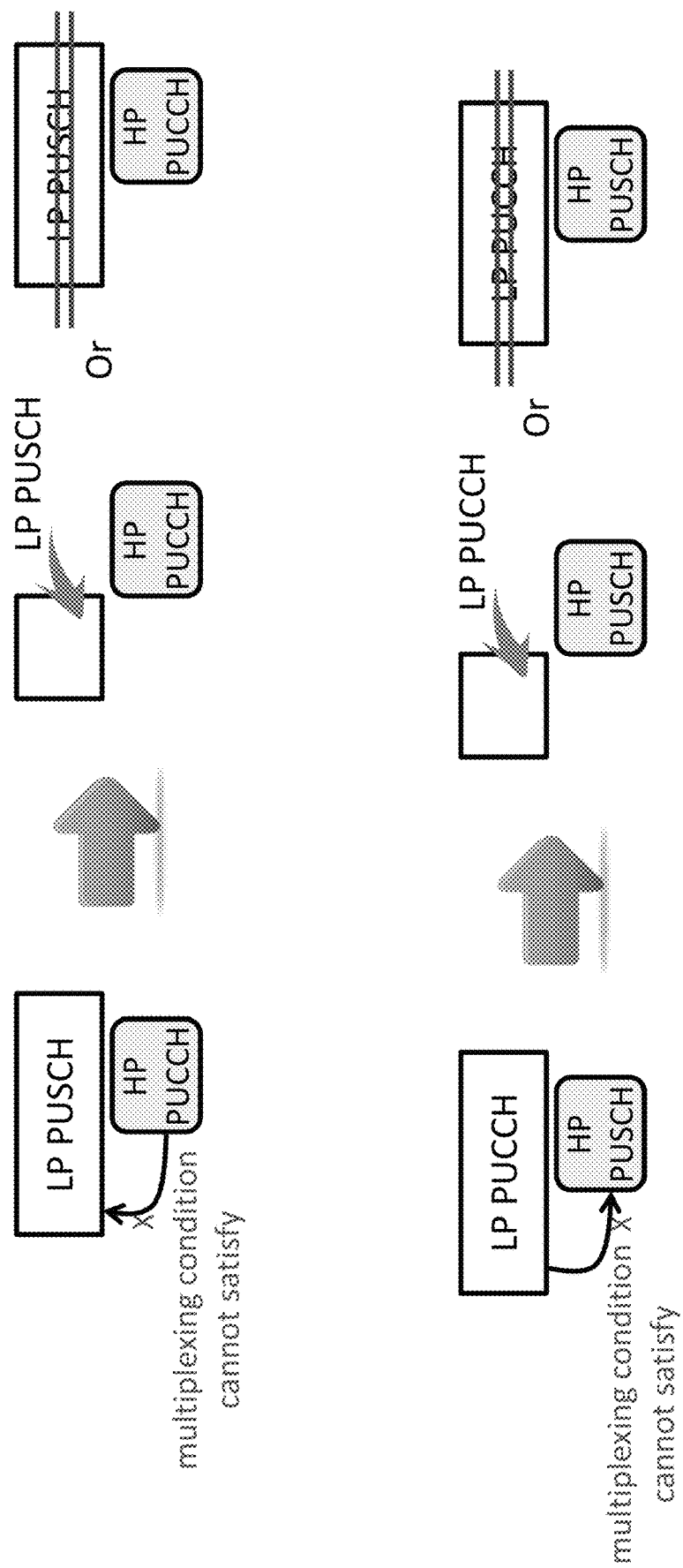
FIG. 28 illustrates an example of prioritization of channels according to an exemplary embodiment of the disclosure.

FIG. 28 shows another example of prioritization of channels similar to FIG. 27. As shown in FIG. 28, LP PUSCH could either be dropped in its entirety or only the portion of LP PUSCH that does not collide with HP PUCCH is transmitted if LP PUSCH collides with HP PUCCH, and if a condition of channel multiplexing cannot be satisfied. The condition of channel multiplexing cannot be satisfied if, for example, a coding rate or a change of coding rate of the HP UCI in HP PUCCH is larger than a threshold which could be determined according to a gNB configuration or is a predetermined fixed value. Similarly, LP PUCCH could either be dropped in its entirety or only the portion of LP PUCCH that does not collide with HP PUSCH is transmitted if LP PUCCH collides with HP PUSCH, and if a condition of channel multiplexing cannot be satisfied. The condition of channel multiplexing cannot be satisfied if, for example, an increase of a coding rate for a TB in the HP PUSCH is larger than a threshold if the TB is to be multiplexed with LP UCI, and the threshold could be determined according to a gNB configuration or is a predetermined fixed value.

In general, prioritization of channels is according to one or more of the following rules. According to Rule 1, drop LP PUSCH at least for the portion that collides with HP PUSCH or in its entirety. As shown in FIG. 29, since LP PUSCH has collided with HP PUSCH, only portion of PUSCH that does not collide with HP PUSCH is transmitted. According to Rule 2, drop LP PUSCH if it collides with HP PUCCH which may occur if, for example, the UE has decided not to multiplex HP UCI in the LP PUSCH. FIG. 30 shows an example based on the applications of Rule 1 and Rule 2. As LP PUSCH collides with HP PUCCH and HP PUSCH, in step S3001, the portion of LP PUSCH which collides with HP PUSCH is dropped (Rule 1). In step S3002, the portion of LP PUSCH which collides with HP PUCCH is dropped (Rule 2). In summary, the LP PUCCH may be cancelled at latest from the first symbol that is overlapped with the HP PUCCH.

Figure 31:
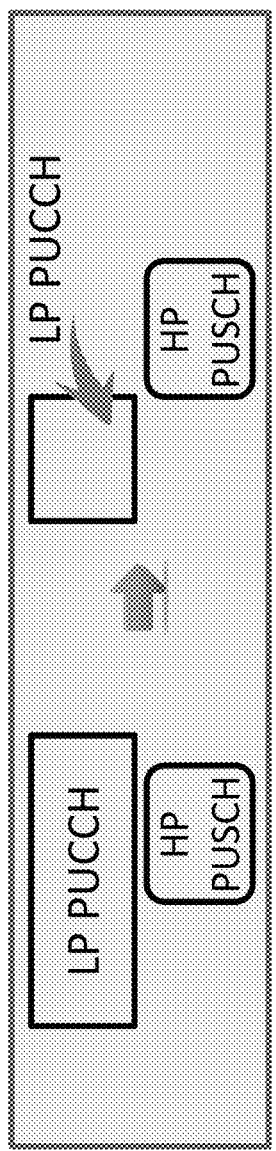
FIG. 31 illustrates prioritization Rule 3 for prioritization of channels according to an exemplary embodiment of the disclosure.

According to Rule 3, if LP PUCCH collides with HP PUSCH, drop LP PUCCH in its entirety or the portion that collides with HP PUSCH. As shown in FIG. 31, after LP PUCCH collides with HP PUSCH in time, the portion of LP PUCCH that collides with HP PUSCH in time is dropped while the portion of LP PUCCH that does not collide with HP PUSCH is transmitted.

Figure 32:
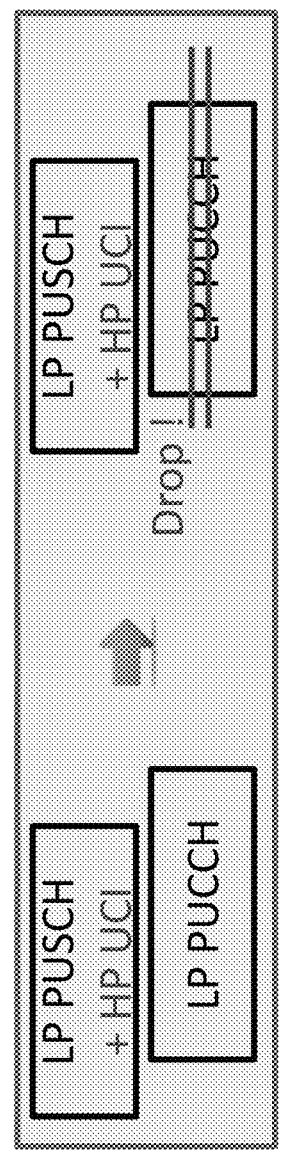
FIG. 32 illustrates prioritization Rule 4 for prioritization of channels according to an exemplary embodiment of the disclosure.

According to Rule 4, if LP PUCCH collides with LP PUSCH which has been multiplexed with HP UCI, drop the LP PUCCH so that only UCI having with a single priority index can be multiplexed into a PUSCH. As the result of Rule 4, all the UCI(s) multiplexed into a PUSCH would have the same priority index which would likely be the highest priority index. As shown in FIG. 32, after LP PUSCH and LP PUCCH collides, LP PUCCH is dropped and only HP UCI is multiplexed into LP PUSCH.

According to Rule 5, drop LP PUSCH if it is collided with HP PUCCH and if condition(s) of channel multiplexing cannot be satisfied. The condition(s) of channel multiplexing cannot be satisfied if, for example, the reliability and/or latency of HP UCI cannot be satisfied. The reliability and/or latency of HP UCI requirement is similar to Alternative D1 and also Alternative E1 and E2 and thus a description is not repeated. As shown in FIG. 33, since LP PUSCH collides with HP PUCCH, the portion of LP PUSCH that collides with HP PUCCH in time is dropped assuming that the condition(s) of channel multiplexing for HP UCI in HP PUCCH cannot be satisfied.

According to Rule 6, drop LP PUCCH if it is collided with HP PUSCH and if condition(s) of channel multiplexing cannot be satisfied. The condition(s) of channel multiplexing cannot be satisfied if, for example, the reliability of the TB in the HP PUSCH could not be satisfied. The reliability of the TB in the HP PUSCH could not be satisfied if a coding rate or an increase of the code rate for the TB is larger (or not smaller) than a threshold which could be determined according to a gNB configuration. As shown in FIG. 34, since LP PUSCH collides with HP PUCCH, the portion of LP PUSCH that collides with HP PUCCH in time is dropped assuming that the condition(s) of channel multiplexing for HP UCI in HP PUCCH cannot be satisfied.

Figure 35:
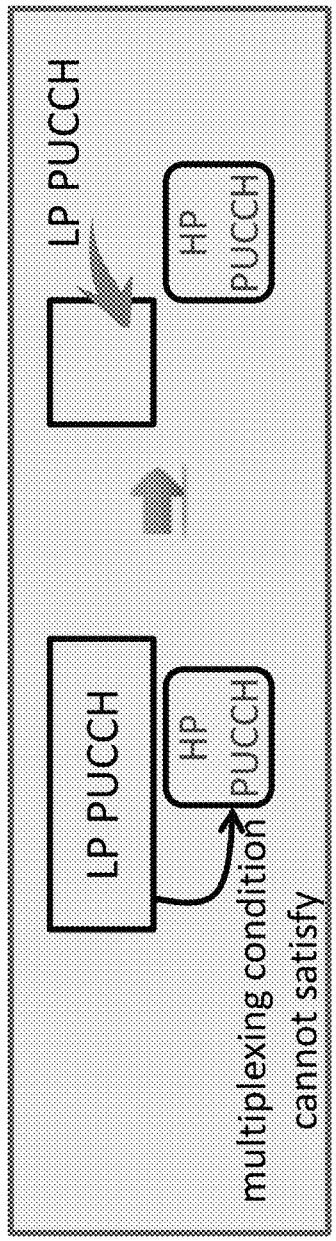
FIG. 35 illustrates prioritization Rule 7 for prioritization of channels according to an exemplary embodiment of the disclosure.

According to Rule 7, Drop LP PUCCH if it is collided with HP PUCCH and if condition(s) of channel multiplexing cannot be satisfied. The condition(s) of channel multiplexing cannot be satisfied if reliability of HP UCI could not be satisfied. Whether the reliability of HP UCI could be satisfied is the same as previously described Alternatives. As shown in FIG. 35, since LP PUCCH has collides with HP PUCCH and also the multiplexing condition(s) cannot be satisfied, the portion of LP PUCCH that collides with HP PUCCH has been dropped. In detail, the LP PUCCH may be cancelled at latest from the first symbol that is overlapped with the HP PUCCH. It should be noted that for all the prioritization rules provided thus far, the UE may determine which prioritization rule to implement according to, for example, UE capability and/or gNB configuration.

Figure 36:
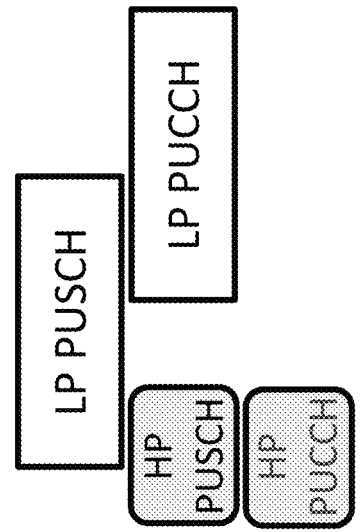
FIG. 36 illustrates a first example for applying the method used by a UE to multiplex UL transmissions according to an exemplary embodiment of the disclosure.

In order to further elucidate the above described multiplexing options, multiplexing alternatives, and prioritization rules, the disclosure provides 14 examples of different scenarios in which the method used by a UE to multiplex UL transmissions as shown in FIG. 5 and described in subsequent exemplary embodiments could be implemented. However, it should be noted that the disclosure is not limited to merely these 14 examples as these examples are aimed to explain the inventive concepts and embodiments. A first example of these 14 examples is shown in FIG. 36 which describes a scenario in which a UE receives a HP PUSCH overlapping in time with HP PUCCH, and the PUSCH and PUCCH partially overlaps with LP PUSCH which partially overlaps with LP PUCCH. By applying different multiplexing options and/or prioritization rules to the scenario of the first example, different results may occur.

FIG. 37 is an example which shows applying Option 1 to the scenario of FIG. 36. The first step S3701 of Option 1 involving determine whether to perform multiplexing between HP PUSCH and HP PUCCH which contain the same priority index as well as between LP PUCCH and LP PUSCH. Thus, in step S3701, HP PUCCH could be multiplexed into HP PUSCH, for example, based on the mechanism of Alternative 2 as previously described for multiplexing channels with the same priority. Also, LP PUCCH could be multiplexed into LP PUSCH based on the mechanism of Alternative 2 as previously described. Next, as described in step S3702, Option 1 involves determining whether to perform multiplexing among channels with different priority indexes, and thus in step S3702 the UE may consider multiplexing HP UCI in HP PUSCH with LP UCI in LP PUSCH. In step S3703, the UE according to step S703 of Option 1 would determine whether to perform prioritization among channel with different priority indexes which are HP PUSCH and LP PUSCH. According to Rule 1 of the previously described prioritization rules of channels with different priority, at least the portion of LP PUSCH that overlaps with HP PUSCH or the entire LP PUSCH is to be dropped. In other case, the LP PUSCH may be cancelled at latest from the first symbol that is overlapped with the HP PUSCH. Therefore, in step S3703, LP PUSCH is dropped and the UE may only transmit HP UCI in HP PUSCH.

Figure 38:
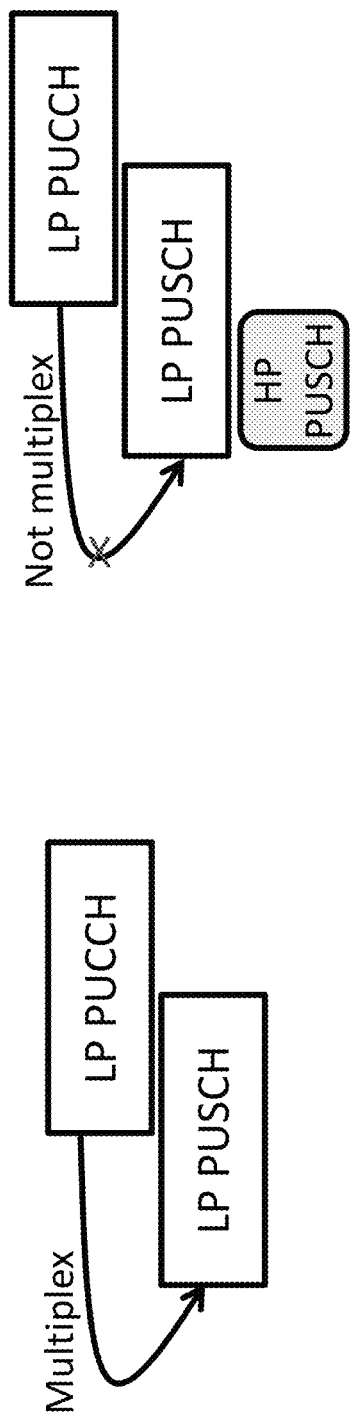
FIG. 38 illustrates applying Alternative 3 of Option 2 of the method used by a UE to multiplex UL transmissions to the first example according to an exemplary embodiment of the disclosure.

Next, Option 2 is to be applied to the first example of FIG. 36, and Option 2 produces a different result from Option 1. Option 2 has been described in FIG. 8 steps S801~S804. Option 2 which involves determining whether to perform multiplexing among channels such as LP PUSCH and LP PUCH with priority index=0 if the LP PUSCH with second priority index is not collided with HP PUSCH which is indicated with a different priority index. The applicable alternative to this scenario for Option 2 is Alternative 3 which requires that the LP UCI in LP PUSCH may not overlap with another channel such as HP PUSCH that has a higher priority than the LP PUSCH. Thus, referring to FIG. 38, LP PUCCH could be multiplexed into LP PUSCH if HP PUSCH does not collide with LP PUSCH. However, if HP PUSCH collides with LP PUSCH, then the LP UCI in the LP PUCCH may not be multiplexed into LP PUSCH since it may not be worth it to multiplex a UCI in an UL resource that could be dropped due to the subsequent prioritization for efficiency or other reasons.

Figure 39:
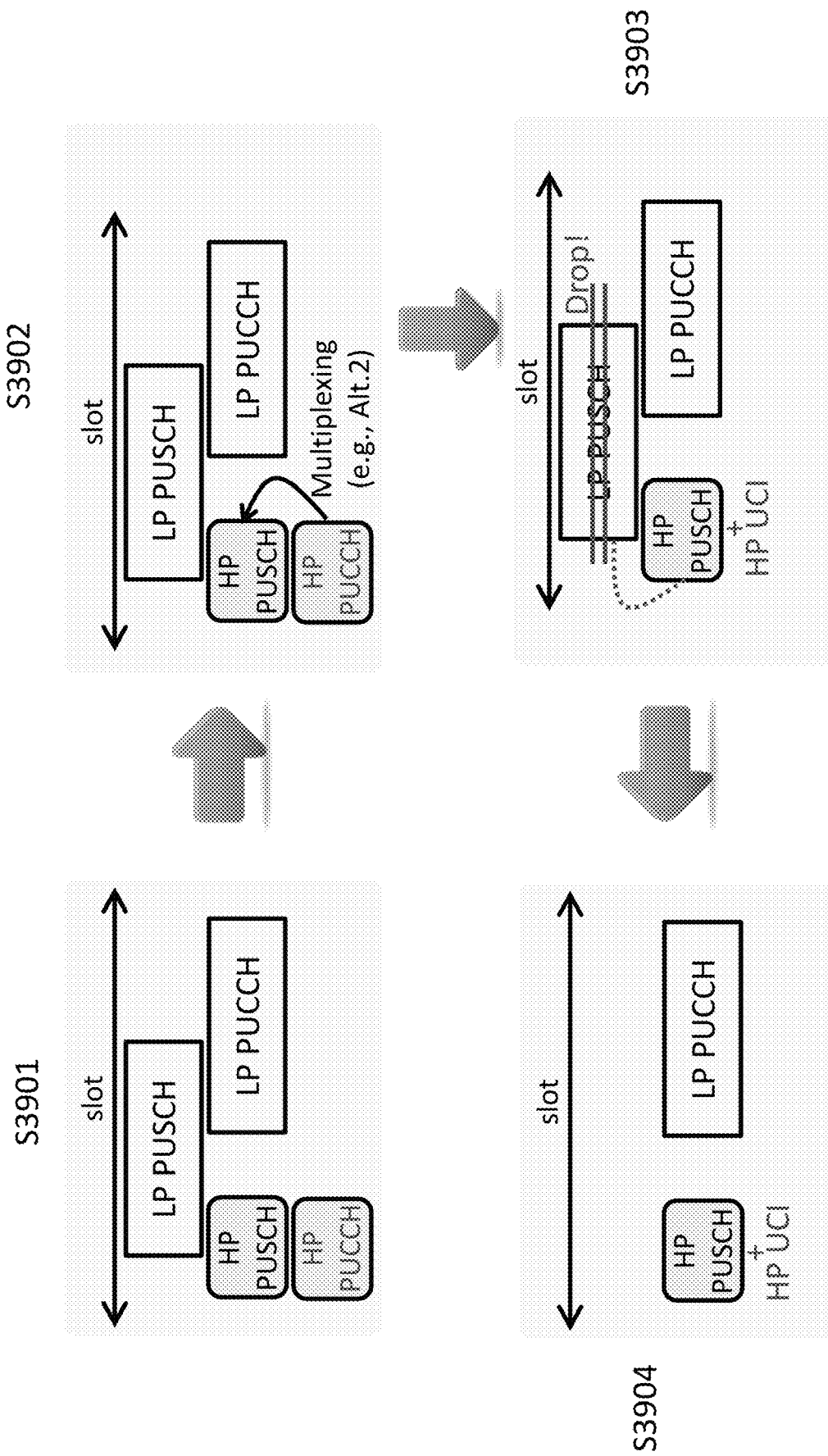
FIG. 39 illustrates a result of applying Option 2 of the method used by a UE to multiplex UL transmissions to the first example according to an exemplary embodiment of the disclosure.

FIG. 39 is an example which shows applying Option 2 to the scenario of FIG. 36. In step S3901, the scenario of FIG. 39 is assumed to be the same as the example of FIG. 36. In step S3902, the UE may determine whether to perform multiplexing between HP PUCCH and HP PUSCH. As HP PUCCH and HP PUSCH are the same priority index, Alternative 2 could be applied. Thus, in step S3902, the HP UCI in the HP PUCCH could be multiplexed into HP PUSCH according to Alternative 2 of Option 2. In step S3903, by applying step S802 of Option 2, LP UCI in the LP PUCCH may not be multiplexed into LP PUSCH since LP PUSCH collides with HP PUSCH. By applying step S803 HP PUSCH could not be multiplexed into LP PUSCH. By applying step S804 of Option 2, LP PUSCH collides with HP PUSCH and thus LP PUSCH is dropped during prioritization. Thus, in step S3904, the UE may transmit HP UCI in HP PUSCH and LP PUCCH.

Figure 40:
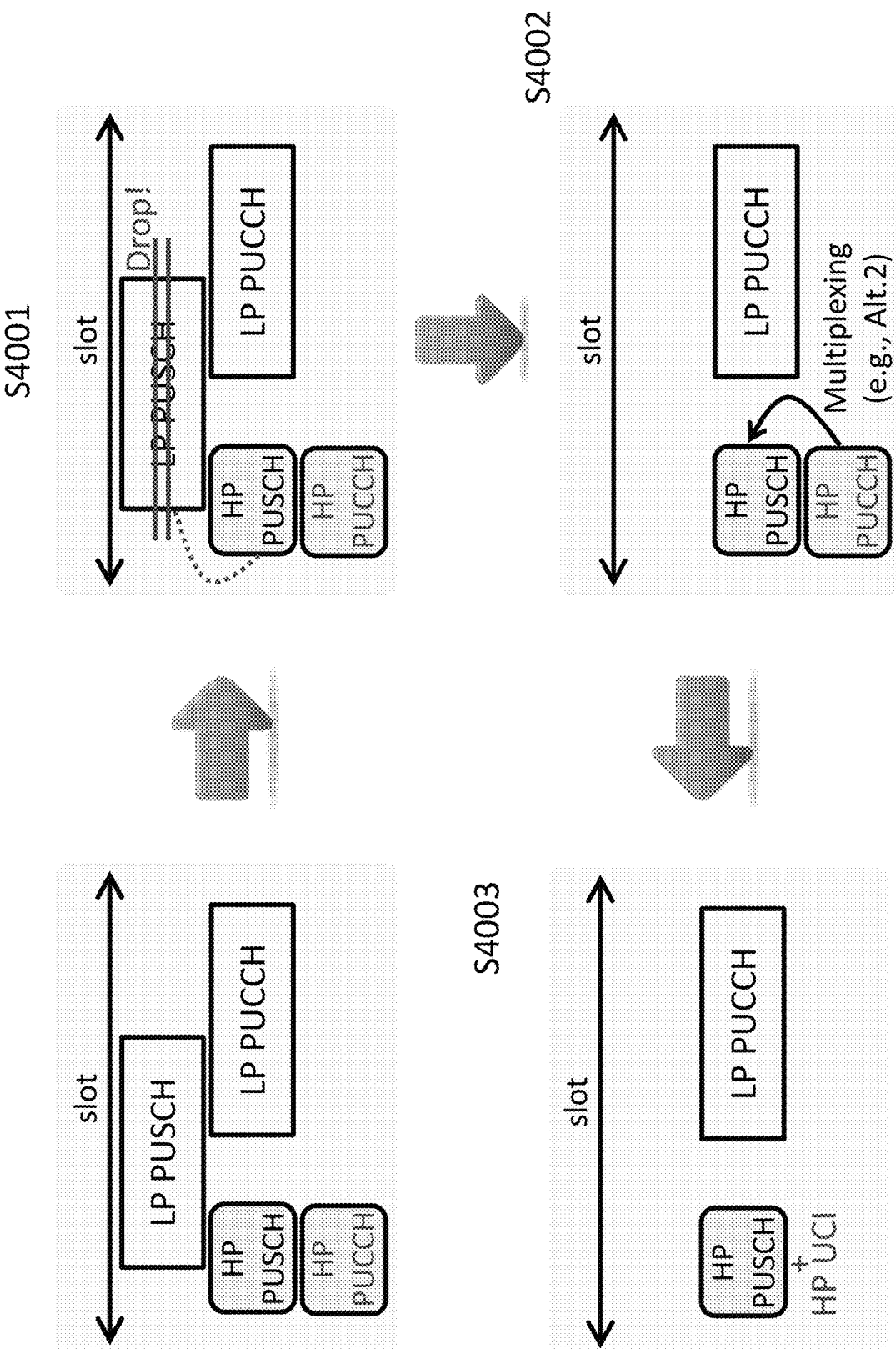
FIG. 40 illustrates a result of applying Option 3 of the method used by a UE to multiplex UL transmissions to the first example according to an exemplary embodiment of the disclosure.

FIG. 40 is an example which shows applying Option 3 to the scenario of FIG. 36. Option 3 has been described in FIG. 9 steps S901~S904. In step S4001, the UE may perform prioritization among channels with same type but with different priority indexes. Thus, the UE may perform prioritization between LP PUSCH and HP PUSCH since they are the same type but with different priority index. According to prioritization Rule 1, LP PUSCH is to be dropped. Next, in step S4002, the UE may perform multiplexing between HP PUSCH and HP PUCCH which have the same priority index (i.e. S902) and thus HP UCI in the HP PUCCH could be multiplexed into HP PUSCH, for example, based on Alternative 2 as previously described. The UE may normally perform multiplexing among channels with different priority indexes (i.e. S903) but in this example, there is no collision among channels with different priority indexes. The UE may normally also perform prioritization among channels with different priority indexes (i.e. S904), but in this example, there is prioritization necessary among channels with different priority indexes. In step S4003, the UE may transmit HP UCI in HP PUSCH and LP PUCCH.

Figure 41:
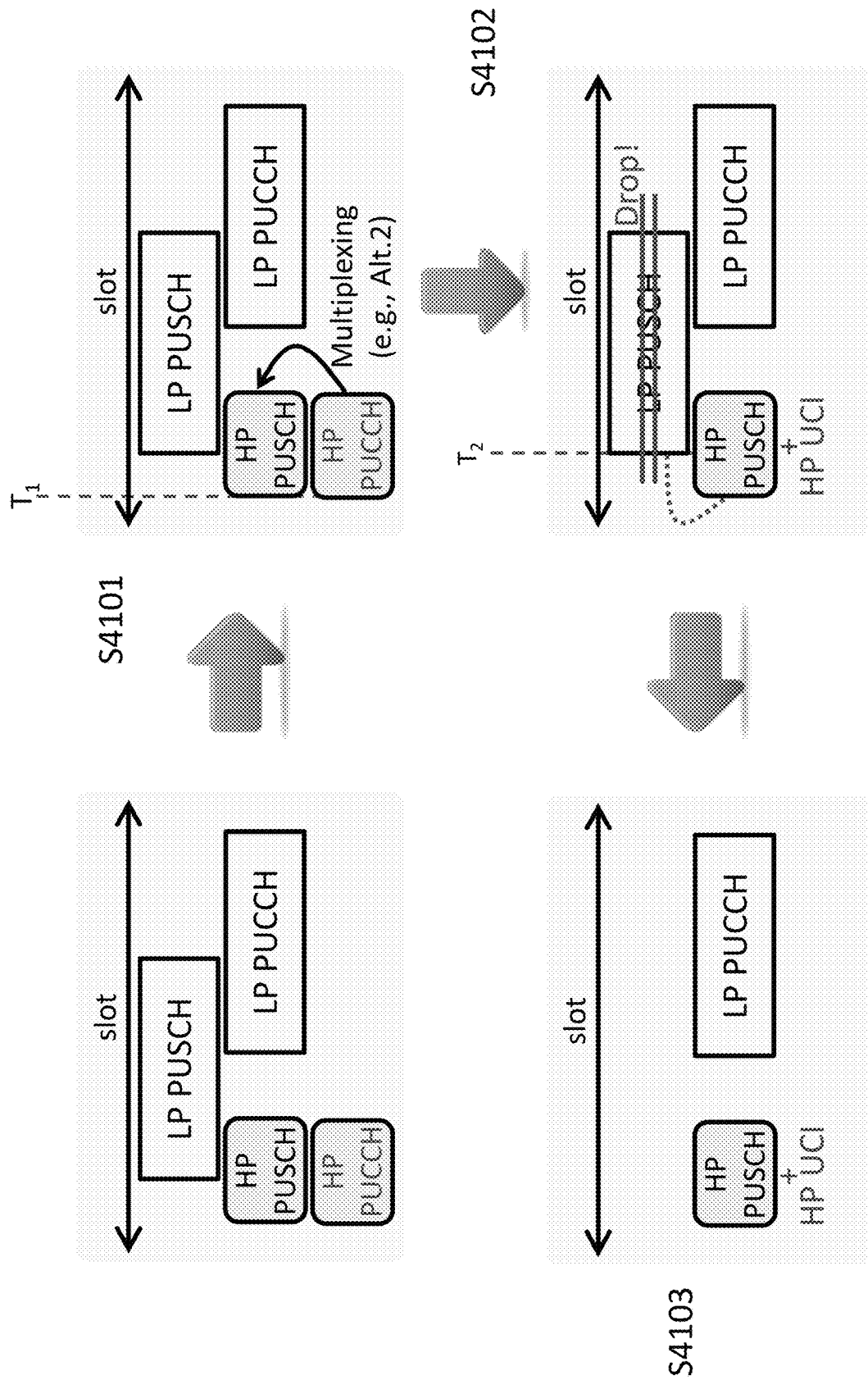
FIG. 41 illustrates a result of applying Option 4 of the method used by a UE to multiplex UL transmissions to the first example according to an exemplary embodiment of the disclosure.

FIG. 41 is an example which shows applying Option 4 to the scenario of FIG. 36. Option 4 has been described in FIG. 10 steps S1001~S1006. For Option 4, the UE may perform multiplexing and/or prioritization according to the timeline of UL transmission. Thus, referring to FIG. 41, in step S4101, at time T1, the UE is indicated to transmit HP PUSCH and HP PUCCH and thus the UE may multiplex the HP UCI in the HP PUCCH into HP PUSCH according to Alternative 2 as previously described. In step S4102, at time T2, the UE denotes that LP PUSCH collides with HP PUSCH. The UE may then perform prioritization based on the mechanism of the prioritization Rule 1, and thus the LP PUSCH is dropped since it partially overlaps with HP PUSCH. In step S4103, the UE may transmit HP UCI in HP PUSCH and LP PUCCH.

Figure 42:
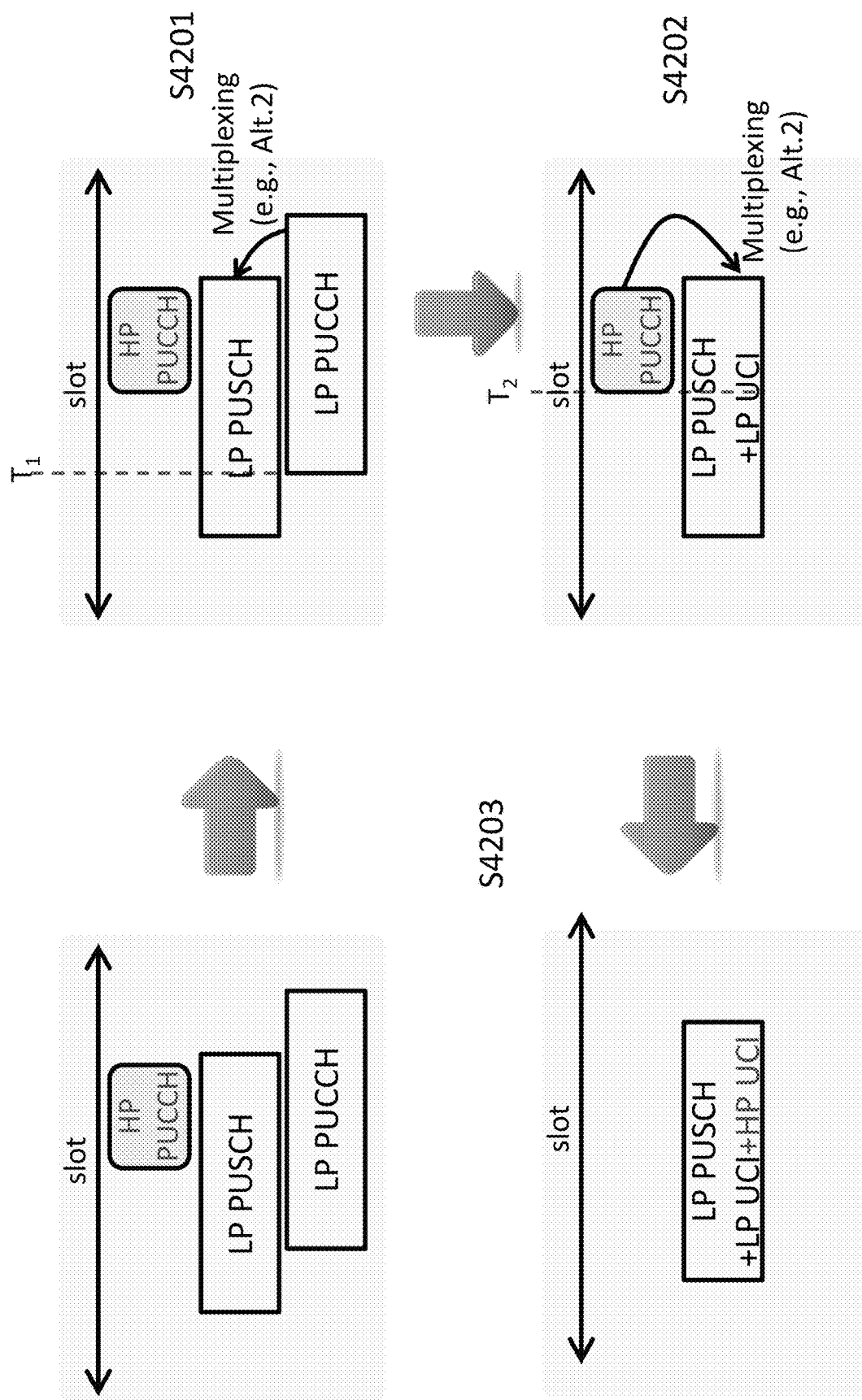
FIG. 42 illustrates a first result of a thirteenth example for applying the method used by a UE to multiplex UL transmissions according to an exemplary embodiment of the disclosure.

Next, a thirteenth example is shown in FIG. 42 which describes a scenario in which a UE is indicated to transmit a LP PUSCH followed by a LP PUCCH which partially overlaps with a HP PUCCH. In this example, based on some specific multiplexing and prioritization rules for Option 1, 2, 3, and 4 respectively, the results are the same. Referring to FIG. 42, in step S4201, the UE may multiplex LP UCI in LP PUCCH into LP PUSCH according to the mechanism of Alternative 2. In step 4202, the UE may multiplex HP UCI in HP PUCCH into LP PUSCH which includes LP UCI according to the mechanism of Alternative B. In step S4203, the UE may transmit LP PUSCH containing LP UCI multiplexed with HP UCI and LP UCI.

Figure 43:
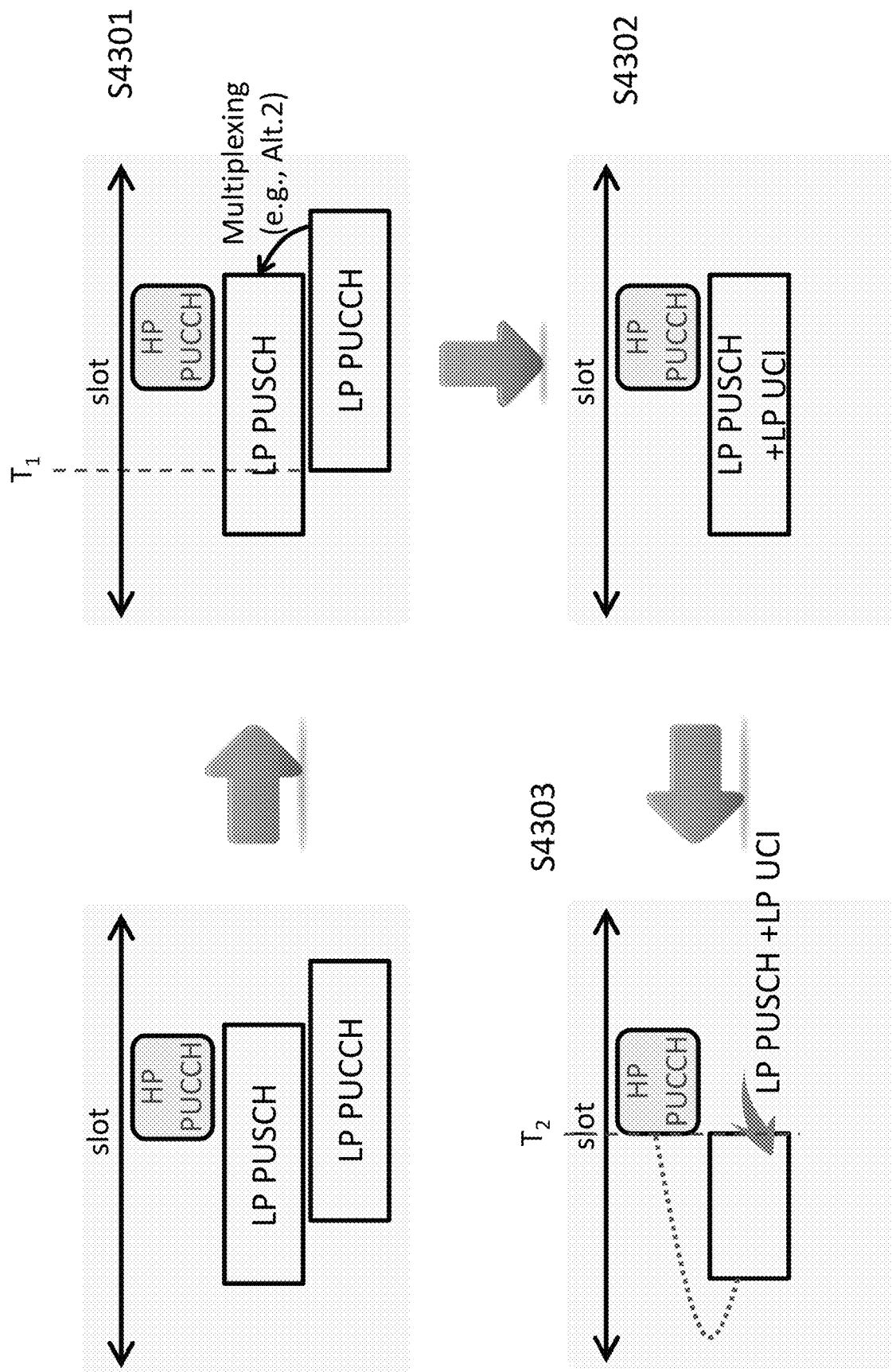
FIG. 43 illustrates a second result of the thirteenth example by applying the method used by a UE to multiplex UL transmissions according to an exemplary embodiment of the disclosure.

FIG. 43 shows a second result of applying Options 1, 2, 3, and 4 to the scenario of FIG. 42. In step S4301, the UE may multiplex LP UCI in LP PUCCH into LP PUSCH according to the mechanism of Alternative 2. In step S4302, the LP PUSCH may contain LP UCI since it has merged with LP PUSCH. In step S4303, the UE drop the portion of LP PUSCH which has collided with HP PUCCH and may subsequently transmit HP PUCCH with the remaining portion of LP PUSCH which contains LP UCI.

Figure 44:
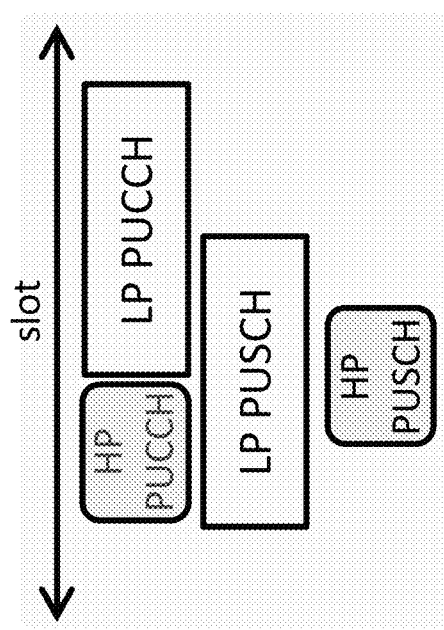
FIG. 44 illustrates a third example for applying the method used by a UE to multiplex UL transmissions according to an exemplary embodiment of the disclosure.
Figure 45:
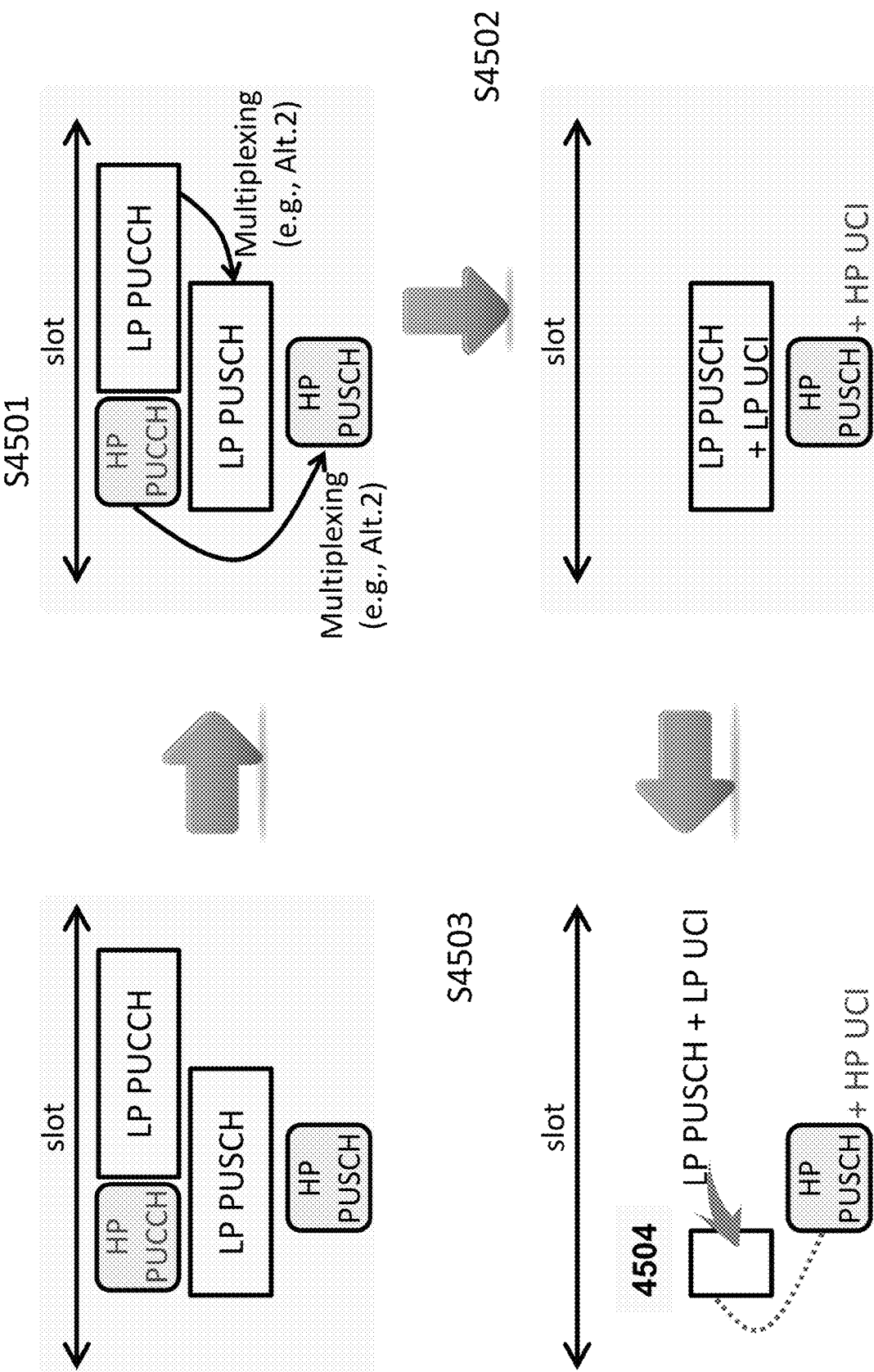
FIG. 45 illustrates a result of applying Option 1 of the method used by a UE to multiplex UL transmissions to the third example according to an exemplary embodiment of the disclosure.

Next, FIG. 44 shows a third example including a scenario in which HP PUCCH is followed by LP PUCCH, and LP PUSCH collides with both HP PUCCH and HP PUSCH and partially collides with LP PUCCH. In order to resolve the collisions, FIG. 45 shows a result of applying Option 1. In step S4501, since step S701 requires performing multiplexing among channels with the same priority index, then the HP UCI in HP PUCCH could be multiplexed into HP PUSCH based on the mechanism of Alternative 2 and the LP UCI in LP PUCCH could be multiplexed into HP PUSCH also based on the mechanism of Alternative 2. Further, in step S4502 there is no multiplexing for channels with different priorities could be performed according to step S702. In step S4503, after prioritization is to be performed according to step S703, the portion of LP PUSCH that overlaps with HP PUSCH is to be dropped according to prioritization Rule 1. In step S4503, the UE may transmit HP UCI in HP PUSCH and the LP UCI in the remaining portion of LP PUSCH 4504.

Figure 46:
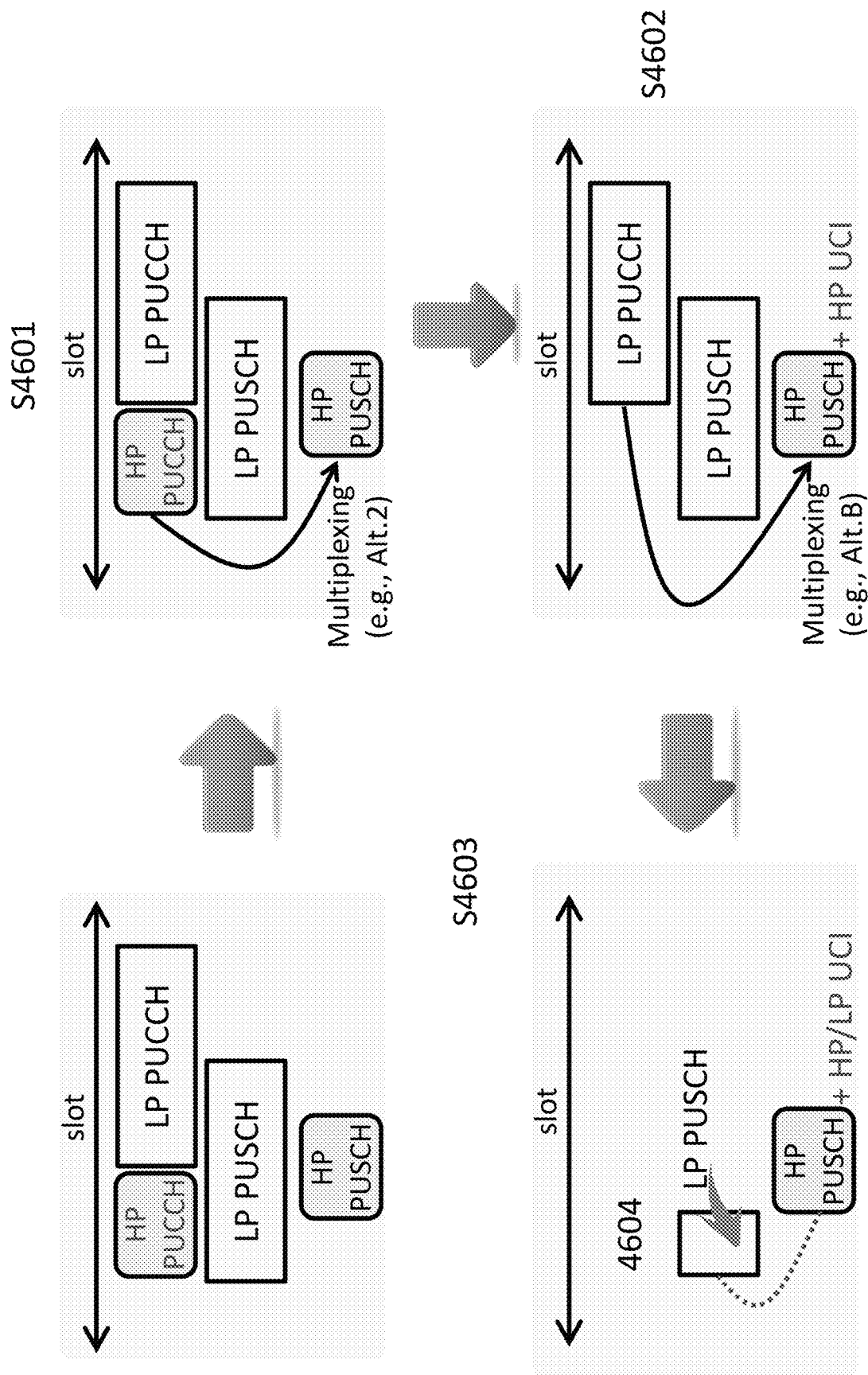
FIG. 46 illustrates a first result of applying Option 2 of the method used by a UE to multiplex UL transmissions to the third example according to an exemplary embodiment of the disclosure.

FIG. 46 shows an example of obtaining a first result by applying option 2 to the scenario of FIG. 44. In step S4601, the UE may multiplex among channels with the first priority index according to step S801 and thus HP PUCCH is multiplexed into HP PUSCH according to the mechanism of Alternative 2. However, there is no multiplexing between LP PUCCH and LP PUSCH since LP PUSCH collides with HP PUSCH according to step S802. In step S4602, the UE may perform multiplexing among channels with different priority according to step S803, and thus LP UCI in LP PUCCH could be multiplexed with HP UCI in HP PUSCH according to Alternative B as previously described. In step S4603, the UE may perform a prioritization between LP PUSCH and HP PUSCH according to prioritization Rule 1, and thus the portion 4604 of LP PUSCH that does not collides with HP PUSCH remains and the portion of LP PUSCH that collides with PUSCH is dropped. Subsequently, the UE may transmit HP PUSCH containing HP UCI previously multiplexed with LP UCI and also the portion of LP PUSCH that has not been dropped during the prioritization procedure.

Figure 47:
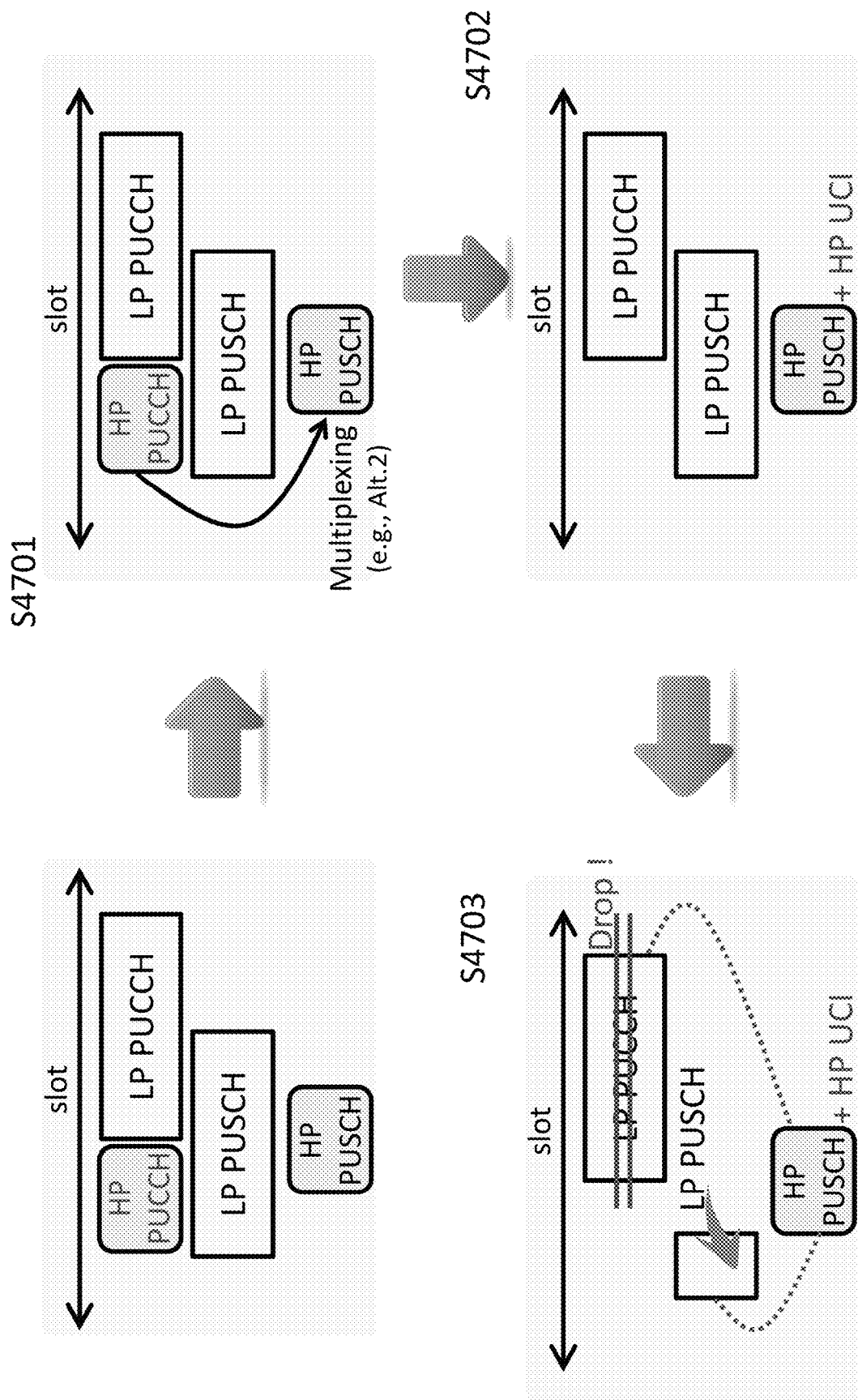
FIG. 47 illustrates a second result of applying Option 2 of the method used by a UE to multiplex UL transmissions to the third example according to an exemplary embodiment of the disclosure.

FIG. 47 shows an example of obtaining a second result by applying option 2 to the scenario of FIG. 44. In step S4701, the UE may multiplex among channels with the first priority index according to step S801 and thus the HP UCI in HP PUCCH is multiplexed into HP PUSCH according to the mechanism of Alternative 2. However, there is no multiplexing between LP PUCCH and LP PUSCH since LP PUSCH collides with HP PUSCH according to step S802. In step S4702, the UE may perform multiplexing among channels with different priority according to step S803, and however, thus LP UCI in LP PUCCH is not allowed to be multiplexed with HP UCI in HP PUSCH or into HP PUSCH which has been multiplexed with any HP UCI, or according to gNB configuration the multiplexing among channels with different priority is not allowed (e.g., disabled). In step S4703, the UE may perform a prioritization among LP PUCCH, LP PUSCH and HP PUSCH. According to prioritization Rule 3, LP PUCCH is dropped since it collides with HP PUSCH. According to prioritization Rule 1, and the portion of LP PUSCH that does not collides with HP PUSCH remains and the portion of LP PUSCH that collides with PUSCH is dropped. Subsequently, the UE may transmit HP PUSCH containing HP UCI without the LP UCI and also the portion of LP PUSCH that has not been dropped during the prioritization procedure.

Figure 48:
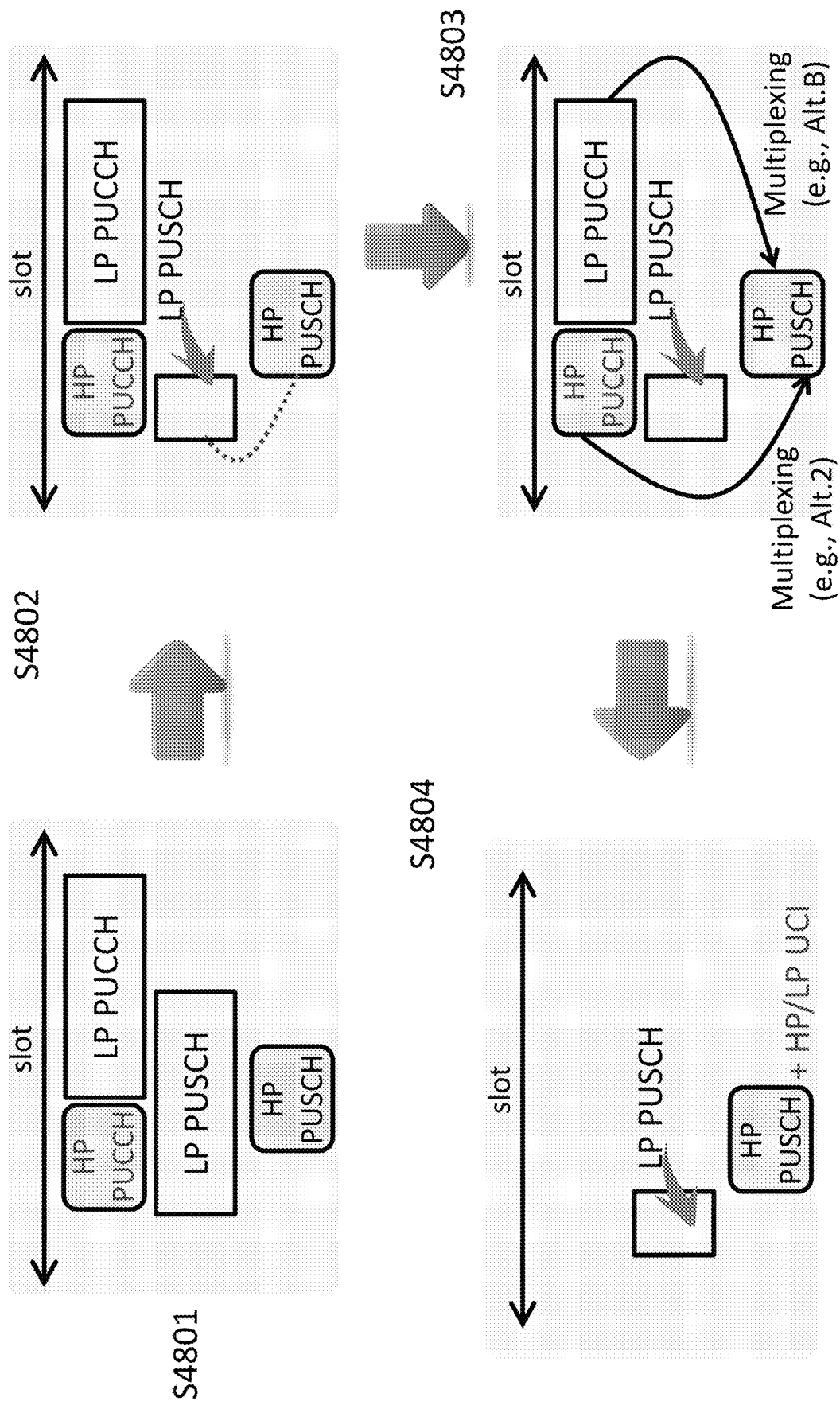
FIG. 48 illustrates a first result of applying Option 3 of the method used by a UE to multiplex UL transmissions to the third example according to an exemplary embodiment of the disclosure.

FIG. 48 shows an example of obtaining a first result by applying option 3 to the scenario of FIG. 44. In step S4801, the UE may perform prioritization among channels with the same type but with a different priority index according to step S901. Since LP PUSCH collides with HP PUSCH which are the same type but different priority index, the portion of LP PUSCH that collides with HP PUSCH is dropped according to prioritization Rule 1 while the portion that does not collide would remain. Next, in step S4802, the UE may determine whether to perform multiplexing among channels with the same priority index based on step S902. Thus, the UE may multiplex the HP UCI in HP PUCCH into HP PUSCH according to the mechanism of Alternative 2. Also, The UE may determine whether to perform multiplexing among channels with different priority indexes based on step S903. Thus, the UE may multiplex the LP UCI in LP PUCCH and the HP UCI in HP PUCCH into the HP PUSCH based on the mechanism of Alternative B and Alternative 2, respectively. In step S4803, the UE may determine whether to perform prioritization among channels with different priority indexes, but there is no collision among channels with different priority index. Thus, the UE may transmit the portion of LP PUSCH that has not been dropped and also HP PUSCH multiplexed with HP UCI and LP UCI.

Figure 49:
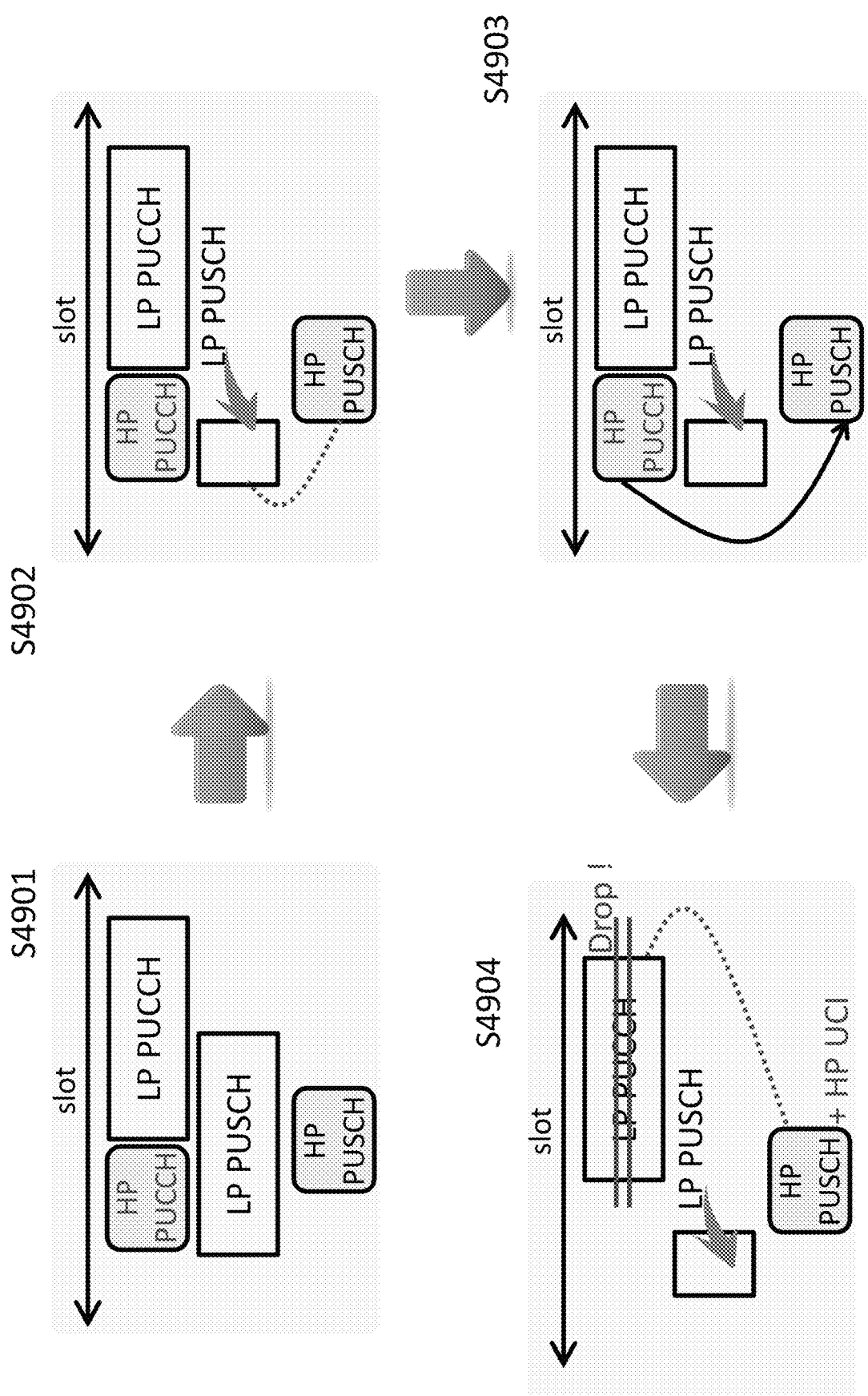
FIG. 49 illustrates a second result of applying Option 3 of the method used by a UE to multiplex UL transmissions to the third example according to an exemplary embodiment of the disclosure.

FIG. 49 shows an example of obtaining a second result by applying option 3 to the scenario of FIG. 44. In step S4902, the UE may perform prioritization among channels with the same type but with a different priority index according to step S901. Since LP PUSCH collides with HP PUSCH which are the same type but different priority index, the portion of LP PUSCH that collides with HP PUSCH is dropped according to prioritization Rule 1 while the portion that does not collide would remain. Next, in step S4903, the UE may determine whether to perform multiplexing among channels with the same priority index based on step S902. Thus, the UE may multiplex the HP UCI in HP PUCCH into HP PUSCH according to the mechanism of Alternative 2. Also, The UE may determine whether to perform multiplexing among channels with different priority indexes based on step S903. However, the UE may not multiplex LP UCI in LP PUCCH with HP UCI in HP PUSCH since a LP UCI is not allowed to multiplex with HP PUSCH or HP PUSCH that has been multiplexed with any HP UCI, or according to gNB configuration the multiplexing among channels with different priority is not allowed (e.g., disabled). In step S4904, the UE may determine whether to perform prioritization among channels with different priority indexes, and thus the UE may drop LP PUCCH since it collides with HP PUSCH and the LP UCI in LP PUCCH is not allowed to be multiplexed with HP UCI in HP PUSCH or into HP PUSCH which has been multiplexed with any HP UCI, or according to gNB configuration the multiplexing among channels with different priority is not allowed (e.g., disabled). Thus, the UE may transmit the portion of LP PUSCH that has not been dropped and also HP PUSCH multiplexed with HP UCI.

Figure 50:
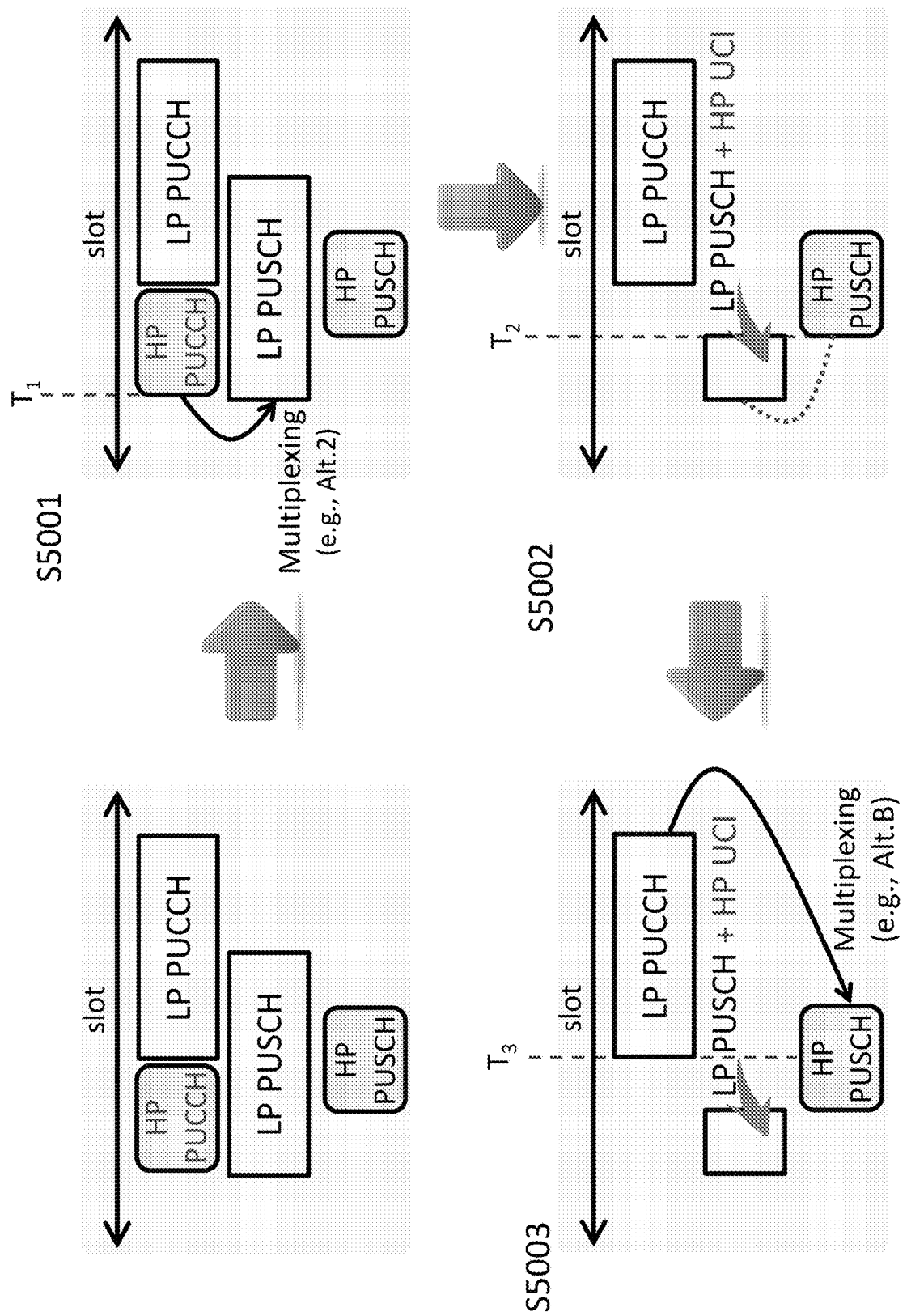
FIG. 50 illustrates a first result of applying Option 4 of the method used by a UE to multiplex UL transmissions to the third example according to an exemplary embodiment of the disclosure.

FIG. 50 shows an example of obtaining a first result by applying option 4 to the scenario of FIG. 44. In step S5001, the UE is indicated to transmit HP PUCCH and LP PUSCH at time T1 and the HP UCI in HP PUCCH could be multiplexed into LP PUSCH according to the mechanism of Alternative 2. In step S5002, at time T2, the UE may perform a prioritization between LP PUSCH and HP PUSCH, and thus the portion of LP PUSCH that collides with HP PUSCH is dropped, and the portion of LP PUSCH that does not collides with HP PUSCH and contain HP UCI previously multiplexed into LP PUSCH would remain. In detail, the LP PUSCH may be cancelled at latest from the first symbol that is overlapped with the HP PUSCH. In step S5003, at time T3, LP PUCCH is multiplexed into HP PUSCH according to the mechanism of Alternative B. Thus, the UE may transmit HP PUSCH containing possibly LP UCI and also the remaining portion of LP PUSCH that contains HP UCI.

Figure 51:
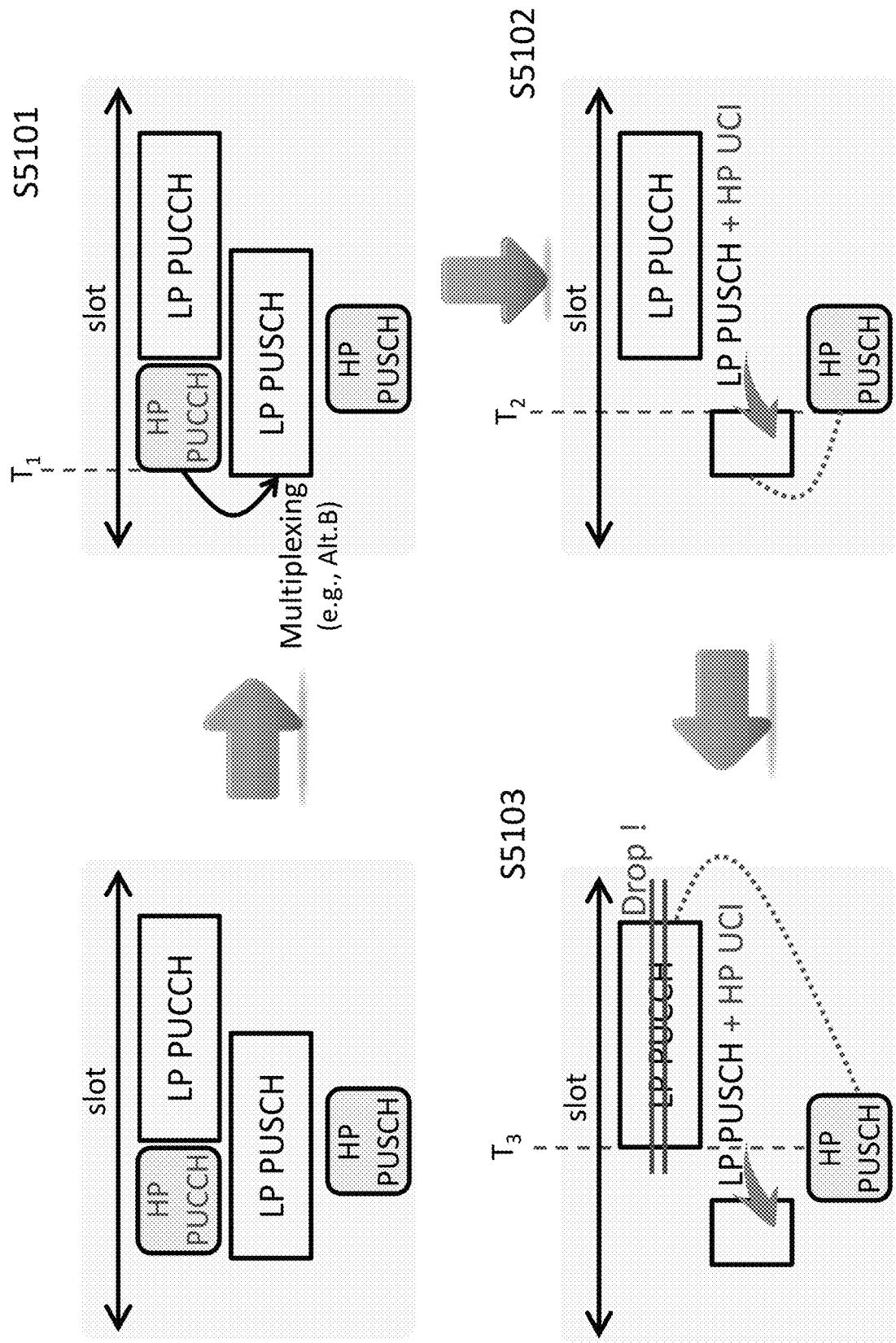
FIG. 51 illustrates a second result of applying Option 4 of the method used by a UE to multiplex UL transmissions to the third example according to an exemplary embodiment of the disclosure.

FIG. 51 shows an example of obtaining a second result by applying option 4 to the scenario of FIG. 44. In step S5101, the UE is indicated to transmit HP PUCCH and LP PUSCH at time T1 and HP UCI in HP PUCCH could be multiplexed into LP PUSCH according to the mechanism of Alternative B. In step S5102, at time T2, the UE may perform a prioritization between LP PUSCH and HP PUSCH, and thus the portion of LP PUSCH that collides with HP PUSCH is dropped, and the portion of LP PUSCH that does not collides with HP PUSCH and contain HP UCI previously multiplexed into LP PUSCH would remain. In detail, the LP PUSCH may be cancelled at latest from the first symbol that is overlapped with the HP PUSCH. In step S5103, at time T3, LP PUCCH is not multiplexed into HP PUSCH since a LP UCI is not allowed to be multiplexed into HP PUSCH or HP PUSCH that has been multiplexed with HP UCI, or according to gNB configuration the multiplexing among channels with different priority is not allowed (e.g., disabled). The LP PUCCH would subsequently be dropped during prioritization. Thus, the UE may transmit HP PUSCH and also the remaining portion of LP PUSCH that contains HP UCI.

Figure 52:
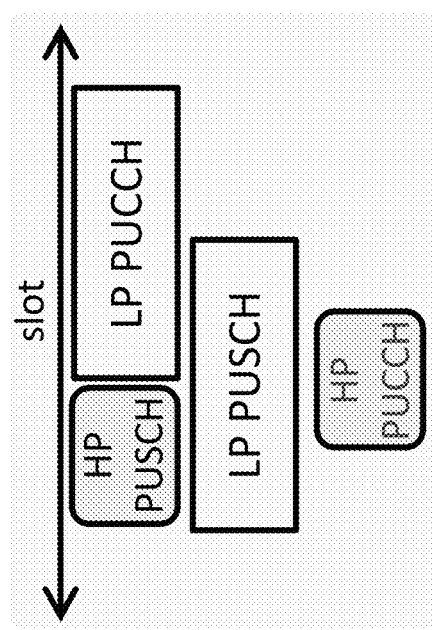
FIG. 52 illustrates a fourth example for applying the method used by a UE to multiplex UL transmissions according to an exemplary embodiment of the disclosure.
Figure 53:
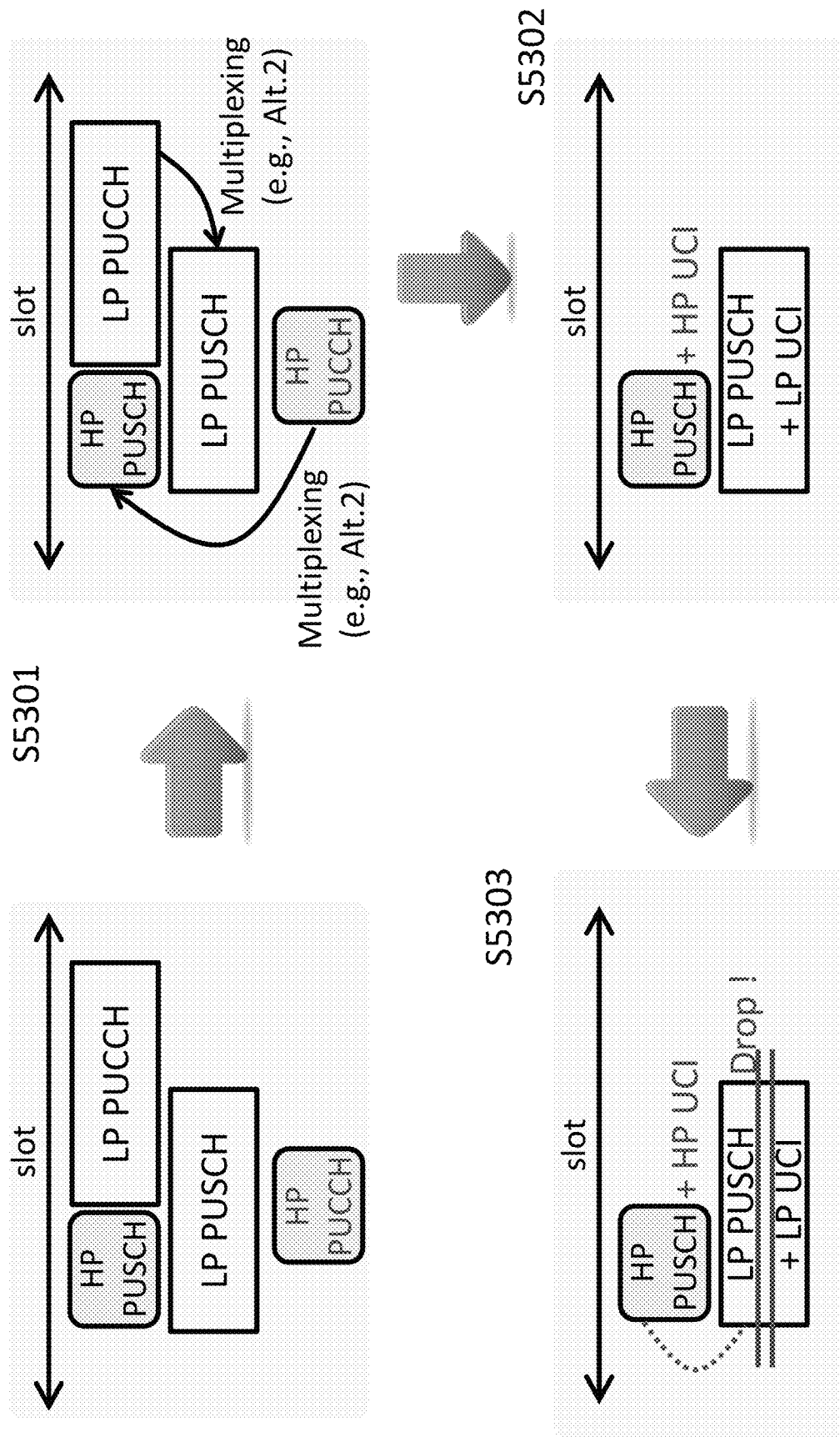
FIG. 53 illustrates applying Option 1 of the method used by a UE to multiplex UL transmissions to the fourth example according to an exemplary embodiment of the disclosure.

Next, FIG. 52 shows a fourth example including a scenario in which HP PUSCH is followed by LP PUCCH, and both collides with LP PUSCH which collides with HP PUCCH. FIG. 53 as an example shows the result of applying option 1 to the scenario of FIG. 44. In step S5301, the UE may determine whether to perform multiplexing among channels with same priority index according to step S701 as previously described. Thus, the UE may multiplex HP UCI in HP PUCCH into HP PUSCH based on the mechanism of Alternative 2, the also the UE may multiplex LP UCI in LP PUCCH into LP PUSCH based on the mechanism of Alternative 2. Next, in step S5302, the UE may determine whether to perform multiplexing among channels with different priority indexes according to step S702 and thus the UE may not perform the multiplex for LP PUSCH and HP PUSCH. Next, in step S5303, the UE may determine whether to perform prioritization among channel with different priority indexes according to the step S703. Thus, the UE may drop LP PUSCH since it collides with HP PUSCH, and the UE may transmit HP PUSCH which multiplexed with HP UCI.

Figure 54:
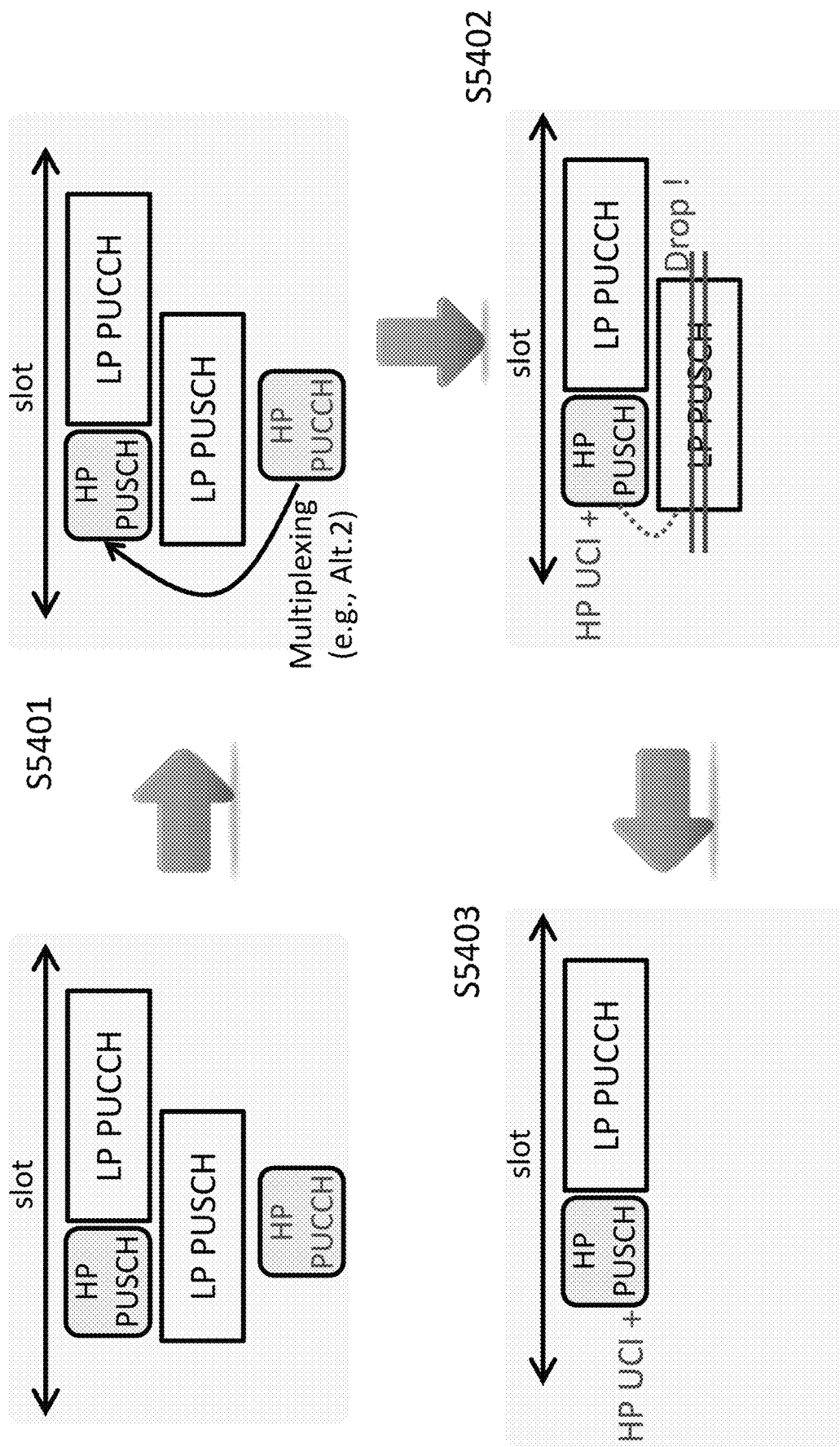
FIG. 54 illustrates applying Option 2 of the method used by a UE to multiplex UL transmissions to the fourth example according to an exemplary embodiment of the disclosure.

FIG. 54 as an example shows the result of applying option 2 to the scenario of FIG. 52. In step S5401, the UE may determine whether to perform multiplexing among channels with a first priority index according to step S801 and thus the UE may multiplex HP UCI in HP PUCCH into HP PUSCH according to Alternative 2. In step S5402, the UE may determine whether to perform multiplexing among channels with second priority index according to step S802. However, the UE may not multiplex LP PUSCH with HP PUCCH since LP PUSCH has collided with HP PUSCH. Next, the UE may determine whether to perform multiplexing among channels with different priority indexes according to step S803, and thus the UE may drop LP PUSCH since it collides with HP PUSCH. Finally, in step S5403, the UE may transmit HP PUSCH multiplexed with HP UCI and LP PUCCH.

Figure 55:
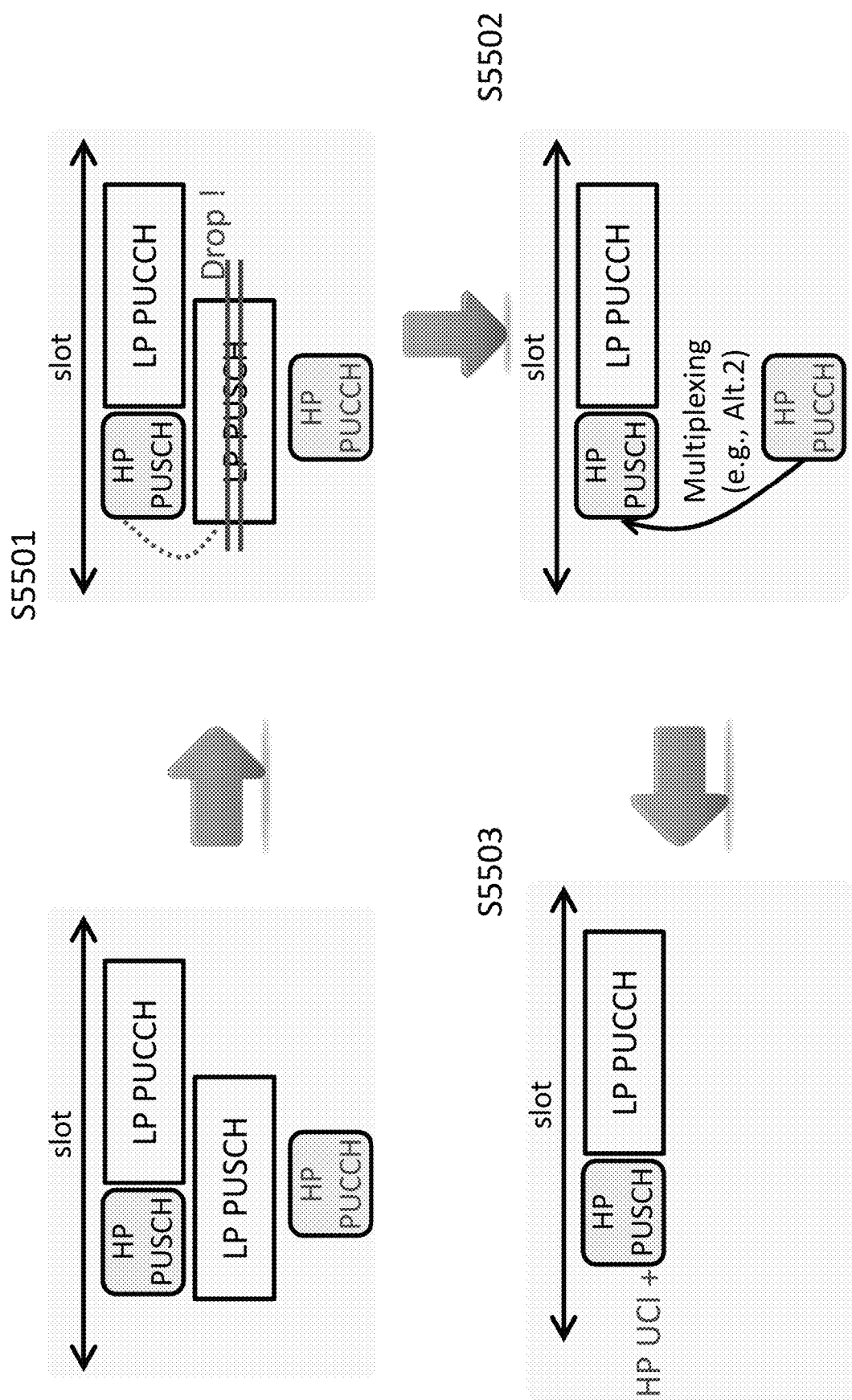
FIG. 55 illustrates applying Option 3 of the method used by a UE to multiplex UL transmissions to the fourth example according to an exemplary embodiment of the disclosure.

FIG. 55 as an example shows the result of applying option 3 to the scenario of FIG. 52. In step S5501, the UE may determine whether to perform prioritization among channels with same type but with different priority indexes as described in step S901. Thus, the UE may drop LP PUSCH since LP PUSCH collides with HP PUSCH. In step S5502, the UE may determine whether to perform multiplexing among channels with same priority index. Since HP PUCCH have the same priority index as HP PUSCH, HP UCI in HP PUCCH could be multiplexed into HP PUSCH based on the mechanism of Alternative 2. Next, the UE may determine whether to perform multiplexing among channels with different priority indexes as described in step S903, but there are no collisions among remaining channels with different priority indexes. Next, the UE may determine whether to perform prioritization among channel with different priority indexes as described in step S904, but there is prioritization to be performed since there are no collisions among remaining channels with different priority indexes. In step S5503, the UE may transmit HP PUSCH containing HP UCI and LP PUCCH as shown in FIG. 55.

Figure 56:
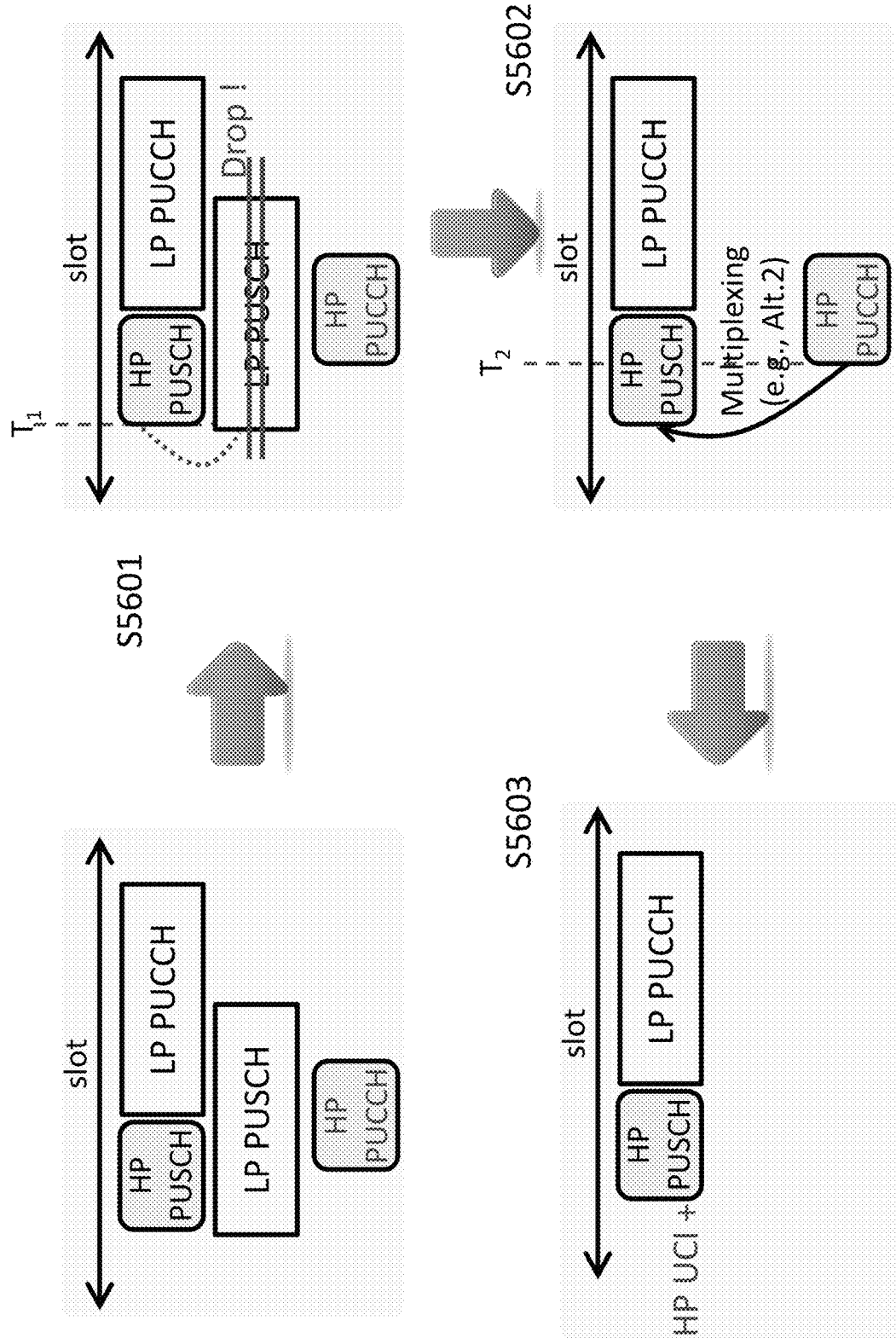
FIG. 56 illustrates applying Option 4 of the method used by a UE to multiplex UL transmissions to the fourth example according to an exemplary embodiment of the disclosure.

FIG. 56 as an example shows the result of applying option 4 to the scenario of FIG. 44. In step S5601, at time T1, the UE is indicated to transmit HP PUSCH and LP PUSCH, and the UE may perform a prioritization between HP PUSCH and LP PUSCH by subsequently dropped LP PUSCH since it collides with HP PUSCH according to prioritization Rule 1. In step S5602, at time T2, the UE may multiplex HP UCI in HP PUCCH into HP PUSCH according to the mechanism of Alternative 2 as previously described. In step S5603, the UE may transmit HP PUSCH which contains HP UCI and also LP PUCCH.

Figure 57:
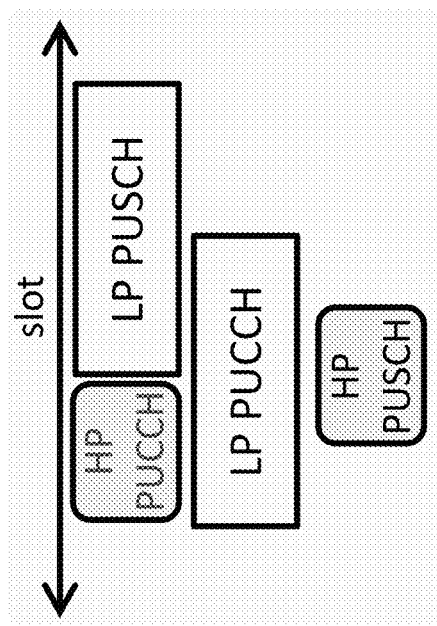
FIG. 57 illustrates a fifth example for applying the method used by a UE to multiplex UL transmissions according to an exemplary embodiment of the disclosure.
Figure 58:
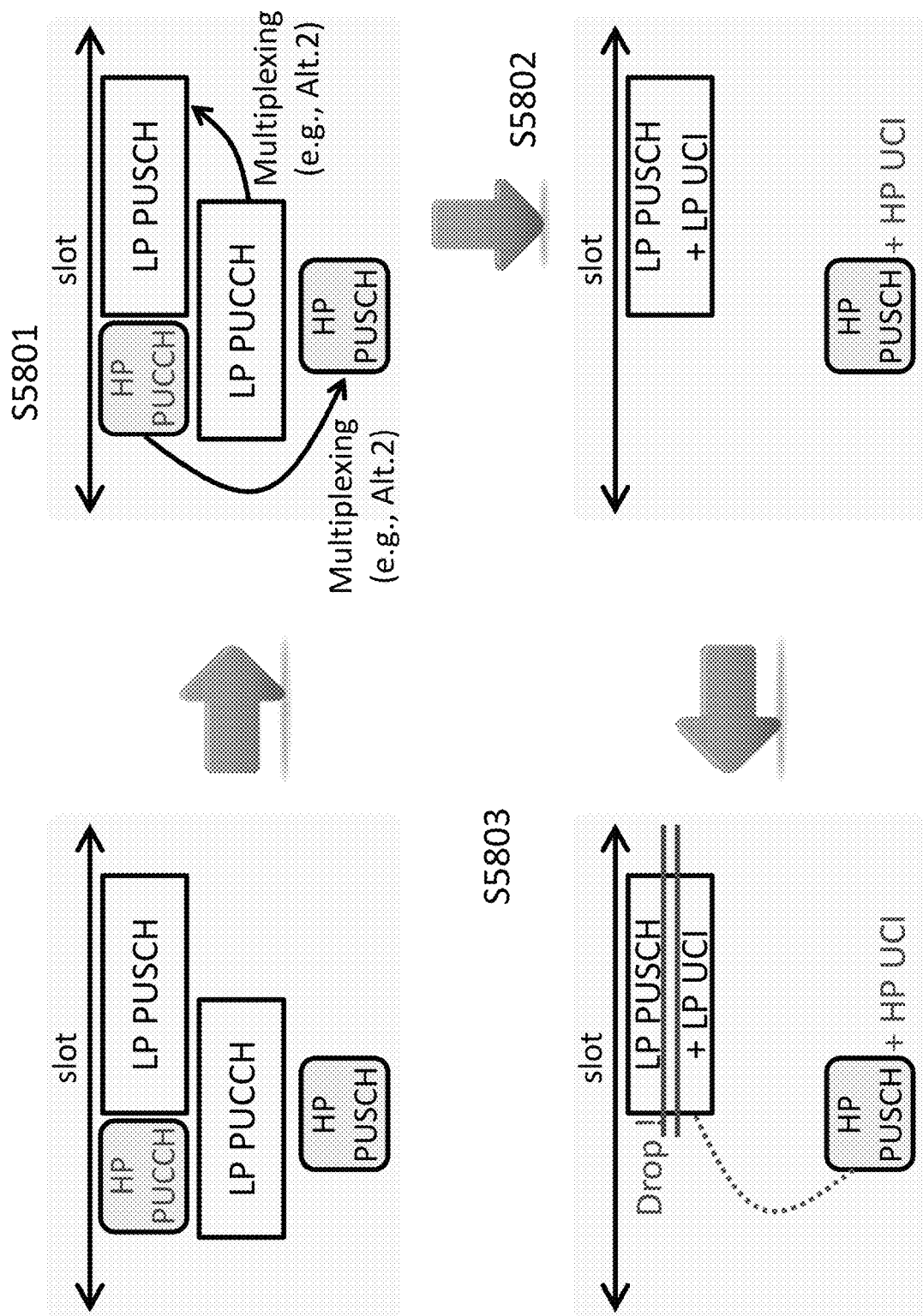
FIG. 58 illustrates a result of applying Option 1 of the method used by a UE to multiplex UL transmissions to the fifth example according to an exemplary embodiment of the disclosure.

Next, FIG. 57 shows a fifth example including a scenario in which HP PUCCH is followed by LP PUSCH, and LP PUCCH collides with both HP PUCCH and LP PUSCH. LP PUSCH also collides with LP PUCCH. In order to resolve the collisions, FIG. 58 shows a derivation of a result by applying Option 1 to the fifth example as shown FIG. 57. In step S5801, the UE may perform multiplexing among channels with the same priority index as described in step S701, then the UE may multiplex HP UCI in HP PUCCH into HP PUSCH based on the mechanism of Alternative 2, and the UE may also multiplex LP UCI in LP PUCCH into LP PUSCH also based on the mechanism of Alternative 2. Next, the UE may determine whether to perform multiplexing among channels with different priority indexes as described in step S702. Next, in step S5802, the UE may determine whether to perform multiplexing among channel with different priority indexes as described in S702 and thus the multiplexing of HP PUSCH and LP PUSCH is not needed. In step S5803, the UE may perform prioritization by dropping LP PUSCH since LP PUSCH overlaps with HP PUSCH. The UE may subsequently transmit HP PUSCH which contains HP UCI.

Figure 59:
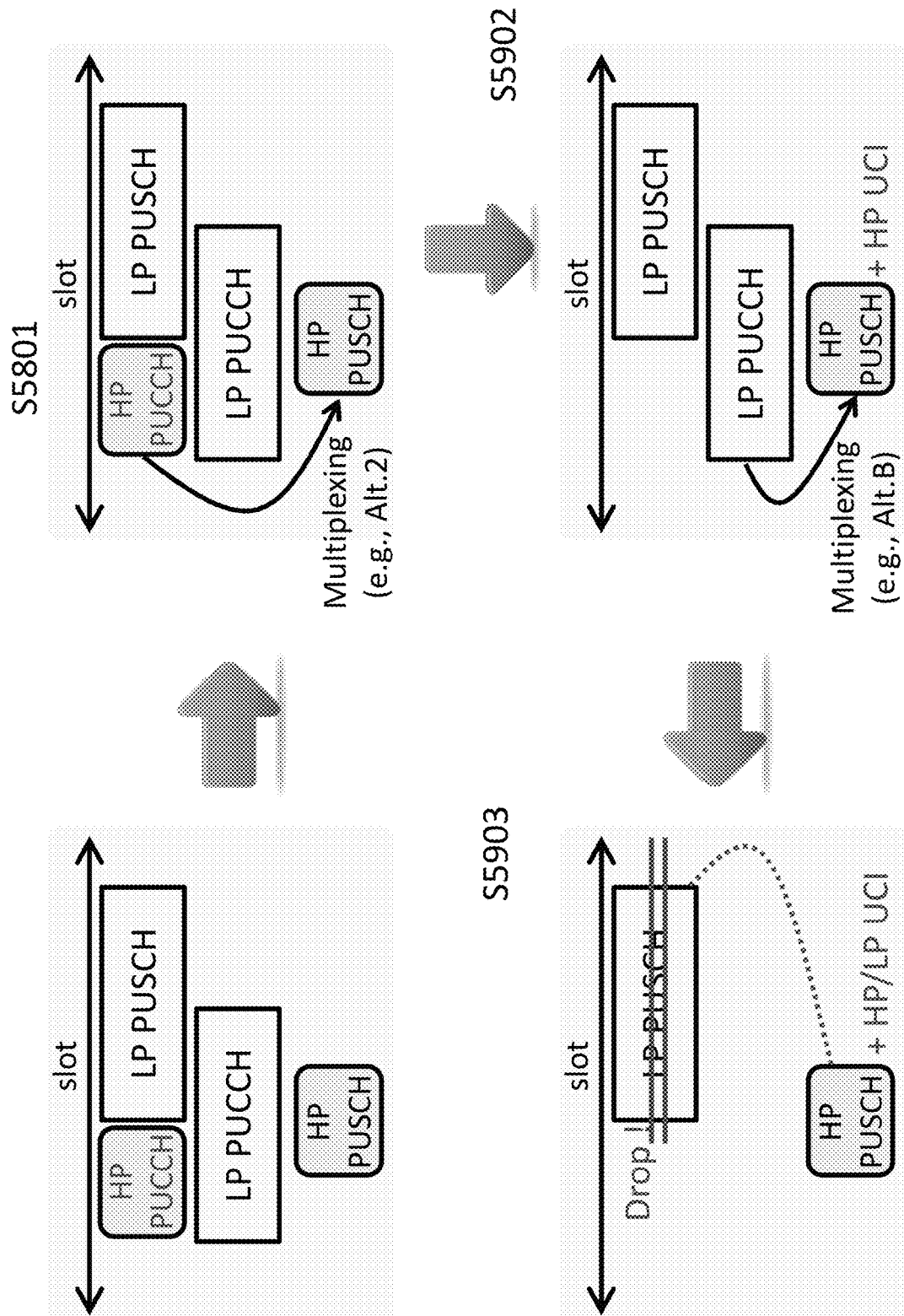
FIG. 59 illustrates a first result of applying Option 2 of the method used by a UE to multiplex UL transmissions to the fifth example according to an exemplary embodiment of the disclosure.

FIG. 59 shows an example of obtaining a first result by applying Option 2 to the scenario of FIG. 57. In step S5901, the UE may multiplex among channels with the first priority index according to step S801 and thus HP UCI in HP PUCCH is multiplexed into HP PUSCH according to the mechanism of Alternative 2. However, there is no multiplexing between LP PUCCH and LP PUSCH since LP PUSCH collides with HP PUSCH according to step S802. In step S5902, the UE may perform multiplexing among channels with different priority according to step S803, and thus LP UCI in LP PUCCH could be multiplexed into HP PUSCH which contains HP UCI according to Alternative B as previously described. In step S5903, the UE may perform a prioritization between LP PUSCH and HP PUSCH, and thus according to prioritization Rule 1, LP PUSCH could be dropped since it collides with HP PUSCH. Subsequently, the UE may transmit HP PUSCH containing HP UCI and LP UCI.

Figure 60:
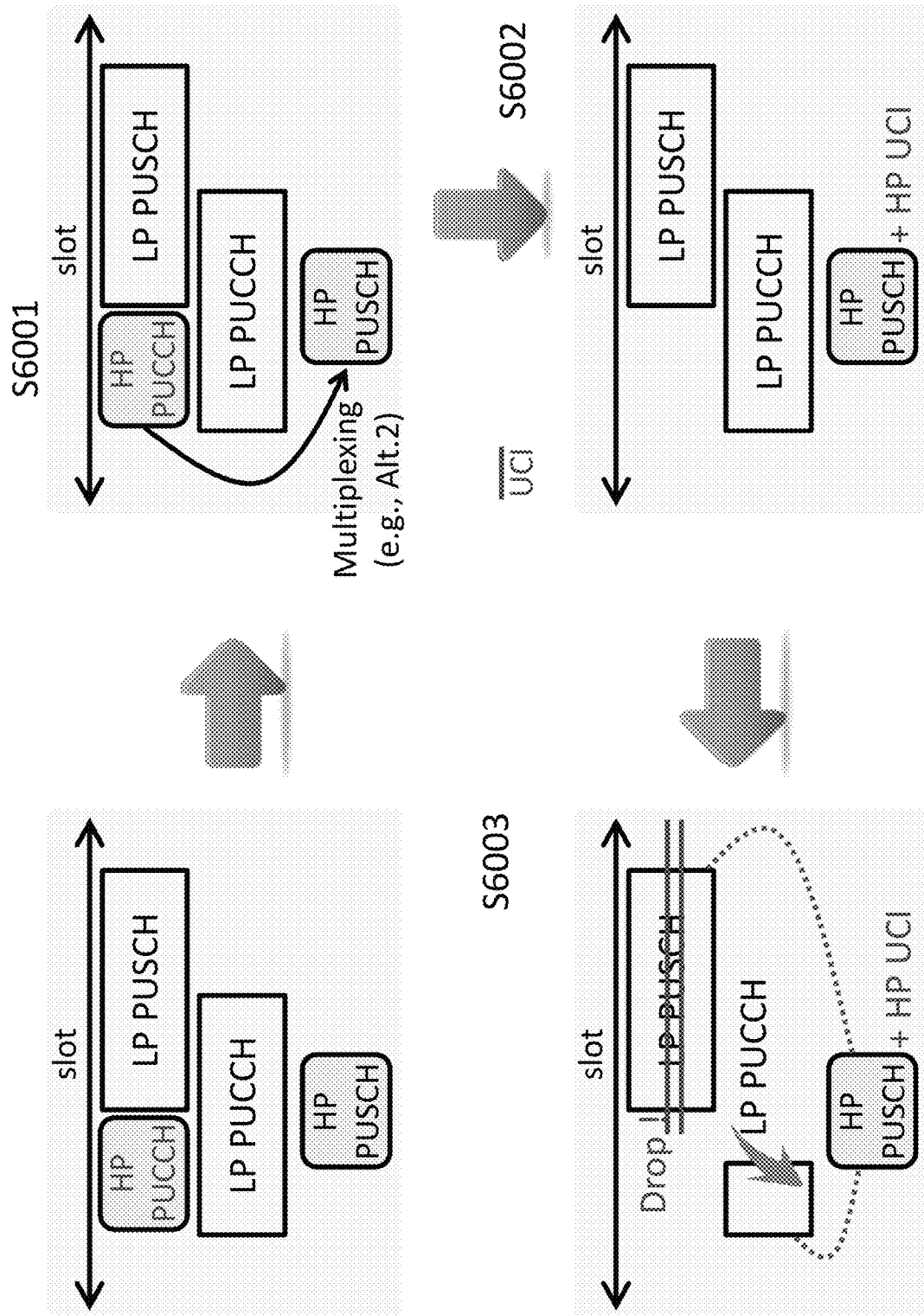
FIG. 60 illustrates a second result of applying Option 2 of the method used by a UE to multiplex UL transmissions to the fifth example according to an exemplary embodiment of the disclosure.

FIG. 60 shows an example of obtaining a second result by applying Option 2 to the scenario of FIG. 57. In step S6001, the UE may multiplex among channels with the first priority index as described in step S801 and thus HP UCI in HP PUCCH is multiplexed into HP PUSCH according to the mechanism of Alternative 2. However, there is no multiplexing between LP PUCCH and LP PUSCH since LP PUSCH collides with HP PUSCH according to step S802. In step S6002, the UE may perform multiplexing among channels with different priority according to step S803, and however, LP UCI in LP PUCCH is not allowed to be multiplexed with HP UCI in HP PUSCH or into HP PUSCH which has been multiplexed with any HP UCI, or according to gNB configuration the multiplexing among channels with different priority is not allowed (e.g., disabled). In step S6003, the UE may perform a prioritization among LP PUCCH, LP PUSCH and HP PUSCH. Subsequently, LP PUSCH is dropped since it collides with HP PUSCH. Also, the portion of LP PUCCH that does not collides with HP PUSCH remains and the portion of LP PUCCH that collides with HP PUSCH is dropped. In detail, the LP PUCCH and LP PUSCH may be cancelled at latest from the first symbol that is overlapped with the HP PUSCH. Subsequently, the UE may transmit HP PUSCH containing HP UCI and also the portion of LP PUCCH that has not been dropped during the prioritization procedure.

Figure 61:
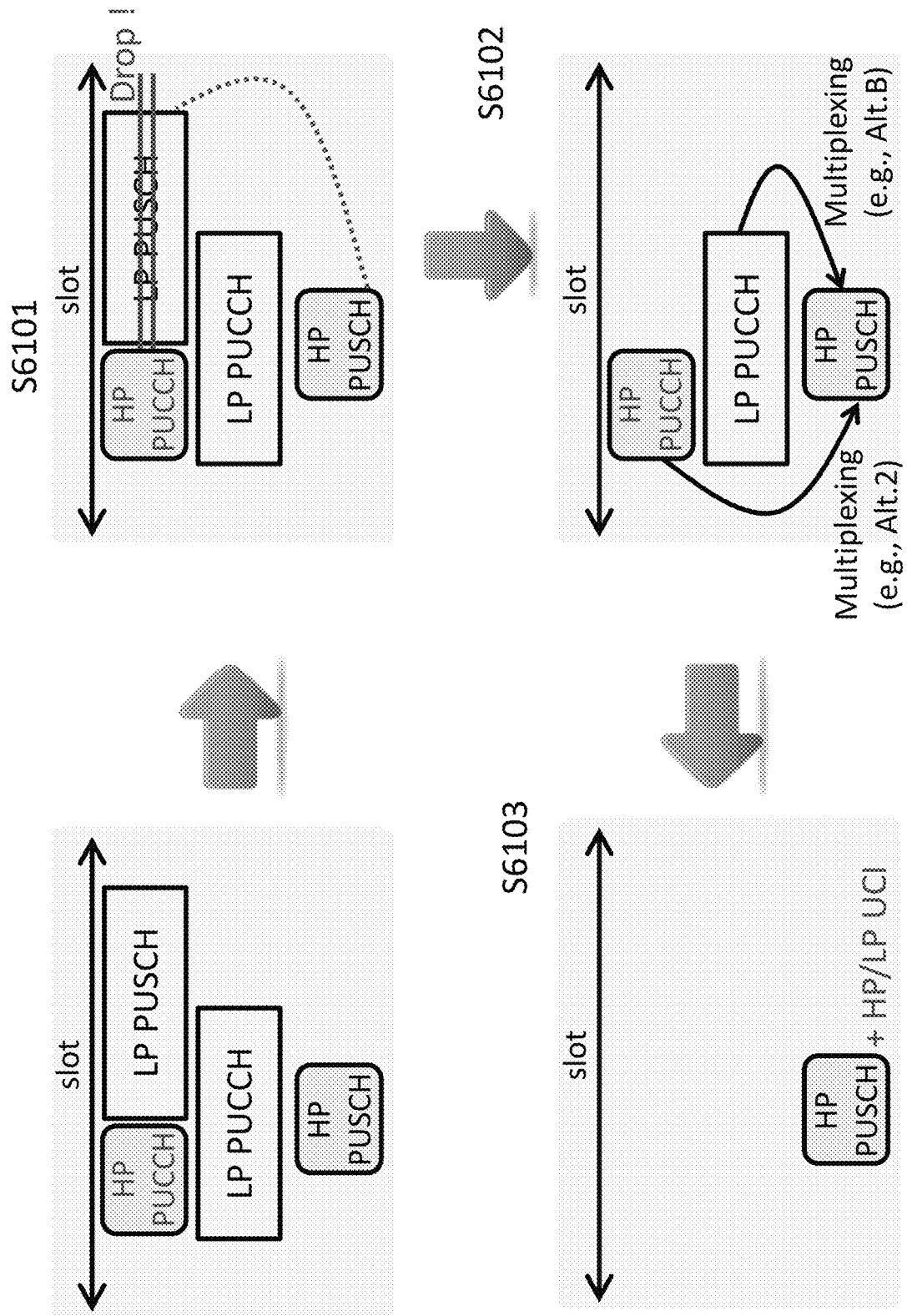
FIG. 61 illustrates a first result of applying Option 3 of the method used by a UE to multiplex UL transmissions to the fifth example according to an exemplary embodiment of the disclosure.

FIG. 61 shows an example of obtaining a first result by applying Option 3 to the scenario of FIG. 57. In step S6101, the UE may perform prioritization among channels with the same type but with a different priority index according to step S901. Since LP PUSCH collides with HP PUSCH which are the same type but different priority index, LP PUSCH is dropped according to prioritization Rule 1. Next, in step S6102, the UE may determine whether to perform multiplexing among channels with the same priority index based on step S902. Thus, the UE may multiplex HP UCI in HP PUCCH into HP PUSCH according to the mechanism of Alternative 2. Also, The UE may determine whether to perform multiplexing among channels with different priority indexes according to step S903. Thus, the UE may multiplex LP UCI in LP PUCCH with HP UCI in HP PUSCH based on the mechanism of Alternative B. In step S6103, the UE may determine whether to perform prioritization among channels with different priority indexes, but there is no collision among channels with different priority index. Thus, the UE may transmit HP PUSCH containing HP UCI and LP UCI.

Figure 62:
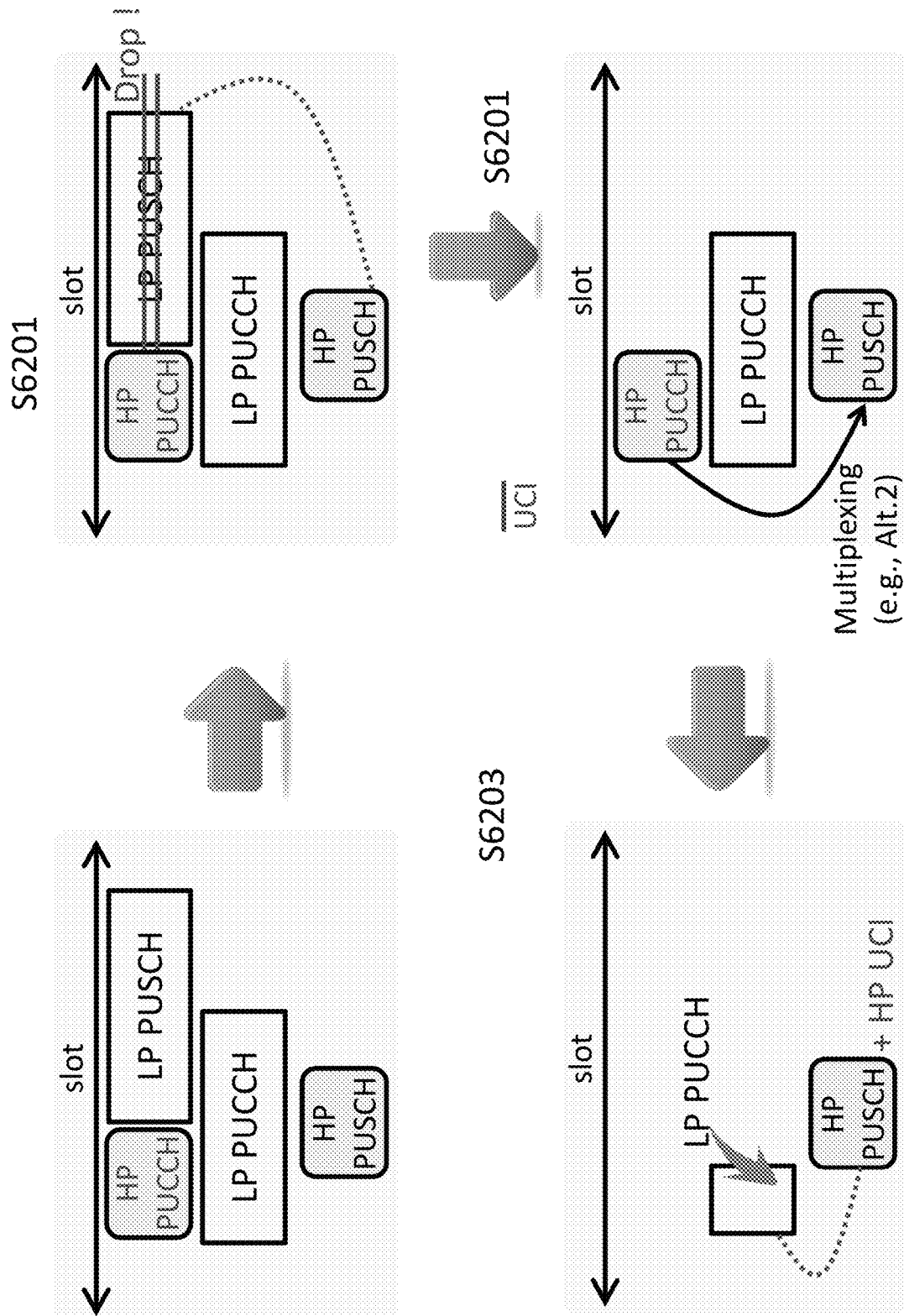
FIG. 62 illustrates a second result of applying Option 3 of the method used by a UE to multiplex UL transmissions to the fifth example according to an exemplary embodiment of the disclosure.

FIG. 62 shows an example of obtaining a second result by applying Option 3 to the scenario of FIG. 57. In step S6201, the UE would perform prioritization among channels with the same type but with a different priority index according to step S901. Since LP PUSCH collides with HP PUSCH which are the same type but different priority index, LP PUSCH is dropped according to prioritization Rule 1. Next, in step S6202, the UE may determine whether to perform multiplexing among channels with the same priority index based on step S902. Thus, the UE may multiplex HP UCI in HP PUCCH into HP PUSCH according to the mechanism of Alternative 2. Also, The UE may determine whether to perform multiplexing among channels with different priority indexes based on step S903. However, the UE may not multiplex LP UCI in LP PUCCH with HP UCI in HP PUSCH since a LP UCI is not allowed to multiplex with HP PUSCH or HP PUSCH that has been multiplexed with any HP UCI, or according to gNB configuration the multiplexing among channels with different priority is not allowed (e.g., disabled). In step S6203, the UE may determine whether to perform prioritization among channels with different priority indexes, and thus the UE may drop the portion of LP PUCCH that has collided with HP PUSCH. Thus, the UE may transmit the portion of LP PUCCH that has not been dropped and also HP PUSCH containing HP UCI without LP UCI since LP UCI was not allowed to be multiplexed into HP PUSCH.

Figure 63:
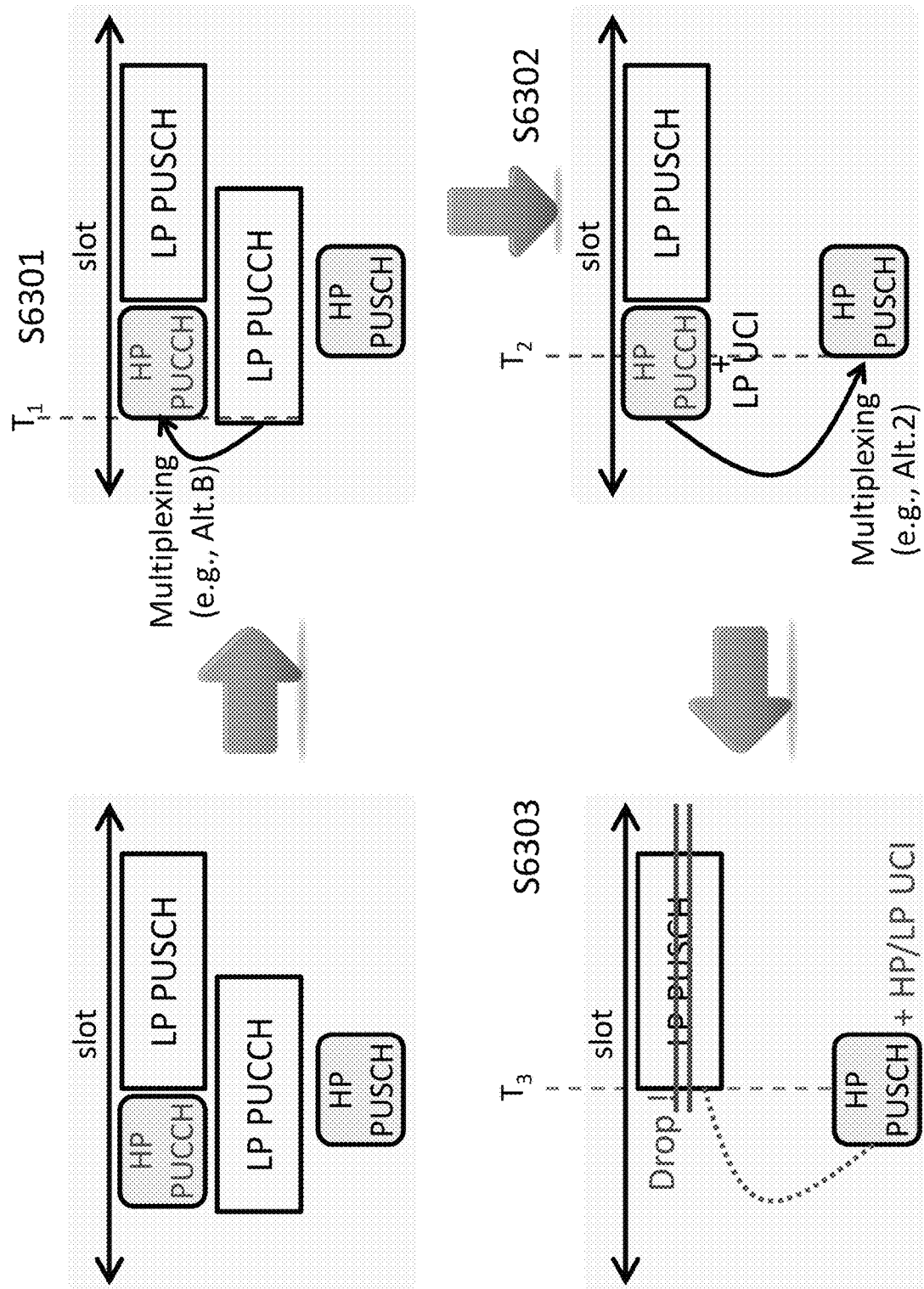
FIG. 63 illustrates a first result of applying Option 4 of the method used by a UE to multiplex UL transmissions to the fifth example according to an exemplary embodiment of the disclosure.

FIG. 63 shows an example of obtaining a first result by applying Option 4 to the scenario of FIG. 57. In step S6301, the UE is indicated to transmit HP PUCCH and LP PUCCH at time T1 and LP UCI in LP PUCCH could be multiplexed into HP PUCCH according to the mechanism of Alternative B. In step S6302, at time T2, as HP PUCCH collides with HP PUSCH, the UE may multiplex HP PUCCH which contains LP UCI into HP PUSCH according to the mechanism of Alternative 2. In step S6303, at time T3, as HP PUSCH collides with LP PUSCH, the UE may perform a prioritization between LP PUSCH and HP PUSCH by dropping LP PUSCH. Subsequently, the UE may transmit HP PUSCH containing HP UCI and LP UCI.

Figure 64:
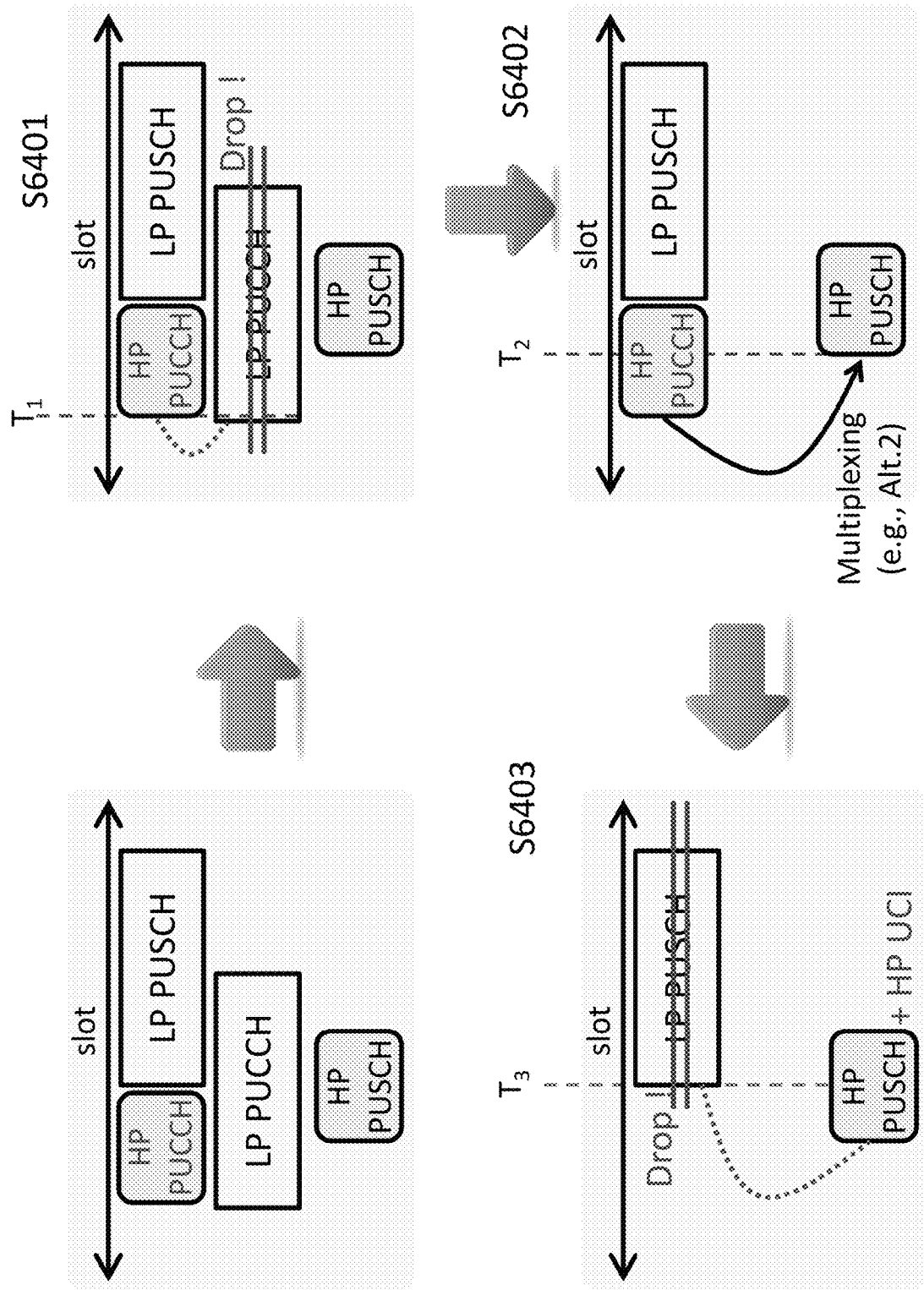
FIG. 64 illustrates a second result of applying Option 4 of the method used by a UE to multiplex UL transmissions to the fifth example according to an exemplary embodiment of the disclosure.

FIG. 64 shows an example of obtaining a second result by applying Option 4 to the scenario of FIG. 57. In step S6401, the UE is indicated to transmit HP PUCCH which collides with LP PUCCH at time T1, and the UE may perform a prioritization between HP PUCCH and LP PUCCH by subsequently dropping LP PUCCH. In step S6402, at time T2, HP PUCCH collides with HP PUSCH and thus UE may multiplex HP PUCCH into HP PUSCH according to the mechanism of Alternative 2. In step S6403, at time T3, HP PUSCH collides with LP PUCCH, and the UE may perform a prioritization between LP PUSCH and HP PUSCH by subsequently dropping LP PUSCH. Thus, the UE may transmit HP PUSCH which contains HP UCI.

Figure 65:
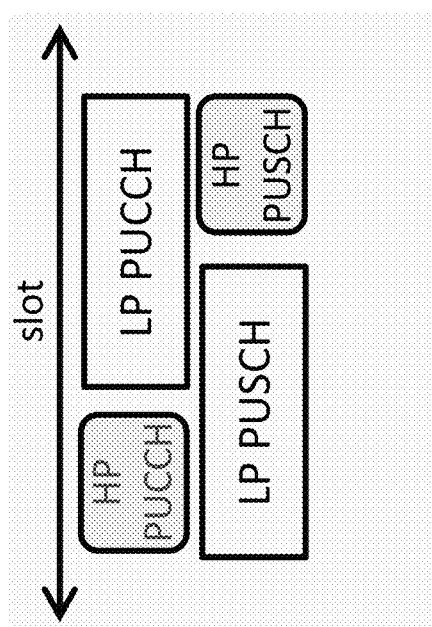
FIG. 65 illustrates a sixth example for applying the method used by a UE to multiplex UL transmissions according to an exemplary embodiment of the disclosure.
Figure 66:
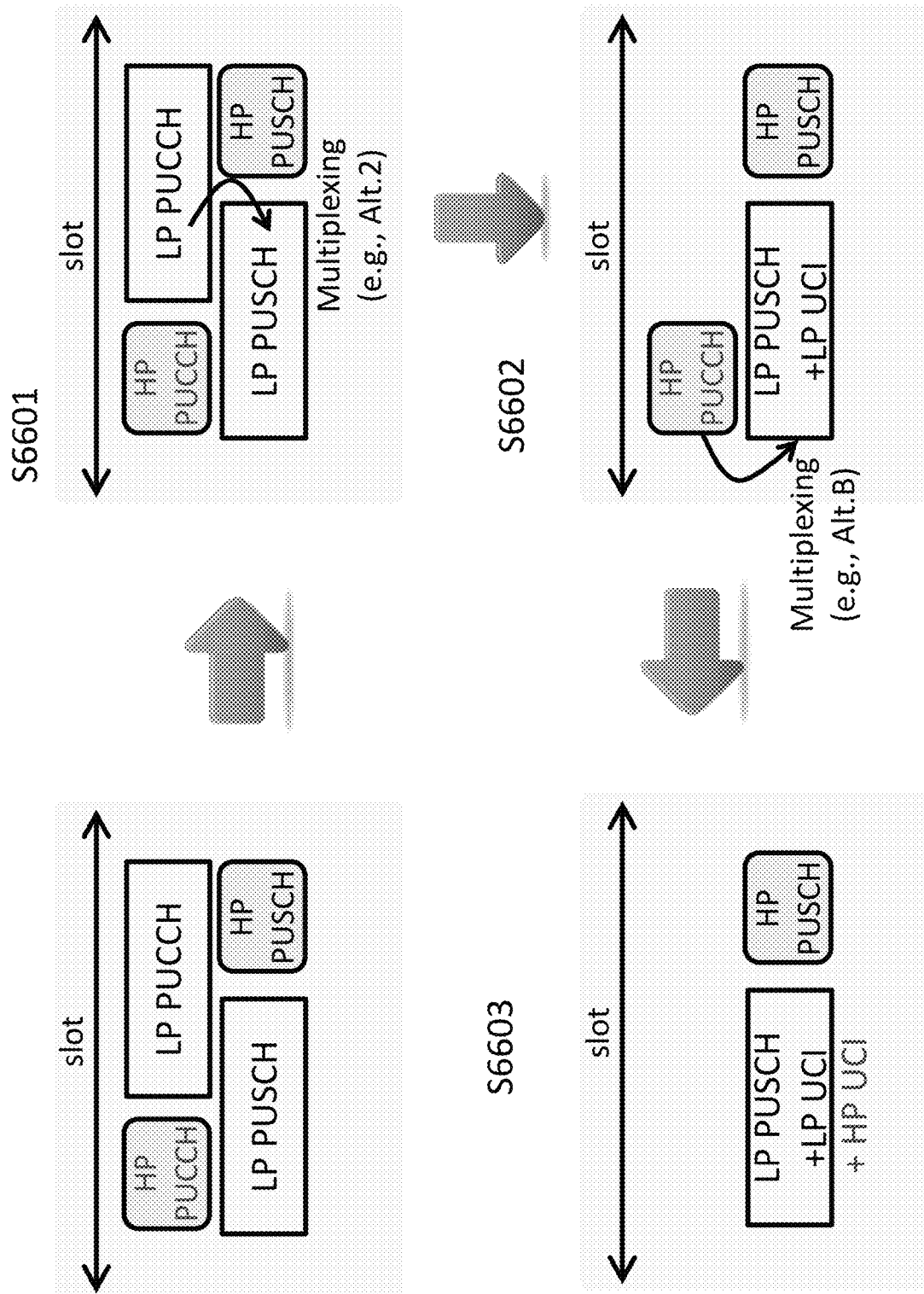
FIG. 66 illustrates applying Option 1 of the method used by a UE to multiplex UL transmissions to the sixth example according to an exemplary embodiment of the disclosure.

Next, FIG. 65 shows a sixth example including a scenario in which HP PUCCH is followed by LP PUCCH, and while HP PUCCH collides with LP PUSCH, LP PUCCH collides with HP PUSCH. FIG. 66 shows an example of the result after applying Option 1 to the scenario of FIG. 65. In step S6601, the UE may determine whether to perform multiplexing among channels with same priority index according to step S701 as previously described. Thus, as LP PUCCH overlaps with LP PUSCH, the UE may multiplex LP UCI in LP PUCCH into LP PUSCH based on the mechanism of Alternative 2, but HP PUCCH is not multiplexed into HP PUSCH since they do not overlap in time. Next, in step S6602, the UE may determine whether to perform multiplexing among channels with different priority indexes according to step S702 and thus the UE may multiplex HP UCI in HP PUCCH into LP PUSCH which may contain LP UCI according to the mechanism of Alternative B. Next, in step S6603, the UE may determine whether to perform prioritization among channel with different priority indexes according to the step S703, but a prioritization is not necessary since LP PUSCH does not collide with HP PUSCH. Thus, the UE may transmit LP PUSCH followed by HP PUSCH, and LP PUSCH may contain LP UCI and HP UCI.

Figure 67:
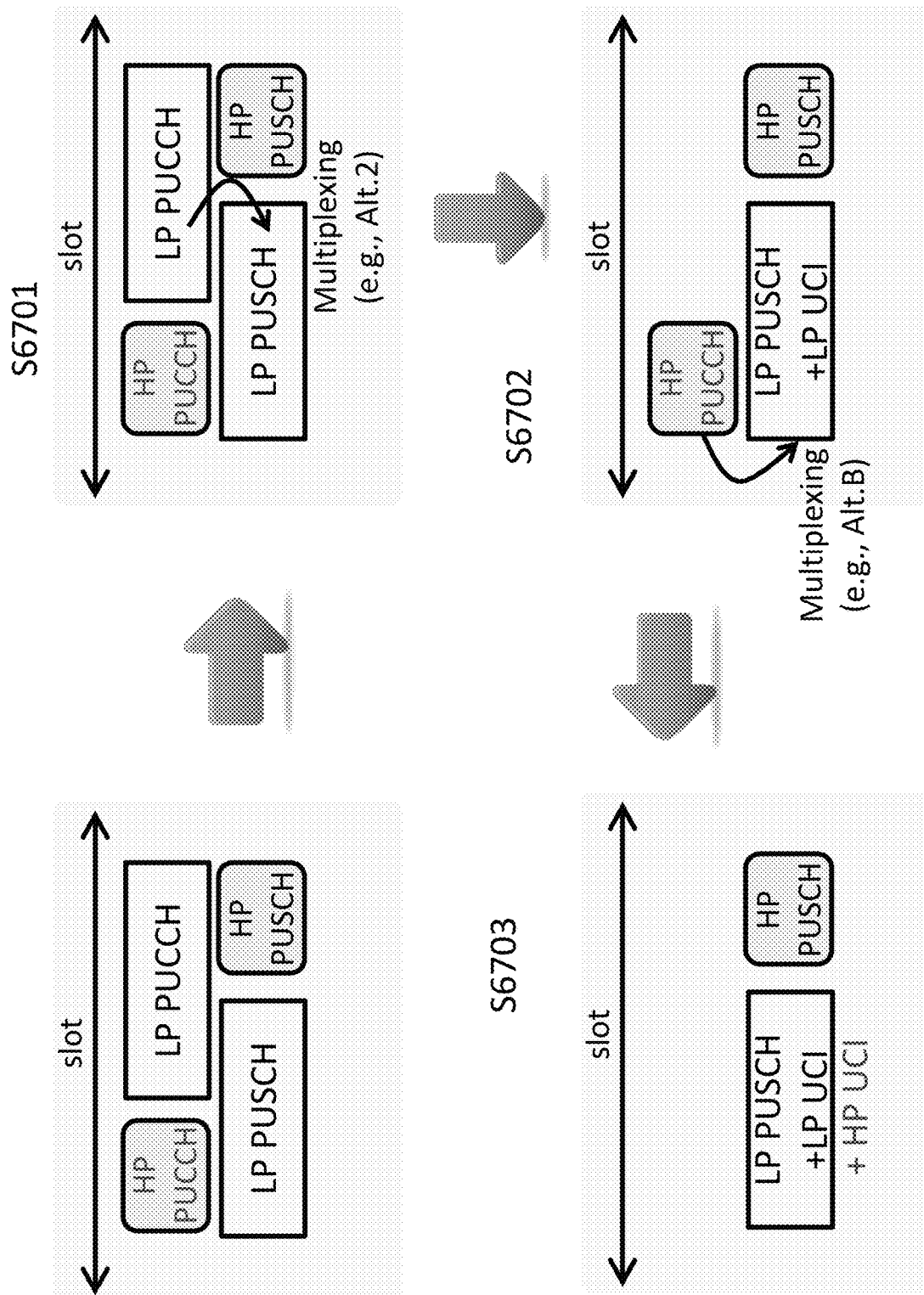
FIG. 67 illustrates applying Option 2 of the method used by a UE to multiplex UL transmissions to the sixth example according to an exemplary embodiment of the disclosure.

FIG. 67 as an example shows the result of applying Option 2 to the scenario of FIG. 65. In step S6701, the UE may determine whether to perform multiplexing among channels with a first priority index according to step S801 but such step is not applicable since HP PUCCH does not collide with HP PUSCH. Next, the UE may determine whether to perform multiplexing among channels with second priority index, and according to step S802, a channel of the second priority index could be multiplexed into another channel if the channel of the second priority index does not collide with another channel of a higher priority index of the same type. Since LP PUSCH does not collide with HP PUSCH, UE may multiplex LP UCI in LP PUCCH into LP PUSCH according to the mechanism of Alternative 2. In step S6702, the UE may determine whether to perform multiplexing among channels with different priority indexes according to step S803, and thus the UE may multiplex HP UCI in HP PUCCH into LP PUSCH which contains LP UCI according to the mechanism of Alternative B. In step S6703, the UE may transmit LP PUSCH containing both LP UCI and HP UCI and HP PUSCH.

Figure 68:
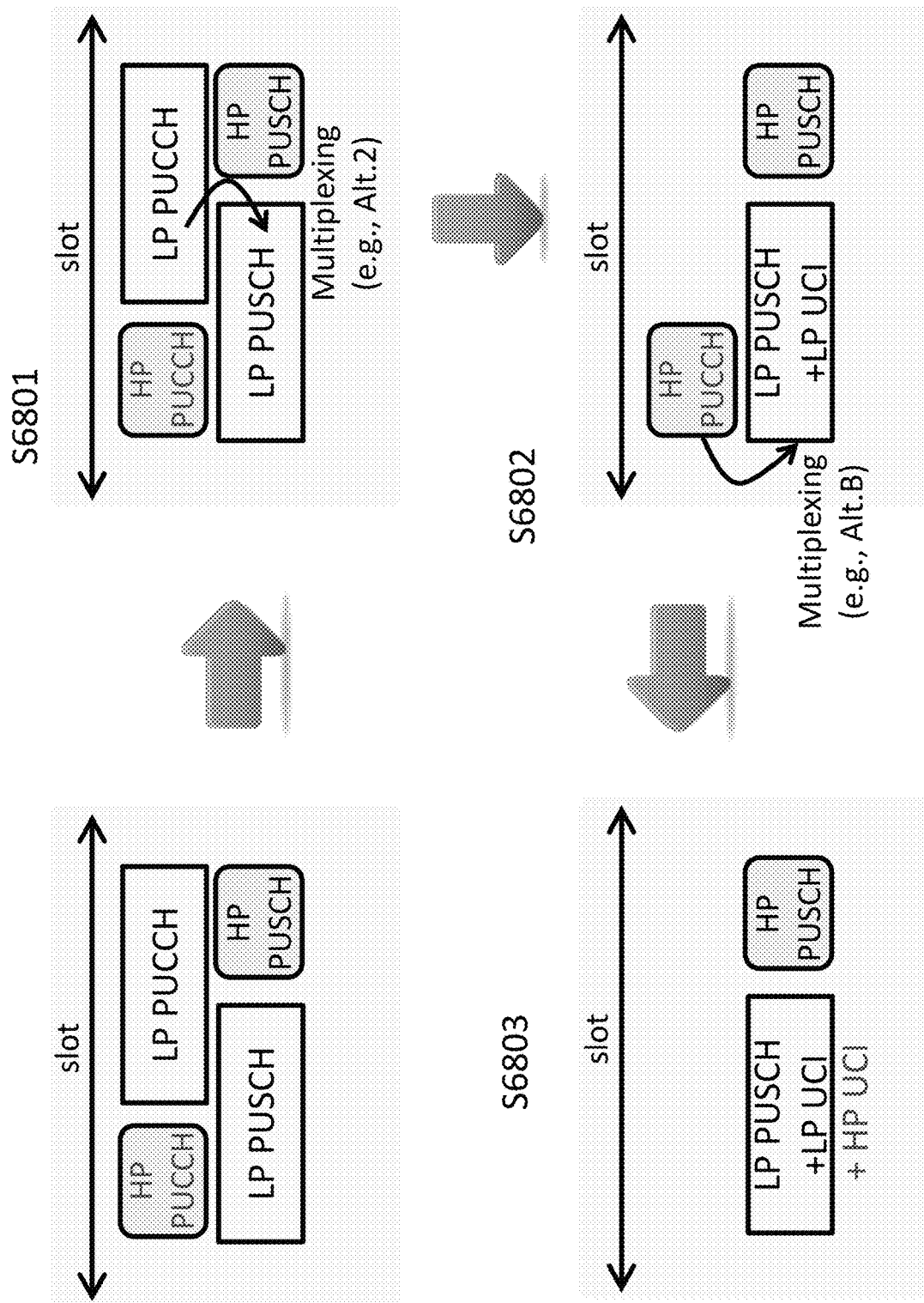
FIG. 68 illustrates applying Option 3 of the method used by a UE to multiplex UL transmissions to the sixth example according to an exemplary embodiment of the disclosure.

FIG. 68 as an example shows the result of applying Option 3 to the scenario of FIG. 65. In step S6801, the UE may determine whether to perform prioritization among channels with same type but with different priority indexes as described in step S901. Thus, the UE may not drop any channel since such collision does not happen. Next, the UE may determine whether to perform multiplexing among channels with same priority index as described in step S902. Thus, the UE may multiplex LP UCI in LP PUCCH into LP PUSCH according to mechanism of Alternative 2. In step S6802, the UE may determine whether to perform multiplexing among channels with different priority indexes as described in step S903, and thus the UE may multiplex HP UCI in HP PUCCH into LP PUSCH which may contain LP UCI. In step S6803, the UE may determine whether to perform prioritization among channel with different priority indexes as described in step S904, but there is no prioritization to be performed since there are no collisions among remaining channels with different priority indexes. Thus, the UE may transmit LP PUSCH containing both HP UCI and LP UCI and HP PUCCH.

Figure 69:
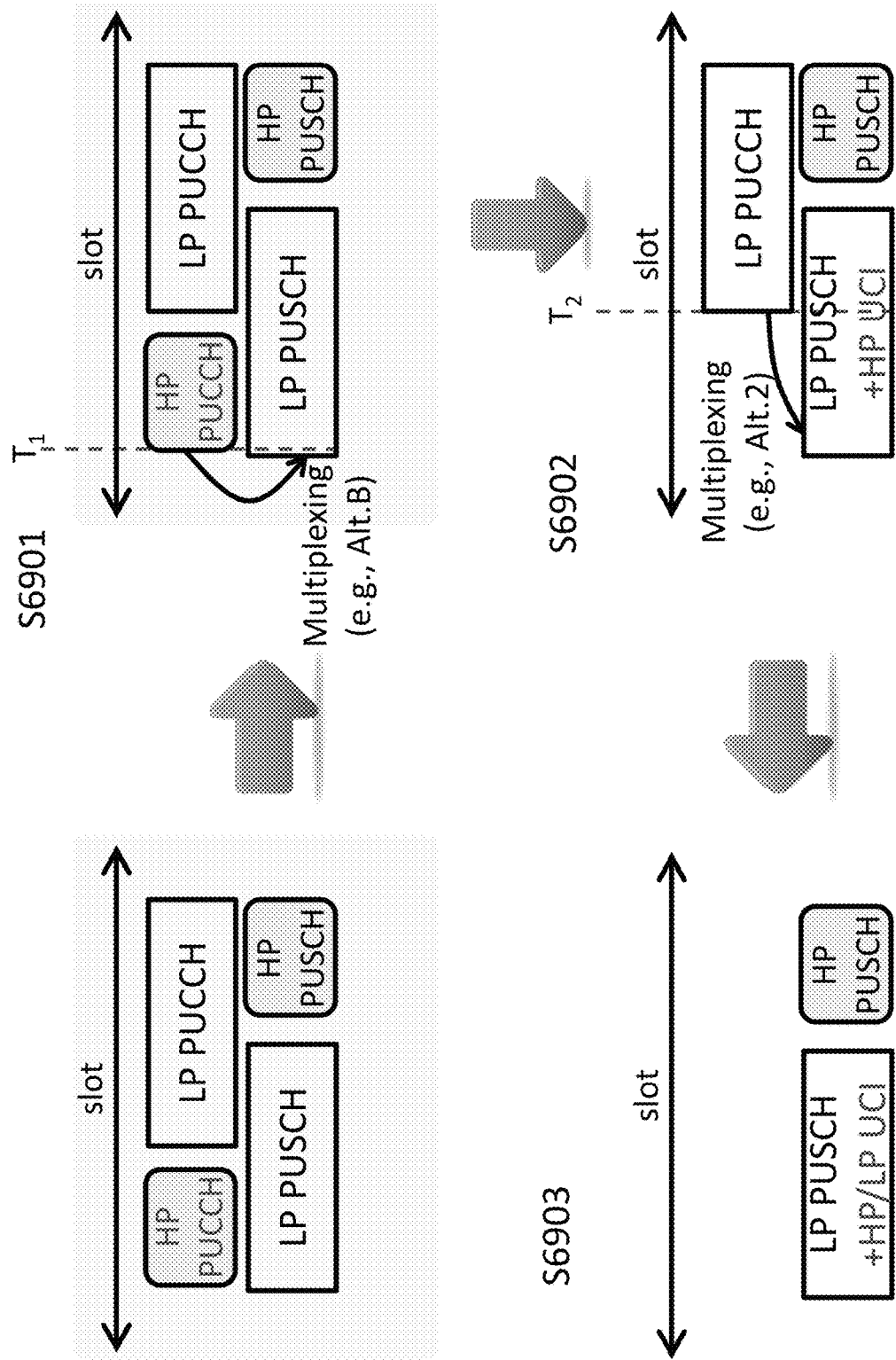
FIG. 69 illustrates a first result from applying Option 4 of the method used by a UE to multiplex UL transmissions to the sixth example according to an exemplary embodiment of the disclosure.

FIG. 69 as an example shows the first result of applying option 4 to the scenario of FIG. 65. In step S6901, at time T1, there is a collision between HP PUCCH and LP PUSCH, and the UE may multiplex HP PUCCH into LP PUSCH according to the mechanism of Alternative B. In step S6902, at time T2, there is a collision between LP PUCCH and LP PUSCH which contains the previously multiplexed HP UCI, and thus the UE may multiplex LP UCI in LP PUCCH into LP PUSCH according to the mechanism of Alternative 2. In step S6903, the UE may transmit LP PUSCH which contains both HP UCI and LP UCI and also HP PUCCH.

Figure 70:
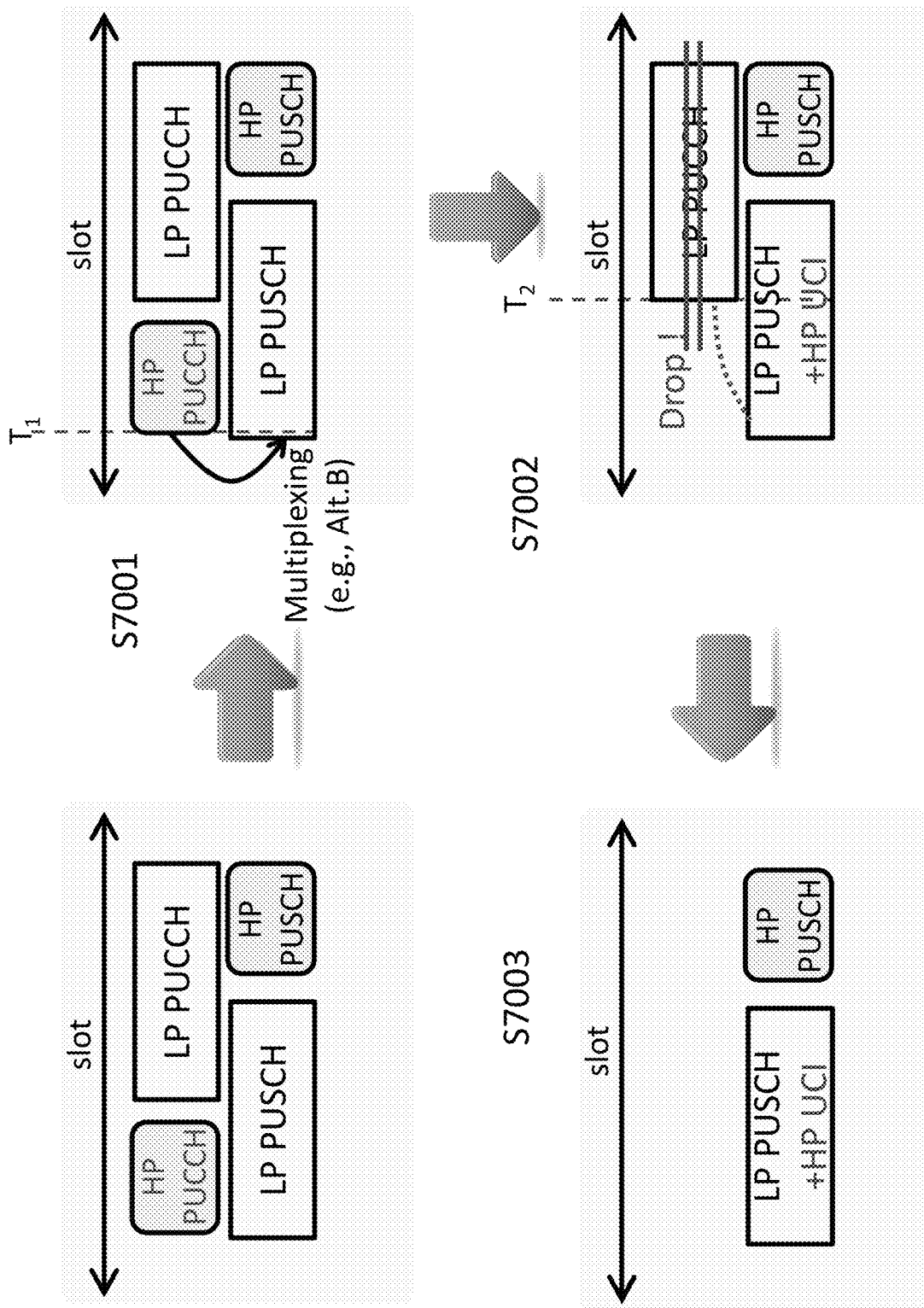
FIG. 70 illustrates a second result from applying Option 4 of the method used by a UE to multiplex UL transmissions to the sixth example according to an exemplary embodiment of the disclosure.

FIG. 70 as an example shows the second result of applying option 4 to the scenario of FIG. 65. In step S7001, at time T1, there is a collision between HP PUCCH and LP PUSCH, and the UE may multiplex HP PUCCH into LP PUSCH according to the mechanism of Alternative B. In step S7702, at time T2, LP PUSCH would collide with LP PUCCH, the UE may not multiplex LP UCI in LP PUCCH with HP UCI in LP PUSCH since a LP UCI is not allowed to multiplex with LP PUSCH that has been multiplexed with any HP UCI, or according to gNB configuration the multiplexing among channels with different priority is not allowed (e.g., disabled). In step S7703, at time T3, the UE may transmit LP PUSCH which contains HP UCI and also HP PUSCH.

Figure 71:
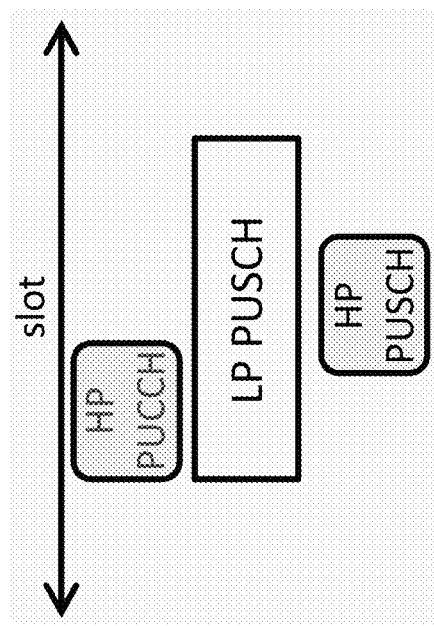
FIG. 71 illustrates a seventh example for applying the method used by a UE to multiplex UL transmissions according to an exemplary embodiment of the disclosure.

Next, FIG. 71 shows a seventh example including a scenario in which HP PUCCH collides with LP PUSCH which collides with HP PUSCH which collides with HP PUCCH. FIG. 72 as an example shows the result of applying Option 1 to the scenario of FIG. 71. In step S7201, the UE may determine whether to perform multiplexing among channels with same priority index according to step S701 as previously described. Thus, the UE may multiplex HP UCI in HP PUCCH into HP PUSCH based on the mechanism of Alternative 2. Next, in step S7202, the UE may determine whether to perform multiplexing among channels with different priority indexes according to step S702 but such multiplexing is not needed for HP PUSCH and LP PUSCH. Next, the UE may determine whether to perform prioritization among channel with different priority indexes according to the step S703. Thus, the UE may maintain the portion of LP PUSCH which does not collide with HP PUSCH, and the UE may transmit HP PUSCH which contains HP UCI with the portion of LP PUSCH that was not dropped. In detail, the LP PUSCH may be cancelled at latest from the first symbol that is overlapped with the HP PUSCH.

Further, applying Option 2 to the scenario of FIG. 71 produces the same result as Option 1. Referring to FIG. 71, in step S7201, the UE may determine whether to perform multiplexing among channels with a first priority index according to step S801 and thus the UE may multiplex HP PUCCH into HP PUSCH according to Alternative 2. In step S7202, the UE may determine whether to perform multiplexing among channels with a second priority index according to step S802, but there are no channels with the second priority index to multiplex. Next, the UE may determine whether to perform multiplexing among channels with different priority indexes according to step S803, but there are no channels with the second priority index to multiplex. Next, the UE may Determine whether to perform prioritization among channel with different priority indexes as described in step S804. Thus, the UE may maintain the portion of LP PUSCH which does not collide with HP PUSCH, and the UE may transmit HP PUSCH which contains HP UCI with the portion of LP PUSCH that was not dropped. In detail, the LP PUSCH may be cancelled at latest from the first symbol that is overlapped with the HP PUSCH.

Figure 73:
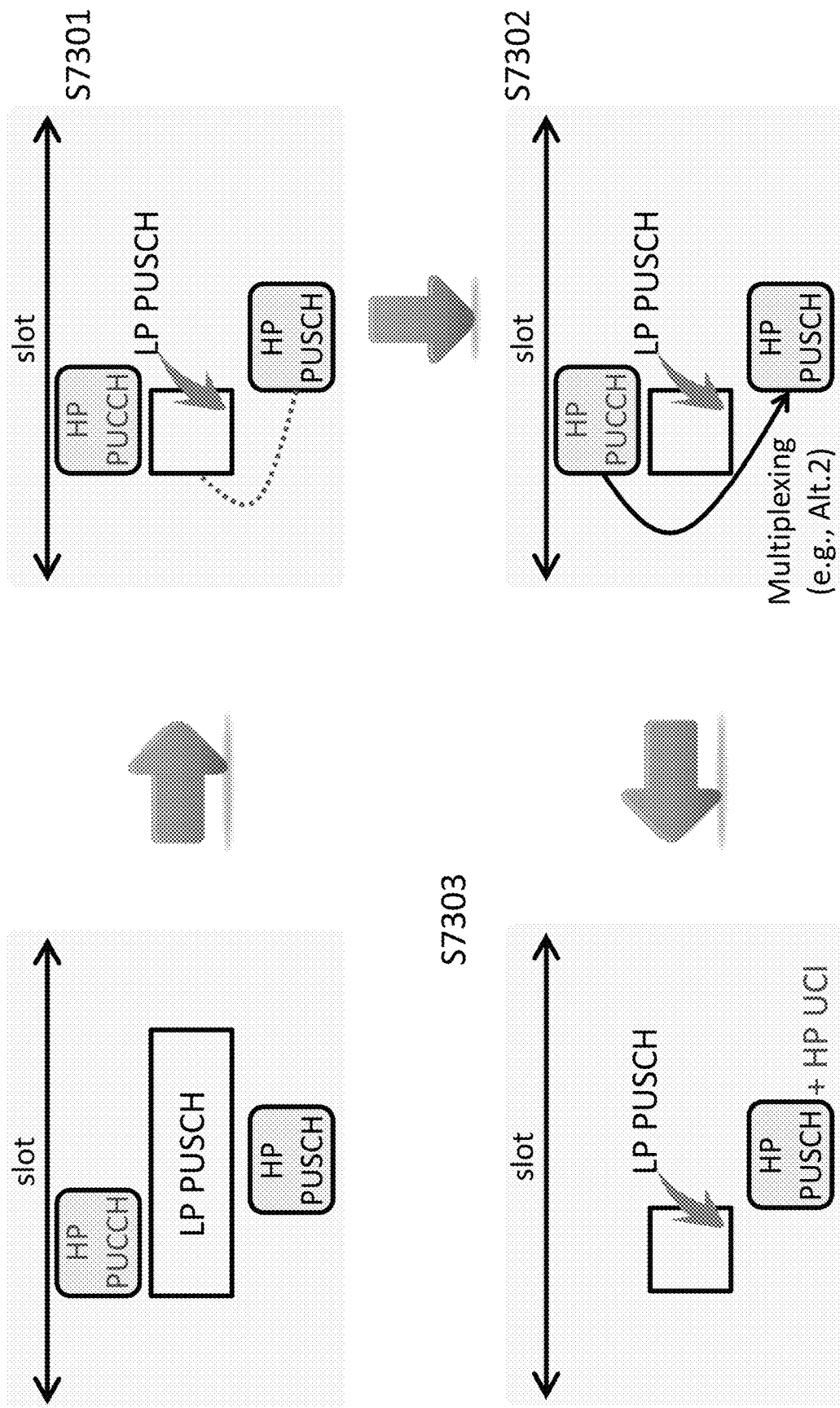
FIG. 73 illustrates applying Option 3 of the method used by a UE to multiplex UL transmissions to the seventh example according to an exemplary embodiment of the disclosure.

FIG. 73 is an example which shows the result of applying Option 3 to the scenario of FIG. 71. In step S7301, the UE may determine whether to perform prioritization among channels with same type but with different priority indexes as described in step S901. Thus, the UE may drop the portion of LP PUSCH which collides with HP PUSCH and maintain the portion of LP PUSCH which does not collide with HP PUSCH. In detail, the LP PUSCH may be cancelled at latest from the first symbol that is overlapped with the HP PUSCH. In step S7302, the UE may determine whether to perform multiplexing among channels with same priority index. Thus, the UE may multiplex HP UCI in HP PUCCH into HP PUSCH based on the mechanism of Alternative 2. Next, the UE may determine whether to perform multiplexing among channels with different priority indexes as described in step S903, but there are no collisions among remaining channels with different priority indexes. Next, the UE may determine whether to perform prioritization among channel with different priority indexes as described in step S904, but there is no prioritization to be performed since there are no collisions among remaining channels with different priority indexes. In step S7303, the UE may transmit HP PUSCH containing HP UCI and the portion of LP PUSCH that was maintained.

Figure 74:
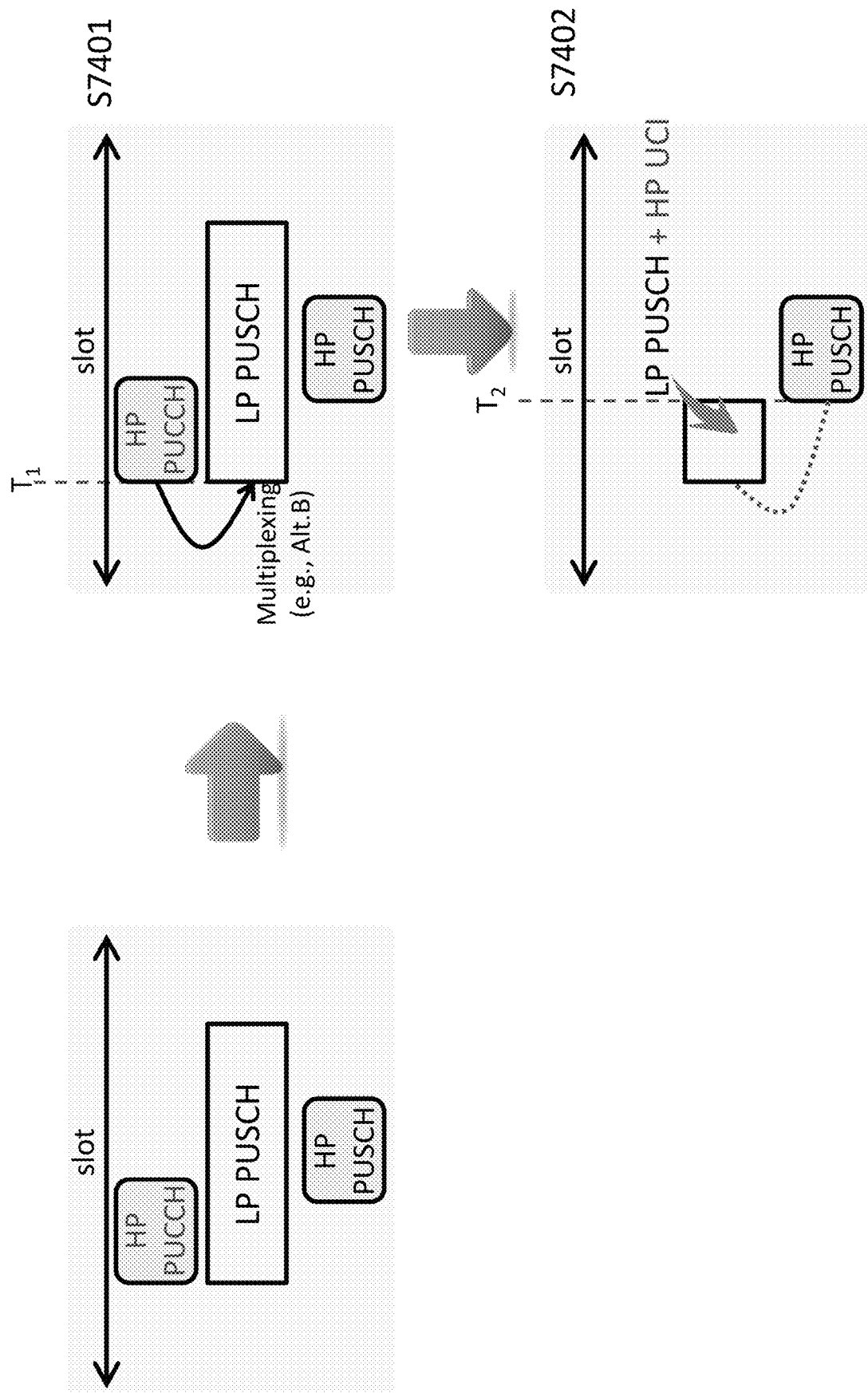
FIG. 74 illustrates applying Option 4 of the method used by a UE to multiplex UL transmissions to the seventh example according to an exemplary embodiment of the disclosure.

FIG. 74 as an example shows the result of applying Option 4 to the scenario of FIG. 71. In step S7401, at time T1, the UE is indicated to transmit HP PUCCH and LP PUSCH which collide with each other, and the UE may multiplex HP UCI in HP PUCCH into LP PUSCH according to the mechanism of Alternative B, and thus the LP PUSCH would contain HP UCI. In step S7402, at time T2, as LP PUSCH collides with HP PUSCH, the UE may perform a prioritization between LP PUSCH and HP PUSCH by maintaining the portion of LP PUSCH that does not collide with HP PUSCH and by dropped the portion of LP PUSCH that has collided with HP PUSCH. Subsequently, the UE may transmit the portion of LP PUSCH which contains HP UCI with HP PUSCH.

Figure 75:
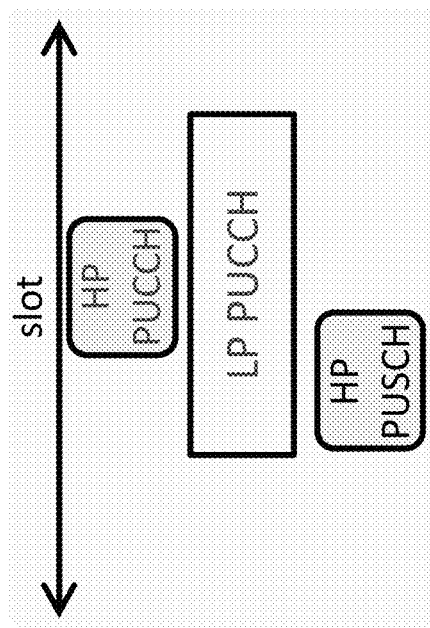
FIG. 75 illustrates an eighth example for applying the method used by a UE to multiplex UL transmissions according to an exemplary embodiment of the disclosure.
Figure 76:
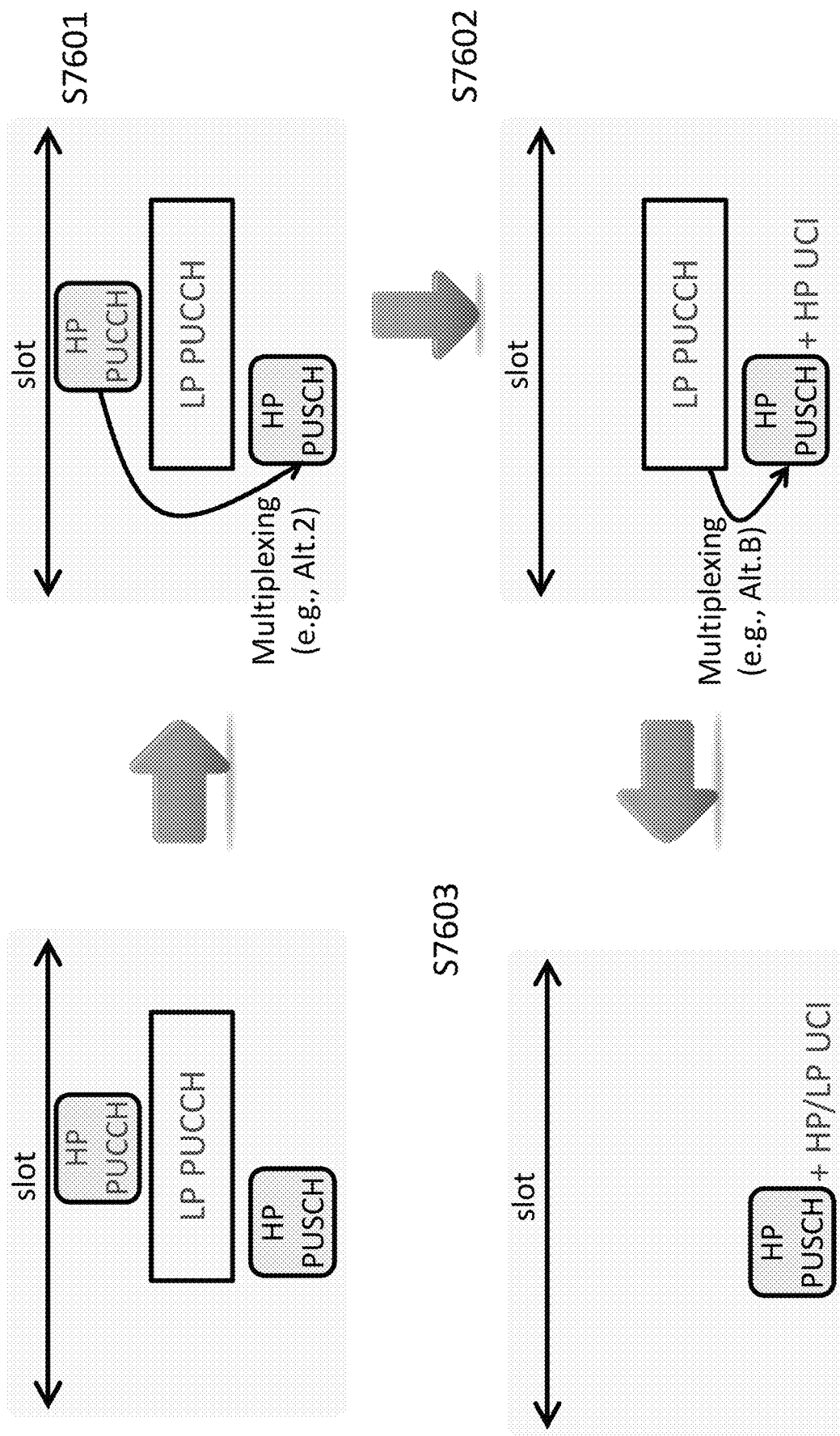
FIG. 76 illustrates a first result of applying Options 1, 2, and 3 of the method used by a UE to multiplex UL transmissions to the eighth example according to an exemplary embodiment of the disclosure.

Next, FIG. 75 shows an eighth example containing a scenario in which LP PUCCH collides with HP PUSCH, and LP PUCCH later on also collides with HP PUCCH. FIG. 76 as an example shows a first result of applying Option 1, 2, and 3 to the scenario of FIG. 75. For Option 1, in step S7601, the UE may determine whether to perform multiplexing among channels with same priority index according to step S701 as previously described. Thus, the UE may multiplex HP UCI in HP PUCCH into HP PUSCH based on the mechanism of Alternative 2. Next, in step S7602, the UE may determine whether to perform multiplexing among channels with different priority indexes according to step S702, and thus the UE may multiplex LP UCI in LP PUCCH with HP UCI in HP PUSCH. Next, the UE may determine whether to perform prioritization among channel with different priority indexes according to the step S703, but there is no prioritization necessary since LP PUCCH has been multiplexed into HP PUSCH. In step S7603, the UE may transmit HP PUSCH which contains HP UCI multiplexed with LP UCI. The results of applying Option 2 and 3 would be the same as the result of applying Option 1.

Figure 77:
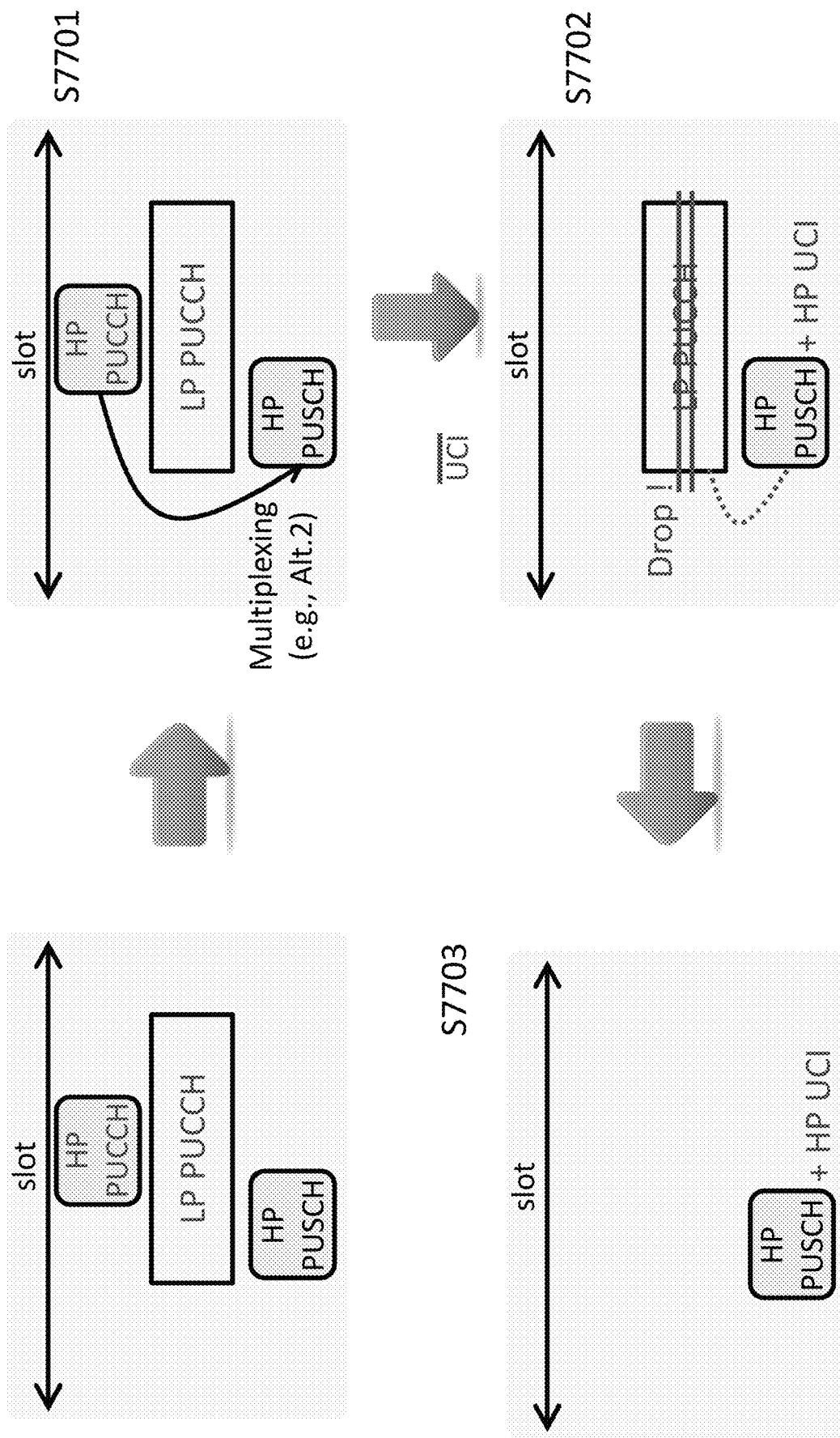
FIG. 77 illustrates a second result of applying Options 1, 2, and 3 of the method used by a UE to multiplex UL transmissions to the eighth example according to an exemplary embodiment of the disclosure.

FIG. 77 as an example shows a second result of applying Option 1, 2, and 3 to the scenario of FIG. 75. For this example, the application of Option 2 is described in detail, but the results of applying Option 1 and Option 3 would be the same. In step S7701, the UE may determine whether to perform multiplexing among channels with a first priority index according to step S801, and thus the UE may multiplex HP UCI in HP PUCCH into HP PUSCH according to the mechanism of Alternative 2. In step S7702, the UE may determine whether to perform multiplexing among channels with a second priority index according to step S802, but there are no multiple channels with the second priority index to multiplex. Next, the UE may determine whether to perform multiplexing among channels with different priority indexes according to step S803, but for this case the UE may not multiplex LP UCI into HP PUSCH or into HP USCH which has been multiplexed with HP UCI. Next, the UE may determine whether to perform prioritization among channel with different priority indexes as described in step S804. Thus, the UE may drop LP PUSCH since it collides with HP PUSCH. In step S7703, and the UE may transmit HP PUSCH which contains HP UCI.

Figure 78:
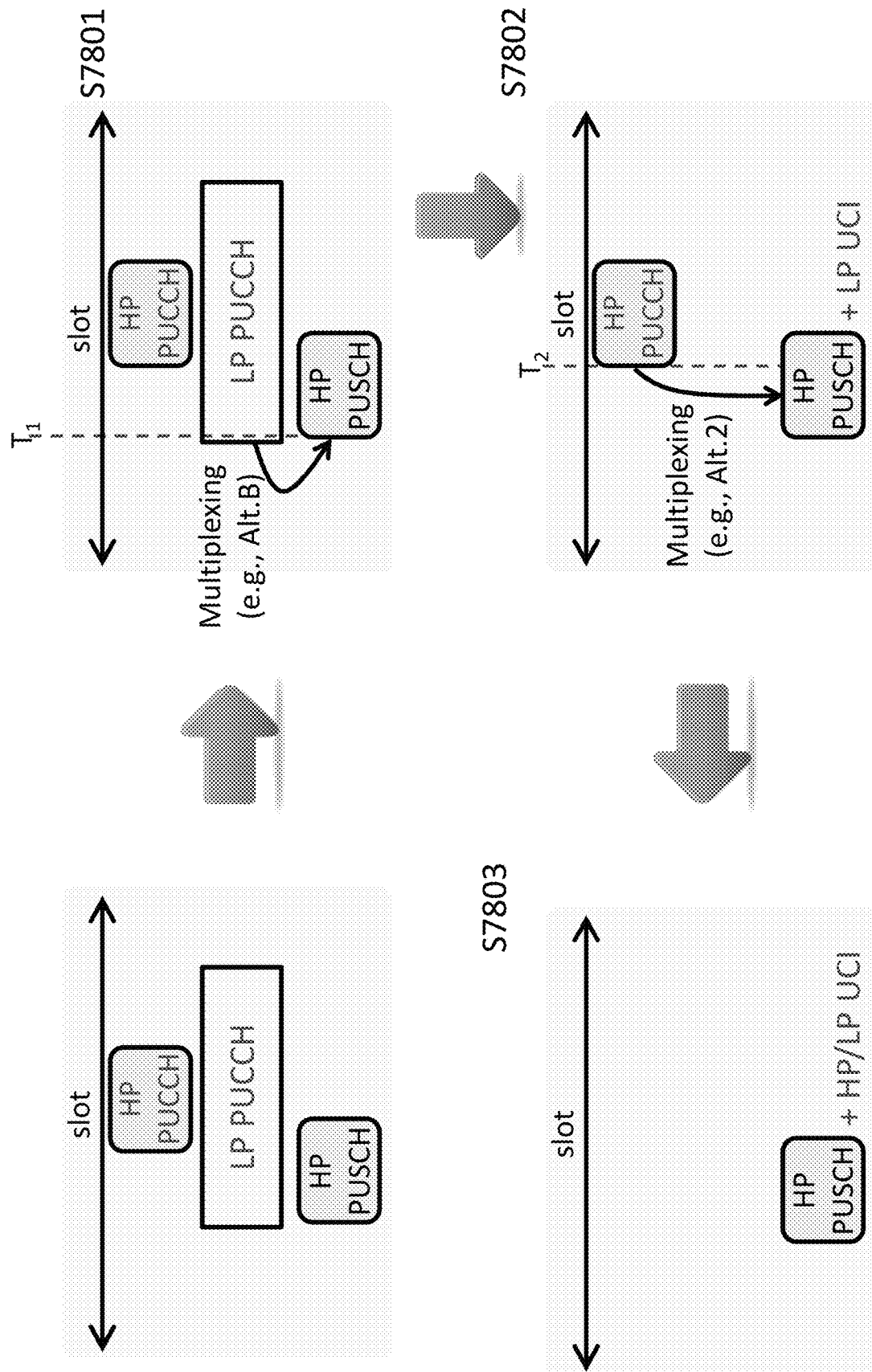
FIG. 78 illustrates a first result of applying Option 4 of the method used by a UE to multiplex UL transmissions to the eighth example according to an exemplary embodiment of the disclosure.

FIG. 78 is an example which shows a first result of applying Option 4 to the scenario of FIG. 75. In step S7801, at time T1, LP PUCCH has collided with HP PUSCH, and the UE may multiplex LP PUCCH into HP PUSCH, and thus HP PUSCH may contain LP UCI. It should be noted that whether LP UCI is allowed to be multiplexed with HP UCI in HP PUSCH could be determined according to a gNB configuration such as via a higher layer signaling or according to an indication via DCI which could be the DCI for triggering the HP PUSCH. In step S7802, at time T2, HP PUSCH is assumed to be colliding with HP PUCCH, and the UE may multiplex HP PUCCH into HP PUSCH which contains LP UCI according to the mechanism of Alternative 2. In step S7803, the UE may transmit HP PUSCH which may contain HP UCI and LP UCI.

Figure 79:
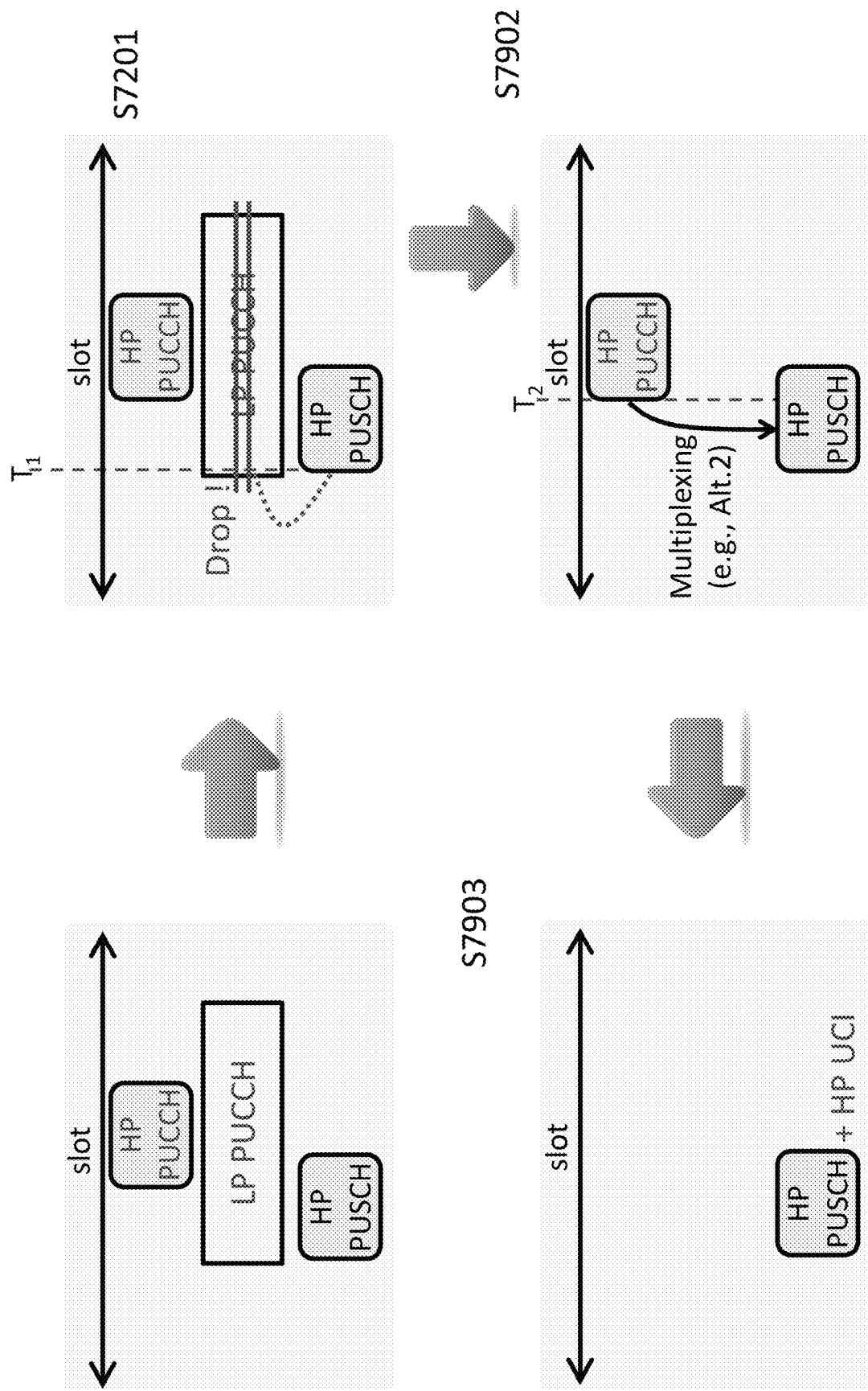
FIG. 79 illustrates a second result of applying Option 4 of the method used by a UE to multiplex UL transmissions to the eighth example according to an exemplary embodiment of the disclosure.

FIG. 79 as an example shows a second result of applying Option 4 to the scenario of FIG. 75. In step S7901, at time T1, LP PUCCH has collided with HP PUSCH, and the UE may perform a prioritization between LP PUCCH and HP PUSCH by dropping LP PUCCH. It should be noted that whether LP UCI is allowed to be multiplexed with HP UCI in HP PUSCH could be determined according to a gNB configuration such as via a higher layer signaling or according to an indication via DCI which could be the DCI for triggering the HP PUSCH. In step S7902, at time T2, HP PUSCH is assumed to be colliding with HP PUCCH, and the UE may multiplex HP PUCCH into HP PUSCH which contains LP UCI according to the mechanism of Alternative 2. In step S7803, the UE may transmit HP PUSCH which may contain HP UCI but without LP UCI.

Figure 80:
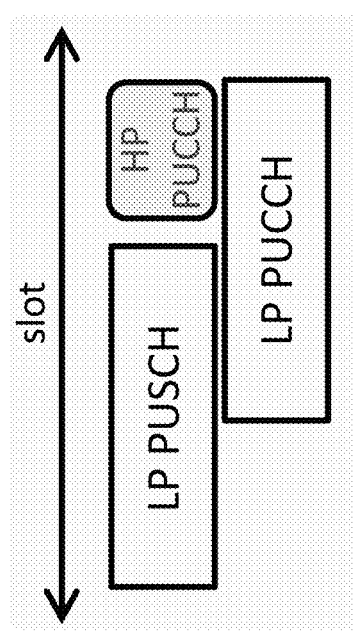
FIG. 80 illustrates a ninth example for applying the method used by a UE to multiplex UL transmissions according to an exemplary embodiment of the disclosure.
Figure 81:
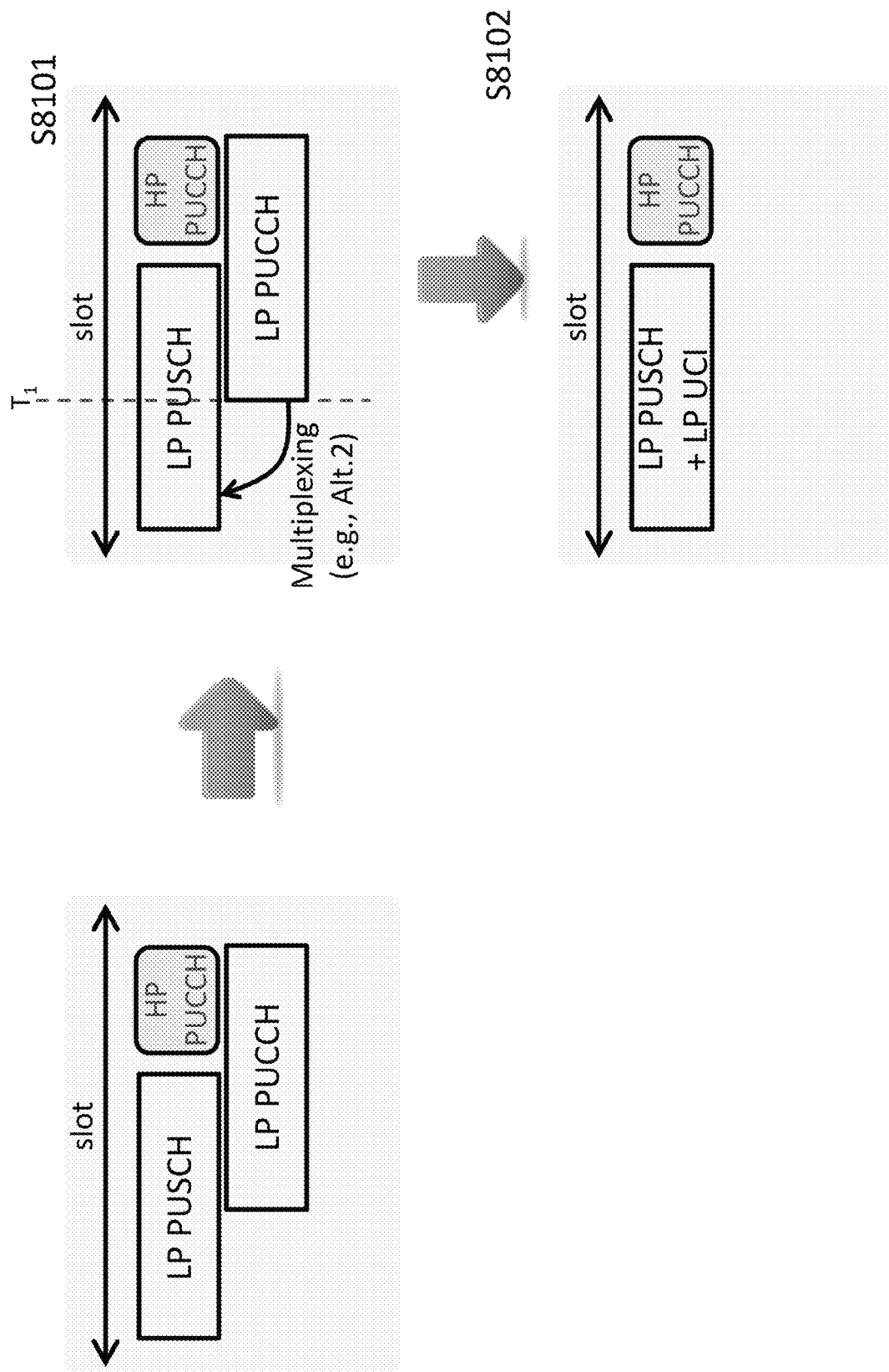
FIG. 81 illustrates applying Options 1, 2, 3, and 4 of the method used by a UE to multiplex UL transmissions to the ninth example according to an exemplary embodiment of the disclosure.

Next, FIG. 80 shows a ninth example which contains a scenario in which LP PUSCH is followed by HP PUCCH, and both LP PUSCH and HP PUCCH collides with LP PUCCH. FIG. 81 is an example which shows the result of applying Option 1, 2, 3, and 4 to the scenario of FIG. 80. For Option 1, in step S8101, the UE may determine whether to perform multiplexing among channels with same priority index according to step S701 as previously described. Thus, the UE may multiplex LP UCI in LP PUCCH into LP PUSCH based on the mechanism of Alternative 2. Next, the UE may determine whether to perform multiplexing among channels with different priority indexes according to step S702, but there are no longer channels with different priority indexes colliding. Next, the UE may determine whether to perform prioritization among channel with different priority indexes according to the step S703, but there is no prioritization necessary since LP PUCCH has been multiplexed into LP PUSCH. In step S8102, the UE may transmit LP PUSCH which contains LP UCI and also HP PUCCH. The results of applying Option 2, 3, and 4 would be the same as the result of applying Option 1.

Figure 82:
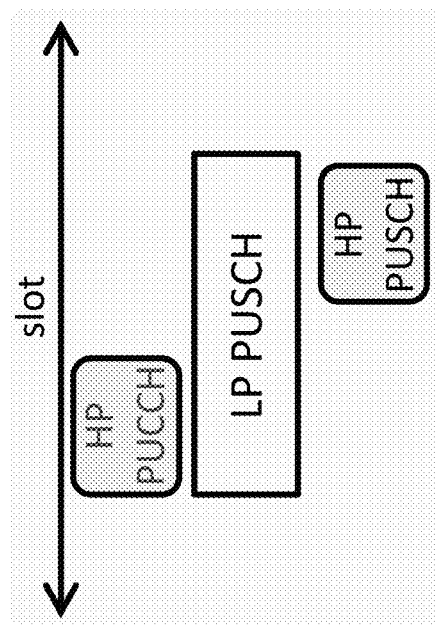
FIG. 82 illustrates a tenth example for applying the method used by a UE to multiplex UL transmissions according to an exemplary embodiment of the disclosure.
Figure 83:
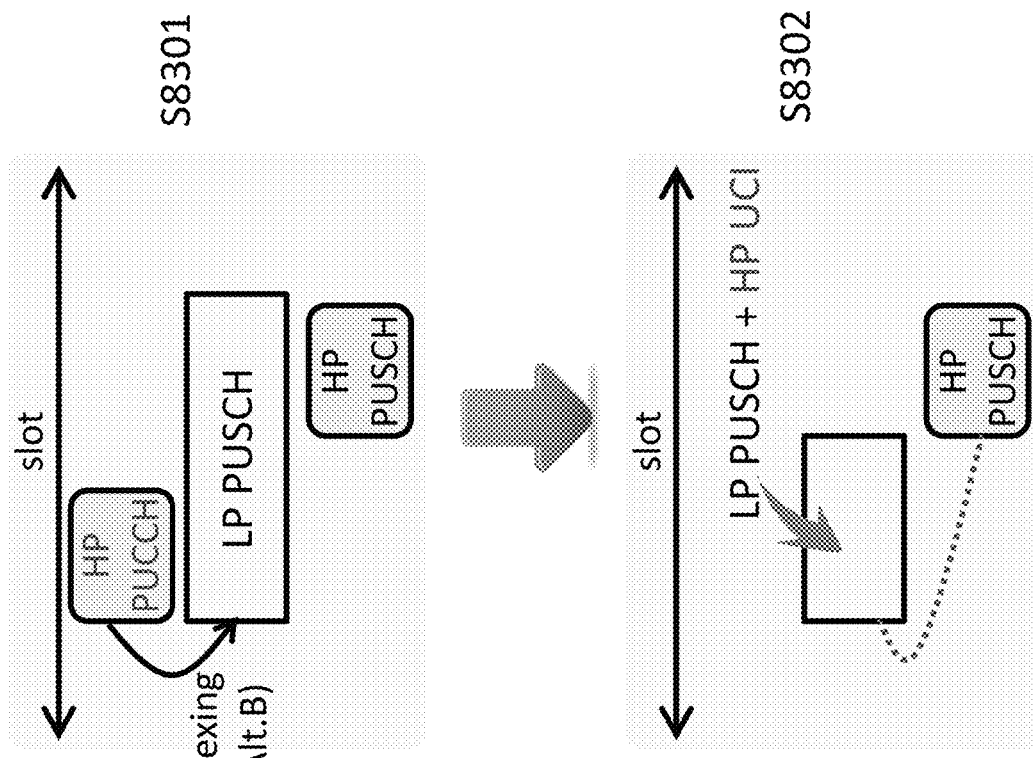
FIG. 83 illustrates a first result of applying Options 1 of the method used by a UE to multiplex UL transmissions to the tenth example according to an exemplary embodiment of the disclosure.

Next, FIG. 82 shows a tenth example which contains a scenario in which HP PUCCH collides with LP PUSCH which later on collides with HP PUSCH. FIG. 83 is an example which shows a first result of applying Option 1 to the scenario of FIG. 82. In step S8301, the UE may determine whether to perform multiplexing among channels with same priority index according to step S701 as previously described, but there are no colliding channels of the same priority index and thus step S701 is not applicable. Next, the UE may determine whether to perform multiplexing among channels with different priority indexes according to step S702, and thus UE may multiplex HP UCI in HP PUCCH into LP PUSCH according to the mechanism of Alternative B. Also, the HP UCI in HP PUSCH could be multiplexed into LP PUSCH which has collided with HP PUSCH, and the number of resource(s) for HP UCI in LP PUSCH could be determined according to the resource which is not dropped due to the collision. Next, the UE may determine whether to perform prioritization among channel with different priority indexes according to the step S703, and thus the UE may drop the portion of LP PUSCH which has collided with HP PUSCH. In step S8302, the UE may transmit the portion of LP PUSCH which contains HP UCI previously multiplexed into LP PUSCH and also HP PUSCH.

Figure 84:
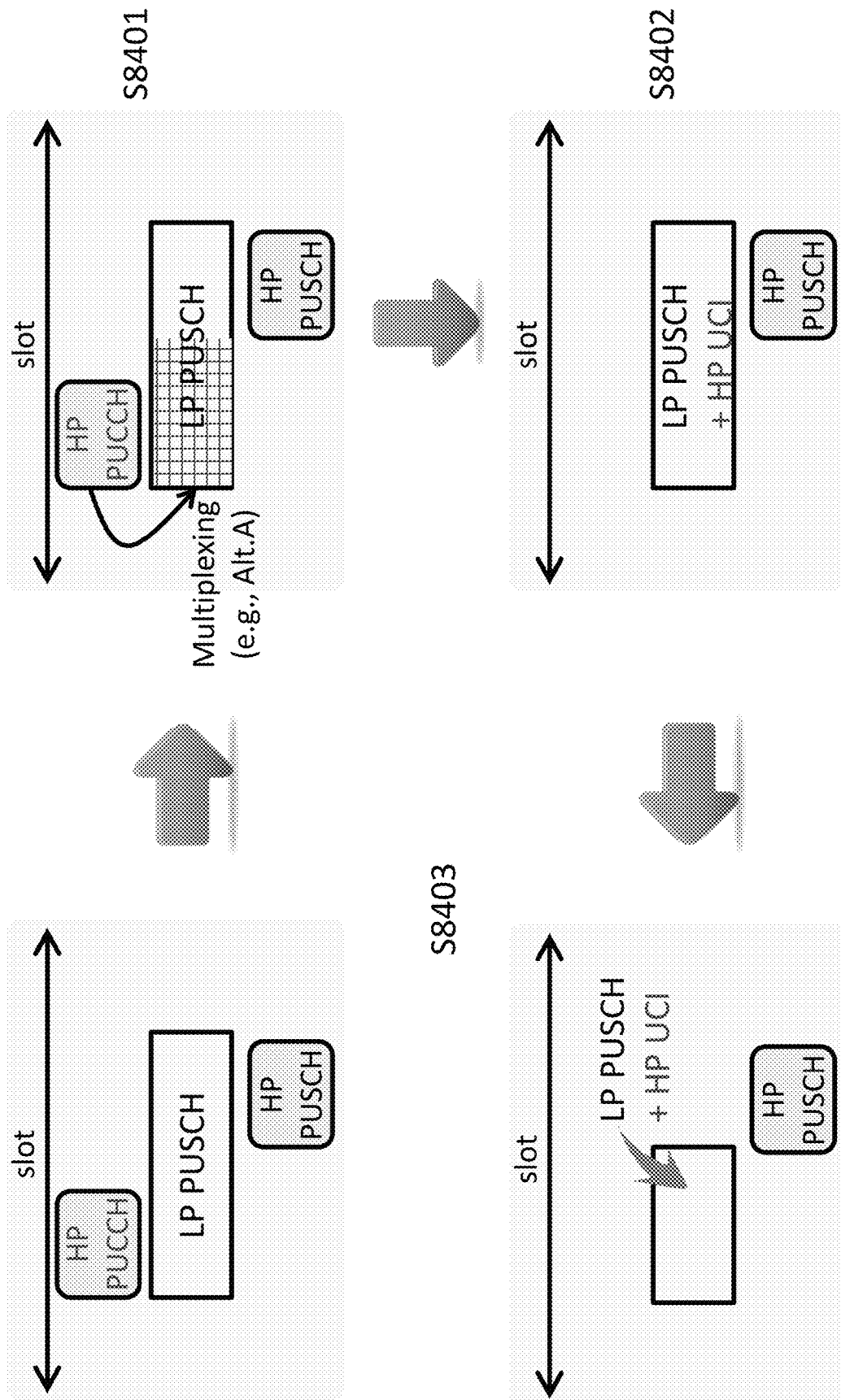
FIG. 84 illustrates a second result of applying Options 1 of the method used by a UE to multiplex UL transmissions to the tenth example according to an exemplary embodiment of the disclosure.

FIG. 84 is an example which shows a second result of applying Option 1 to the scenario of FIG. 82. In step S8401, the UE may determine whether to perform multiplexing among channels with same priority index according to step S701 as previously described, but there are no colliding channels of the same priority index and thus step S701 is not applicable. Next, the UE may determine whether to perform multiplexing among channels with different priority indexes according to step S702, and thus UE may multiplex HP PUCCH into LP PUSCH according to the mechanism of Alternative A. In step S8402, HP UCI has been multiplexed into LP PUSCH which collides with HP PUSCH. In step S8403, the UE may determine whether to perform prioritization among channel with different priority indexes according to the step S703, and thus the UE may drop the portion of LP PUSCH which has collided with HP PUSCH. Thus, the UE may transmit the portion of LP PUSCH which contains HP UCI previously multiplexed into LP PUSCH from HP PUSCH and also HP PUSCH.

Figure 85:
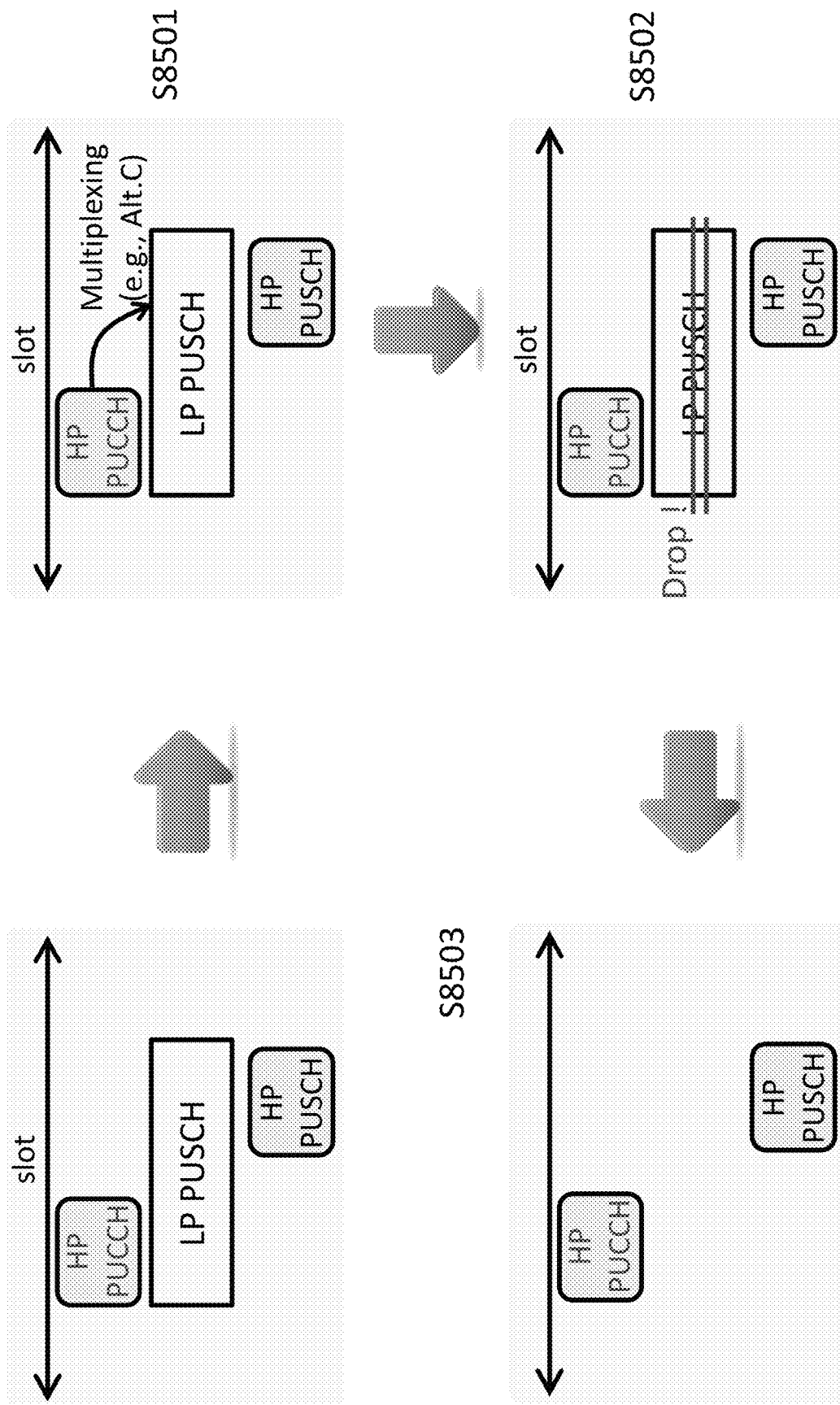
FIG. 85 illustrates applying Options 2 of the method used by a UE to multiplex UL transmissions to the tenth example according to an exemplary embodiment of the disclosure.

FIG. 85 is an example which shows the result of applying Option 2 to the scenario of FIG. 82. In step S8501, the UE may determine whether to perform multiplexing among channels with a first priority index according to step S801, but there are no multiple channels with the first priority index to multiplex. In step S8502, the UE may determine whether to perform multiplexing among channels with a second priority index according to step S802, but there are no multiple channels with the second priority index to multiplex. Next, the UE may determine whether to perform multiplexing among channels with different priority indexes according to step S803, but the UE may not multiplex HP PUCCH into LP PUSCH according to the mechanism of Alternative C. Next, the UE may determine whether to perform prioritization among channel with different priority indexes as described in step S804. Thus, the UE may drop LP PUSCH since it collides with HP PUCCH and HP PUSCH. In step S8503, and the UE may transmit HP PUSCH and HP PUCCH.

Figure 86:
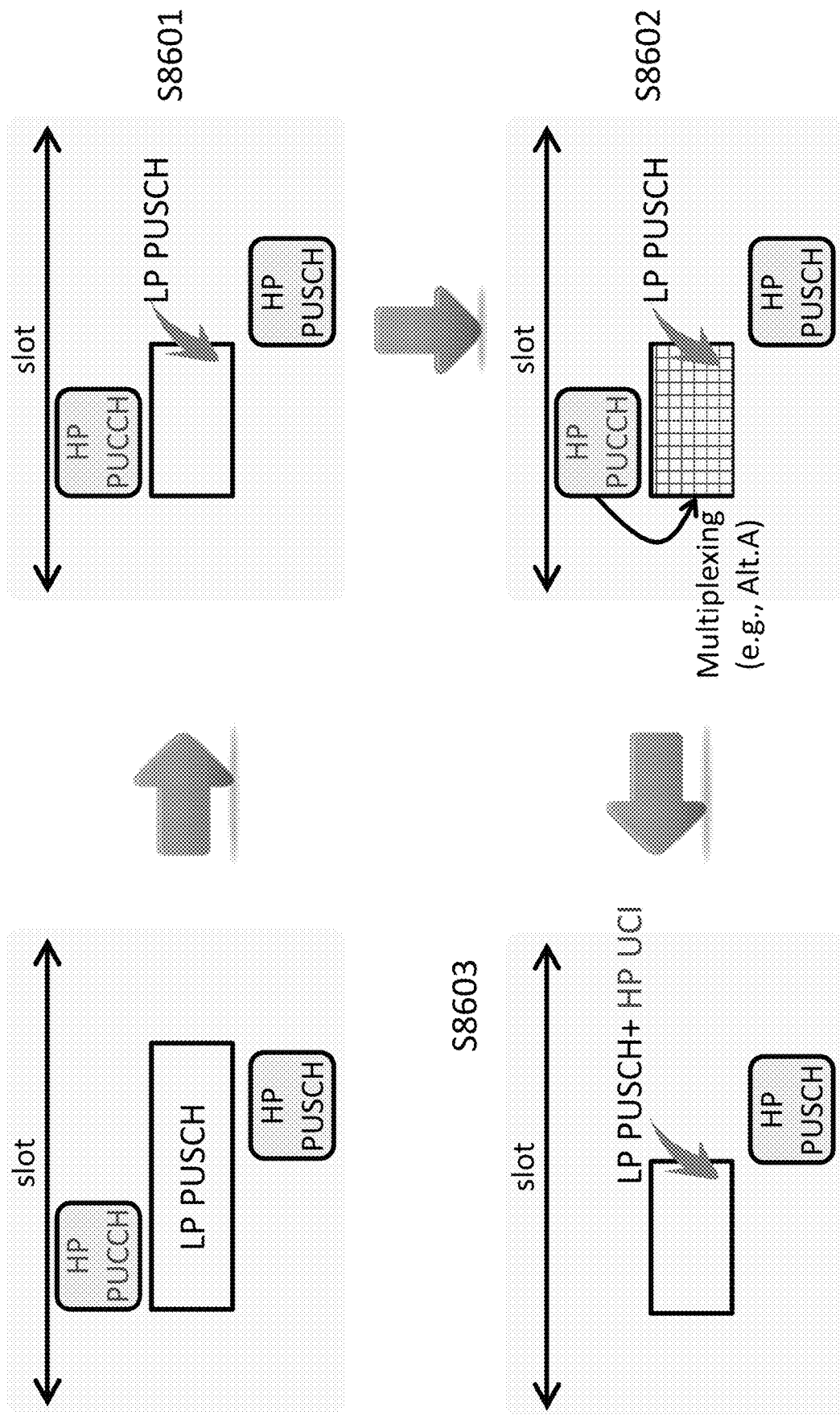
FIG. 86 illustrates a first result of applying Options 3 of the method used by a UE to multiplex UL transmissions to the tenth example according to an exemplary embodiment of the disclosure.

FIG. 86 is an example which shows a first result of applying Option 3 to the scenario of FIG. 82. In step S8601, the UE may determine whether to perform prioritization among channels with same type but with different priority indexes as described in step S901. Thus, the UE may drop the portion of LP PUSCH which collides with HP PUSCH and maintain the portion of LP PUSCH which does not overlap in time with HP PUSCH. In step S8602, the UE may determine whether to perform multiplexing among channels with same priority index as described in step S902, but there are no colliding channels with the same priority index and thus S902 is not applicable. Next, the UE may determine whether to perform multiplexing among channels with different priority indexes as described in step S903. Thus, the UE may multiplex HP UCI in HP PUCCH into HP PUSCH based on the mechanism of Alternative A. Next, the UE may determine whether to perform prioritization among channel with different priority indexes as described in step S904, but there is no prioritization to be performed since there are no collisions among remaining channels with different priority indexes. In step S8603, the UE may transmit the remaining portion of LP PUSCH which contains HP UCI and HP PUSCH.

Figure 87:
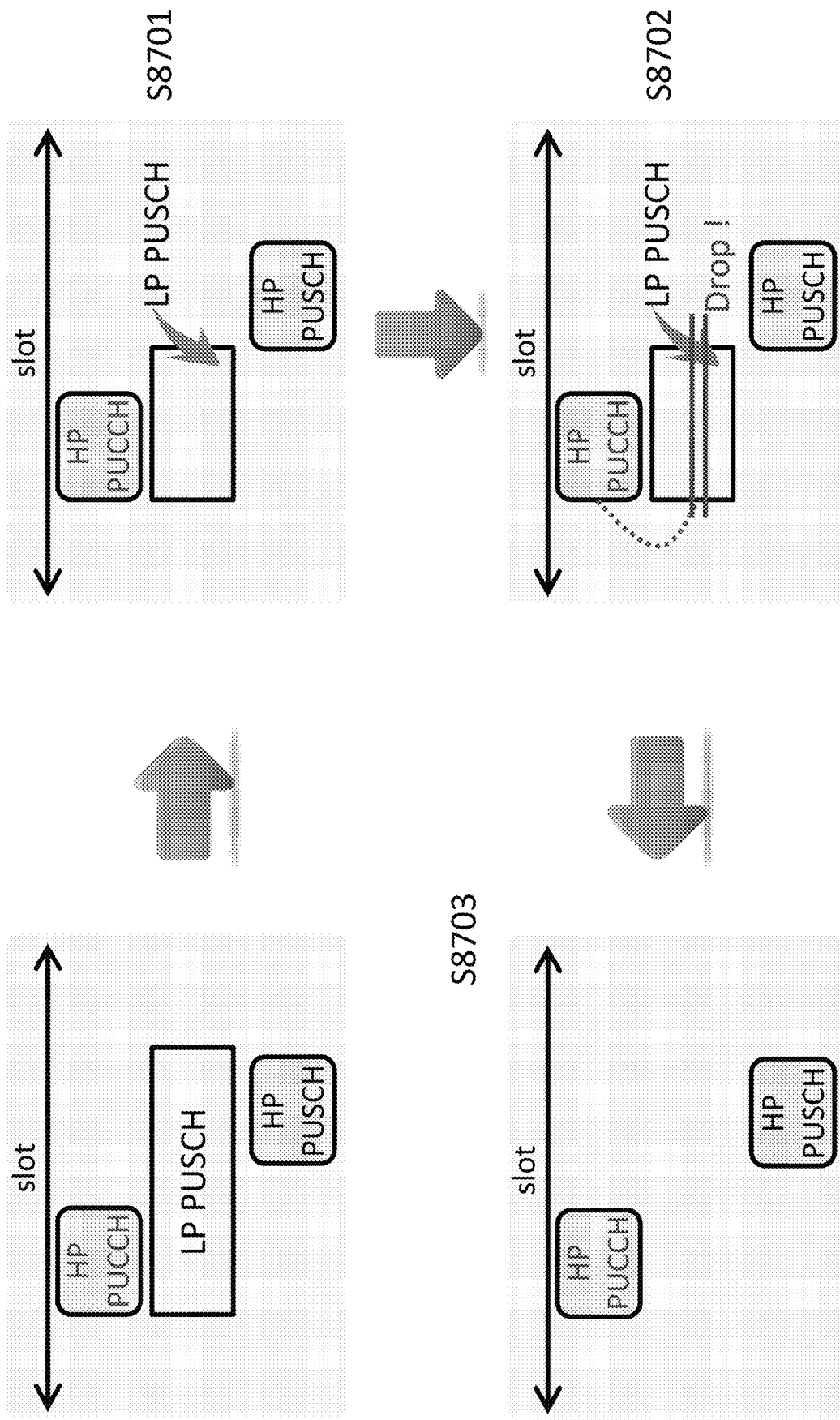
FIG. 87 illustrates a second result of applying Options 3 of the method used by a UE to multiplex UL transmissions to the tenth example according to an exemplary embodiment of the disclosure.

FIG. 87 is an example which shows a second result of applying Option 3 to the scenario of FIG. 82. In step S8701, the UE may determine whether to perform prioritization among channels with same type but with different priority indexes as described in step S901. Thus, the UE may drop the portion of LP PUSCH which collides with HP PUSCH and maintain the portion of LP PUSCH which does not overlap in time with HP PUSCH. In step S8702, the UE may determine whether to perform multiplexing among channels with same priority index as described in step S902, but there are no colliding channels with the same priority index and thus S902 is not applicable. Next, the UE may determine whether to perform multiplexing among channels with different priority indexes as described in step S903. For this case, the UE may not multiplex LP UCI into HP PUSCH. It should be noted that whether a LP UCI can be multiplexed with a HP PUSCH may be determined according to gNB configuration (e.g., via higher layer signaling) or indication (e.g., via DCI, the DCI could be the DCI for triggering the HP PUSCH). Next, the UE may determine whether to perform prioritization among channel with different priority indexes as described in step S904, and thus the UE may drop LP PUSCH which has collided with HP PUCCH. In step S8703, the UE may transmit the remaining portion of HP PUCCH and HP PUSCH.

Figure 88:
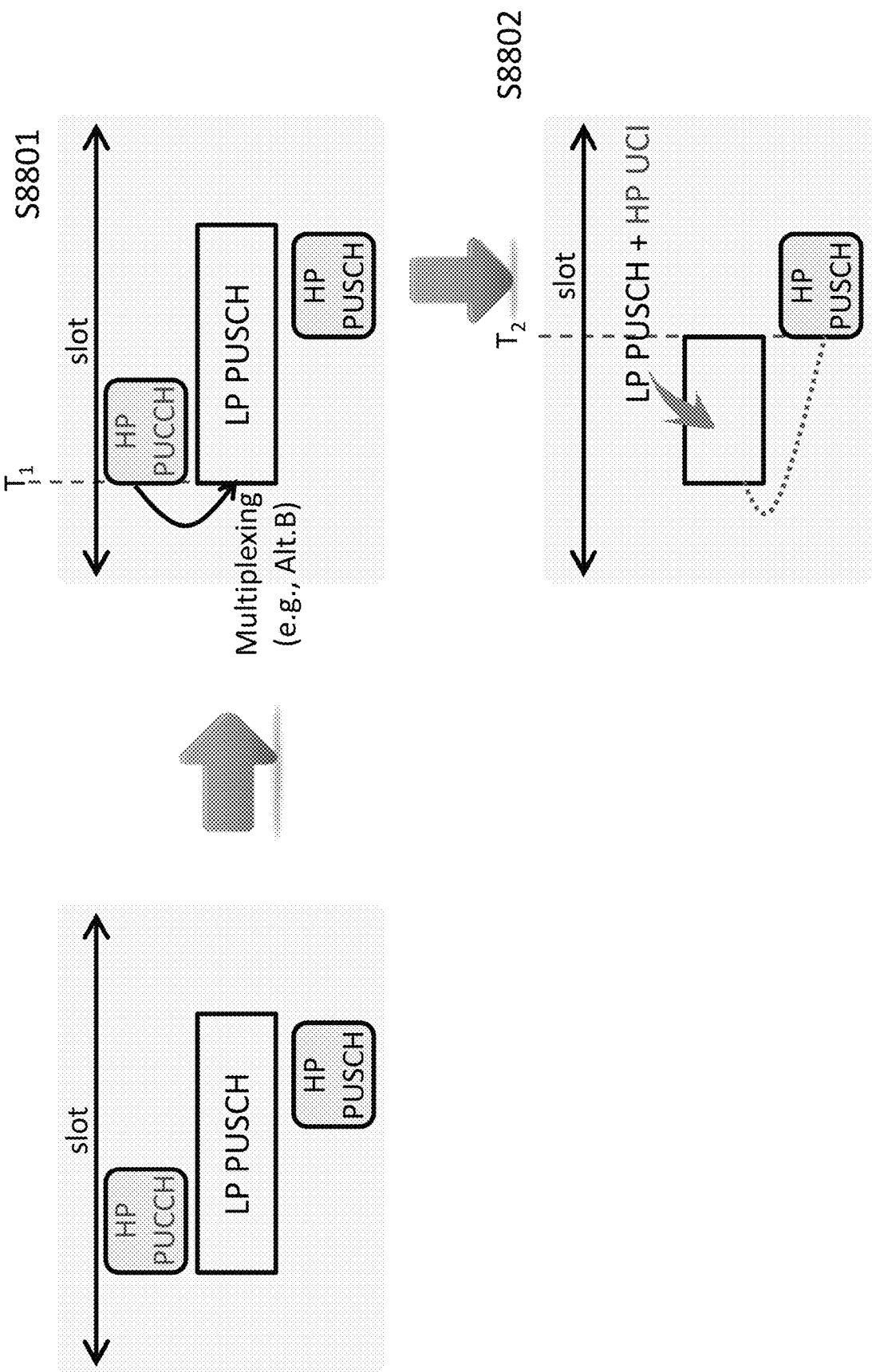
FIG. 88 illustrates a second result of applying Options 4 of the method used by a UE to multiplex UL transmissions to the tenth example according to an exemplary embodiment of the disclosure.

FIG. 88 is an example shows the first result of applying option 4 to the scenario of FIG. 65. In step S8801, at time T1, there is a collision between HP PUCCH and LP PUSCH, and the UE may multiplex HP UCI in HP PUCCH into LP PUSCH according to the mechanism of Alternative B. In step S8802, at time T2, there is a collision between LP PUSCH and HP PUSCH which contains the previously multiplexed HP UCI, and thus the UE may multiplex HP PUSCH with LP PUSCH and drop the remaining portion of LP PUSCH which has collided with HP PUSCH. Subsequently, the UE may transmit the remaining portion of LP PUSCH which contains HP UCI and also HP PUSCH.

Figure 89:
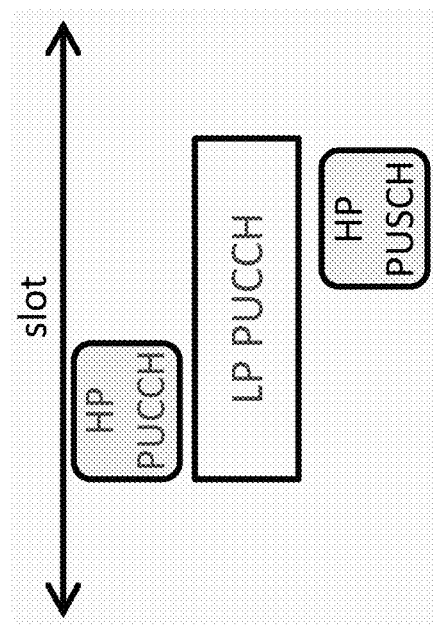
FIG. 89 illustrates an eleventh example for applying the method used by a UE to multiplex UL transmissions according to an exemplary embodiment of the disclosure.

Next, FIG. 89 shows an eleventh example which contains a scenario in which HP PUCCH collides with LP PUSCH which later on collides with HP PUSCH. FIG. 90 is an example which shows a first result of applying Options 1, 2, and 3 to the scenario of FIG. 89. In step S9001, LP UCI in LP HPCCH could be multiplexed into HP PUSCH based on the mechanism of Alternative B. In step S9002, the UE may transmit HP PUCCH and HP PUSCH containing LP UCI. It should be noted that whether a LP UCI can be multiplexed with a HP PUSCH may be determined according to gNB configuration (e.g., via higher layer signaling) or indication (e.g., via DCI, the DCI could be the DCI for triggering the HP PUSCH).

FIG. 91 is an example which shows a second result of applying Options 1, 2, and 3 to the scenario of FIG. 89. In step S9101, LP UCI in LP PUCCH is multiplexed with HP UCI. In step S9102, the UE may transmit HP PUCCH multiplexed with HP PUSCH. It should be noted that whether a LP UCI can be multiplexed with a HP PUCCH may be determined according to gNB configuration (e.g., via higher layer signaling) or indication (e.g., via DCI, the DCI could be the DCI for triggering the HP PUCCH).

According to the second result illustrated in FIG. 91, it does not preclude that the steps to handle overlapping PUCCH/PUSCH with different priorities may comprise a first step to resolve (e.g., multiplexing) the overlapped PUCCH with different priorities and a second step to resolve (e.g., multiplexing) the overlapping between PUCCH and PUSCH (e.g., with different priorities), and it could be treated as Option 5. It should be note that according to the example in the FIG. 89, the HP PUCCH and HP PUSCH are not overlap in a time period, however, it should not preclude that the HP PUCCH and HP PUSCH overlap in a time period. In such case, the solutions disclosed in other examples may be applied to resolve the overlapping. Moreover, the solutions disclosed in other examples may be applied if the HP PUSCH is a LP PUSCH, and vice versa.

According to FIG. 92, a UE may perform multiplexing among channels with different priorities by multiplexing a first UCI in a PUSCH, if any, where the first UCI and the PUSCH may belong to different priority indexes, respectively, and by multiplexing a first UCI with a second UCI if any, where the first UCI and the second UCI belong to different priority indexes, respectively. Also, a UE may perform multiplexing among channels with different priorities by multiplexing a first UCI with a second UCI, if any, where the first UCI and the second UCI may belong to different priority indexes, respectively, and by multiplexing a first UCI in a PUSCH, if any, where the first UCI and the PUSCH may belong to different priority indexes, respectively.

FIG. 93 is an example which shows a third result of applying Options 1, 2, and 3 to the scenario of FIG. 89. In step S9301, the UE may drop LP PUCCH. In step S9402, the UE may transmit HP PUCCH and HP PUSCH.

Figure 94:
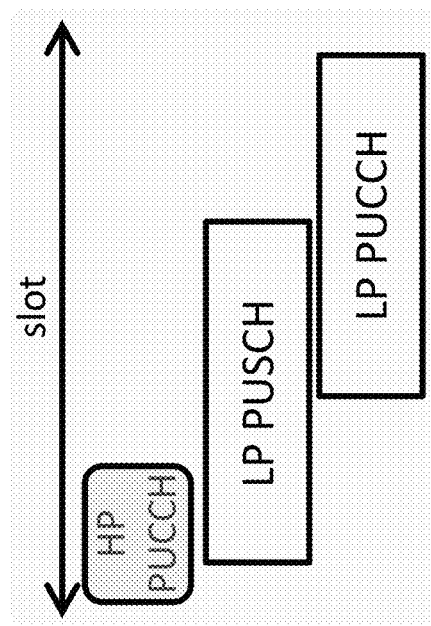
FIG. 94 illustrates a twelfth example for applying the method used by a UE to multiplex UL transmissions according to an exemplary embodiment of the disclosure.

FIG. 94 shows a twelfth example which contains a scenario in which includes HP PUCCH colliding with LP PUSCH which later on collides with LP PUCCH.

Figure 95:
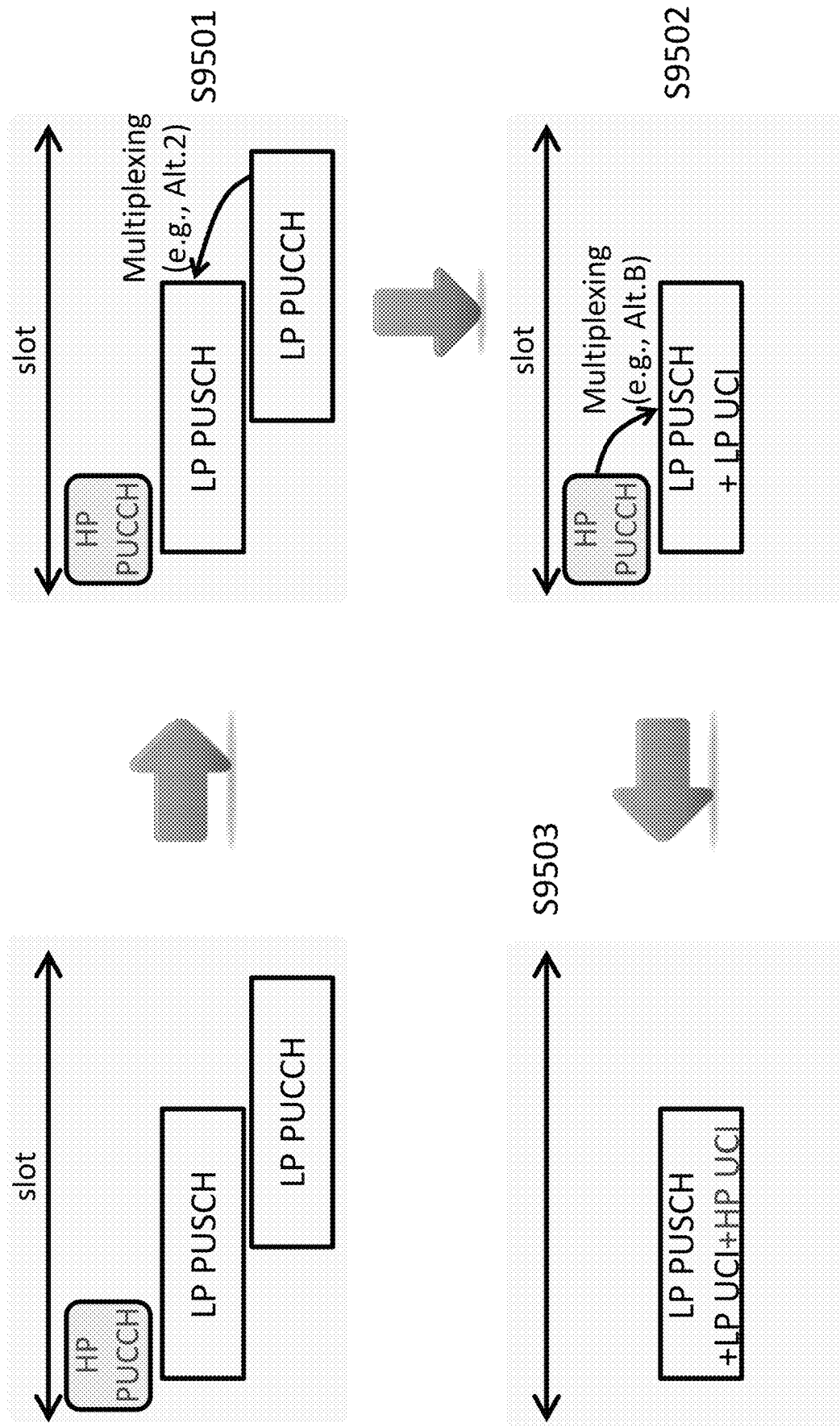
FIG. 95 illustrates a first result of applying Options 1, 2, and 3 of the method used by a UE to multiplex UL transmissions to the twelfth example according to an exemplary embodiment of the disclosure.

FIG. 95 shows a first result of applying Options 1, 2, and 3 to the scenario of FIG. 94. In step S9501, LP UCI in LP PUCCH is multiplexed into LP PUSCH based on the mechanism of Alternative 2. In step S9502, HP UCI in HP PUCCH is multiplexed into LP PUSCH containing LP UCI based on the mechanism of Alternative B. In step S9503, the UE transmit LP PUSCH containing LP UCI and HP UCI.

FIG. 96 shows a second result of applying Options 1, 2, and 3 to the scenario of FIG. 94. In step S9701, the UE multiplexes LP PUCCH into LP PUSCH based on the mechanism of Alternative 2. In step S9602, the UE may drop LP PUSCH. It should be noted that no condition for multiplexing among channels with different priority can satisfy, e.g., HP UCI may not multiplex with LP PUSCH which is multiplexed with LP UCI, or according to gNB configuration the multiplexing among channels with different priority is not allowed (e.g., disabled).

Figure 97:
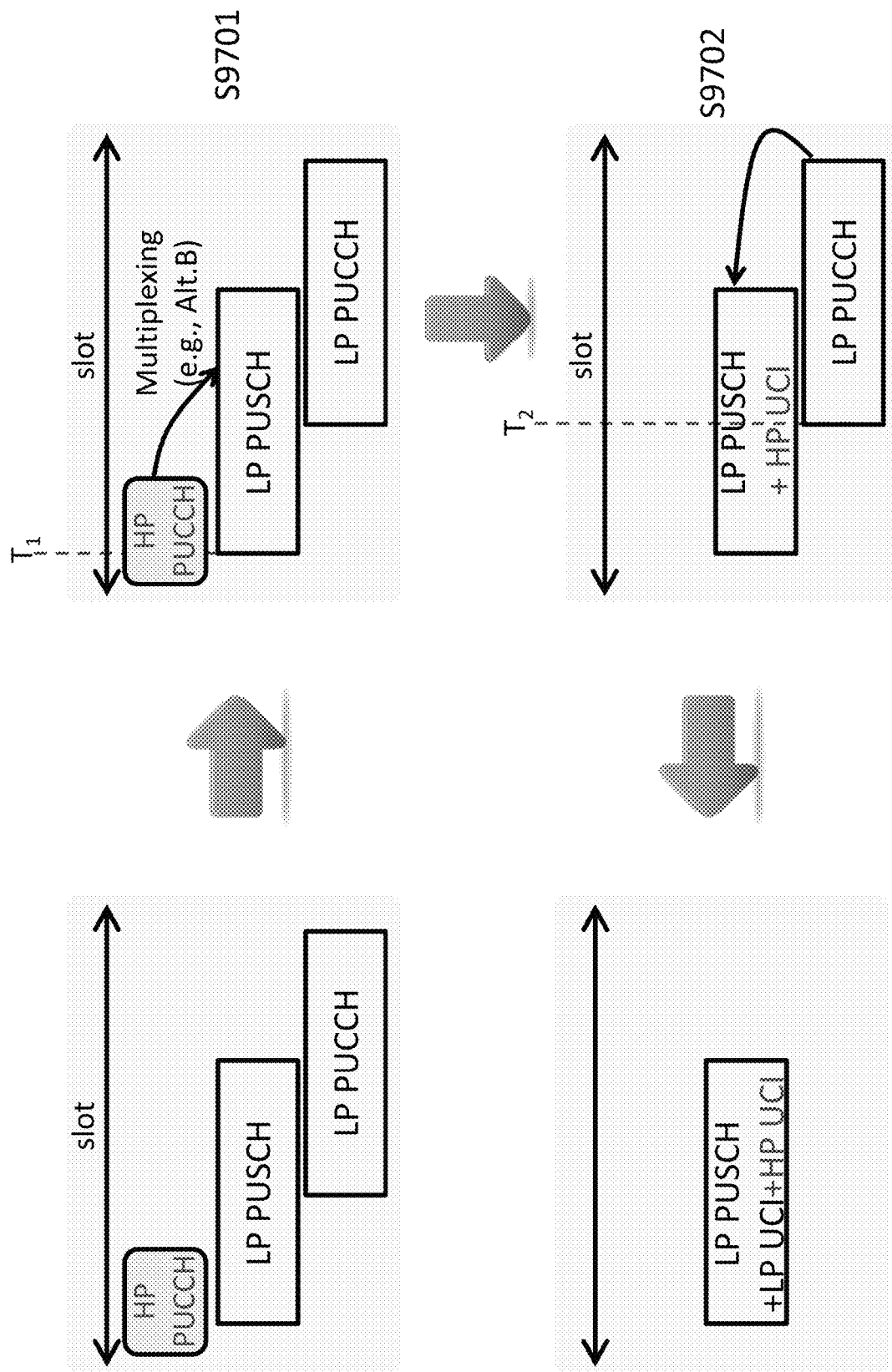
FIG. 97 illustrates a first result of applying Options 4 of the method used by a UE to multiplex UL transmissions to the twelfth example according to an exemplary embodiment of the disclosure.

FIG. 97 shows a first result of applying Options 4 to the scenario of FIG. 94. In step S9701, the UE may multiplex HP UCI in HP PUCCH into LP PUSCH according to the mechanism of Alternative B. In step S9702, the UE may multiplex LP UCI in LP PUCCH into LP PUSCH which contains HP UCI. In step S9703, the UE may transmit LP PUSCH which contains LP UCI and HP UCI.

FIG. 98 shows a second result of applying Options 4 to the scenario of FIG. 94. In step S9801, the UE may multiplex PUCCH into LP PUSCH according to the mechanism of Alternative B. In step S9802, the UE may drop LP PUCCH. Subsequently, the UE may transmit LP PUSCH containing HP UCI. It should be noted that whether a PUSCH can multiplex with multiple UCI which corresponding the different priority indexes may be a fixed rule, or configured by gNB. For example, a LP PUSCH may multiplex multiple UCI (e.g., HARQ-ACK) corresponding to different priority indexes according to gNB configuration.

In view of the aforementioned descriptions, the disclosure is suitable for being used in a wireless communication system which is 5G NR and beyond and is able to multiplex and prioritize different channels having the same or different priorities when collisions of channels occur.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method used by a user equipment (UE) to multiplex uplink (UL) transmissions comprising:
determining whether to multiplex a first plurality of UL channels in a first slot in response to receiving, by a hardware processor, internal data traffic in the first plurality of UL channels in the first slot, wherein the UL channels of the first plurality of UL channels overlap within at least one time period and are indicated with a first priority index;
determining whether to multiplex a second plurality of UL channels in the first slot in response to receiving, by a hardware processor, internal data traffic in the second plurality of UL channels in the first slot, wherein the second plurality of channels overlap within at least one time period and the UL channels of the second plurality of UL channels are indicated with a second priority index;
determining whether to multiplex a third plurality of UL channels in the first slot in response to receiving, by a hardware processor, internal data traffic in the third plurality of UL channels in the first slot, wherein the third plurality of channels overlap within at least one time period and the UL channels of the third plurality of UL channels are indicated with different priority indexes;

determining whether to prioritize a fourth plurality of UL channels in the first slot in response to receiving, by a hardware processor, internal data traffic in the fourth plurality of UL channels in the first slot, wherein the fourth plurality of channels overlap within at least one time period and the UL channels of the fourth plurality of UL channels are indicated with a different priority indexes; and performing an UL transmission in the first slot.

2. The method of claim 1 further comprising:
multiplexing the second plurality of UL channels and there is no physical uplink shared channel (PUSCH) in the second plurality of UL channels to collide with a first UL channel of the first plurality of UL channels, wherein the first UL channel is indicated with the first priority index.

3. The method of claim 1 further comprising:
determining whether to prioritize a fifth plurality of UL channels before determining whether to multiple the first plurality of UL channels, wherein the fifth plurality of UL channels comprising UL channels of a same type and are indicated with different priority indexes.

4. The method of claim 3, wherein the UL channels of the same type are PUSCHs.

5. The method of claim 3, wherein the UL channels of the same type are physical UL control channels (PUCCHs).

6. The method of claim 1, wherein the first priority index is higher priority than the second priority index.

7. The method of claim 1, wherein the first priority index or the second priority index is determined according to a downlink control information (DCI) which triggers a corresponding UL transmission or is determined according to a higher layer configuration corresponding to the UL transmission.

8. The method of claim 1, wherein determining whether to multiplex the second plurality of UL channels further comprising:
multiplexing a first UL control information (UCI) in a first PUSCH in the second plurality of UL channels.

9. The method of claim 8, wherein multiplexing the first UL control information (UCI) in a first PUSCH in the second plurality of UL channels comprising:
Determining a number of resources for multiplexing the first UCI according to a resource of the first PUSCH.

10. The method of claim 1, determining whether to multiplex the third plurality of UL channels further comprising:
multiplexing a second UCI in a second UL channel in the third plurality of UL channels, wherein the second UCI and the second UL channel are corresponding to different priority indexes, respectively in the third plurality of UL channels.

11. The method of claim 10, wherein multiplexing the second UCI in the second UL channel in the third plurality of UL channels comprising:
determining a number of resources for the second UCI according to the resource of the second UL channel.

12. The method of claim 10, wherein the second UL channel is a PUCCH for multiplexing the second UCI and a third UCI, and the third UCI has the same priority index as the PUCCH.

13. The method of claim 10, wherein the second UL channel is a PUSCH which is multiplexed with a third UCI and the third UCI has the same priority index as the PUSCH.

14. The method of claim 10, wherein a coding rate of the second UCI is lower than a threshold.

15. The method of claim 14, wherein the threshold is determined by a base station configuration or is a predetermined fixed value.

16. The method of claim 1, wherein determining whether to multiplex the third plurality of UL channels further comprising:
transmitting a third UL channel and stop transmitting a fourth UL channel of the third plurality of UL channels, wherein the third UL channel has a higher priority than the fourth UL channel.

17. The method of claim 16, wherein a coding rate of a UCI of the third UL channel is higher than a threshold when the UCI is multiplexed with a UCI or a transport block (TB) of the fourth UL channel.

18. The method of claim 17, wherein the threshold is determined by a base station configuration or is a predetermined fixed value.

19. The method of claim 16, wherein a coding rate or a change of the coding rate for a TB of the third UL channel is higher than a threshold if a UCI of the fourth UL channel is multiplexed in the third UL channel.

20. The method of claim 1, wherein determining whether to prioritize the fourth plurality of UL channels further comprising:
stop transmitting a lower priority (LP) channel of the fourth plurality of UL channels if the LP channel overlaps with the HP channel within a time period.

21. The method of claim 20, wherein the HP channel is multiplexed with a LP UCI.

22. The method of claim 20, wherein a coding rate of a UCI of the HP channel which multiplexed with the LP channel is larger than a threshold.

23. The method of claim 20, wherein the HP channel is not overlapped with a DMRS symbol of the LP channel.

24. The method of claim 20, further comprising:
transmitting a UCI of the LP channel in a second slot after stop transmitting the LP channel in the first slot.

25. The method of claim 24, wherein transmitting the UCI comprising:
transmitting the UCI via a PUCCH according to a base station triggering by a DCI.

26. The method of claim 24, wherein transmitting the UCI comprising:
transmitting the UCI together with another UCI which has a same priority index as the UCI.

27. The method of claim 1, wherein a time distance between a transmission for an UL channel of the first, second, third, or fourth plurality of UL channels and a corresponding reception is larger than a threshold.

28. The method of claim 27, wherein the threshold is a predetermined fixed value or determined according to a subcarrier spacing of the DCI or the UL channel.

29. The method of claim 27, wherein the threshold is a number of symbols.

30. A user equipment (UE) comprising:
a transceiver configured to transmit and receive data; and
a processor coupled to the hardware transceiver and configured to:
determine whether to multiplex a first plurality of UL channels in a first slot in response to receiving, by a hardware processor, internal data traffic in the first plurality of UL channels in the first slot, wherein the UL channels of the first plurality of UL channels overlap within at least one time period and are indicated with a first priority index;

determine whether to multiplex a second plurality of UL channels in the first slot in response to receiving, by a hardware processor, internal data traffic in the second plurality of UL channels in the first slot, wherein the second plurality of channels overlap within at least one time period and the UL channels of the second plurality of UL channels are indicated with a second priority index;

determine whether to multiplex a third plurality of UL channels in the first slot in response to receiving, by a hardware processor, internal data traffic in the third plurality of UL channels in the first slot, wherein the third plurality of channels overlap within at least one time period and the UL channels of the third plurality of UL channels are indicated with different priority indexes;

determine whether to prioritize a fourth plurality of UL channels in the first slot in response to receiving, by a hardware processor, internal data traffic in the fourth plurality of UL channels in the first slot, wherein the fourth plurality of channels overlap within at least one time period and the UL channels of the fourth plurality of UL channels are indicated with a different priority indexes; and perform an UL transmission in the first slot.

* * * * *